(12) United States Patent
Conrad

(10) Patent No.: US 12,342,978 B2
(45) Date of Patent: Jul. 1, 2025

(54) SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

(21) Appl. No.: 18/630,499

(22) Filed: Apr. 9, 2024

(65) Prior Publication Data

US 2024/0252005 A1 Aug. 1, 2024

Related U.S. Application Data

(63) Continuation of application No. 17/726,640, filed on Apr. 22, 2022, now Pat. No. 11,980,334, which is a continuation-in-part of application No. 15/852,186, filed on Dec. 22, 2017, now Pat. No. 11,540,692.

(60) Provisional application No. 62/559,151, filed on Sep. 15, 2017.

(51) Int. Cl.
*A47L 7/00* (2006.01)
*A47L 9/16* (2006.01)
*B01D 45/04* (2006.01)
*B01D 45/16* (2006.01)
*B04C 3/00* (2006.01)

(52) U.S. Cl.
CPC ........... *A47L 7/0038* (2013.01); *A47L 9/1683* (2013.01); *B01D 45/04* (2013.01); *B01D 45/16* (2013.01); *B04C 3/00* (2013.01)

(58) Field of Classification Search
CPC .... A47L 7/0038; A47L 9/1683; A47L 9/1608; A47L 9/1691; B01D 45/04; B01D 45/16; B04C 3/00
See application file for complete search history.

(56) References Cited

U.S. PATENT DOCUMENTS

| 3,636,681 | A | 1/1972 | Batson |
| 4,200,415 | A | 4/1980 | Boring |
| 4,443,232 | A | 4/1984 | Kaiser |

(Continued)

FOREIGN PATENT DOCUMENTS

| CA | 2192906 A1 | 7/1997 |
| CA | 2275675 A1 | 12/1999 |

(Continued)

OTHER PUBLICATIONS

U.S. Appl. No. 09/343,479, filed Jun. 30, 1999.

(Continued)

*Primary Examiner* — Andrew A Horton
(74) *Attorney, Agent, or Firm* — Philip Mendes Da Costa; SMART & BIGGAR LP

(57) ABSTRACT

A surface cleaning apparatus comprising a surface cleaning head, the surface cleaning head comprising a first liquid separation stage comprising a cyclone having a cyclone axis of rotation, a cyclone first end, an axially spaced apart second end, a cyclone air inlet, a cyclone air outlet and an axially extending sidewall wherein a portion of the sidewall comprises a screen and, when the surface cleaning apparatus is in use to clean a floor, the cyclone axis of rotation extends generally horizontally and, a first liquid collection region that is positioned at a lower elevation than the screen.

20 Claims, 39 Drawing Sheets

(56) References Cited

U.S. PATENT DOCUMENTS

| | | |
|---|---|---|
| 5,080,228 A | 1/1992 | Maston, III |
| 5,267,371 A | 12/1993 | Soler |
| 5,358,290 A | 10/1994 | Fleet |
| 5,500,979 A | 3/1996 | Woerwag |
| 5,671,499 A | 9/1997 | Melito |
| 5,681,450 A | 10/1997 | Chitnis |
| 5,699,586 A | 12/1997 | Melito |
| 5,746,500 A | 5/1998 | Chien |
| 5,765,258 A | 6/1998 | Melito |
| 5,787,545 A | 8/1998 | Colens |
| 5,909,755 A | 6/1999 | Leal |
| 5,974,625 A | 11/1999 | Garner |
| 6,012,200 A | 1/2000 | Murphy |
| 6,098,244 A | 8/2000 | Conrad |
| 6,099,661 A | 8/2000 | Conrad |
| 6,101,672 A | 8/2000 | Conrad |
| 6,123,779 A | 9/2000 | Conrad |
| 6,129,775 A | 10/2000 | Conrad |
| 6,135,708 A | 10/2000 | Conrad |
| 6,168,716 B1 | 1/2001 | Conrad |
| 6,170,119 B1 | 1/2001 | Conrad |
| 6,173,474 B1 | 1/2001 | Conrad |
| 6,174,127 B1 | 1/2001 | Conrad |
| 6,183,641 B1 | 2/2001 | Conrad |
| 6,221,134 B1 | 4/2001 | Conrad |
| 6,224,325 B1 | 5/2001 | Conrad |
| 6,231,645 B1 | 5/2001 | Conrad |
| 6,231,649 B1 | 5/2001 | Dyson |
| 6,238,177 B1 | 5/2001 | Conrad |
| 6,243,917 B1 | 6/2001 | Conrad |
| 6,251,296 B1 | 6/2001 | Conrad |
| 6,261,052 B1 | 7/2001 | Conrad |
| 6,261,379 B1 | 7/2001 | Conrad |
| 6,280,143 B1 | 8/2001 | Parker |
| 6,307,358 B1 | 10/2001 | Conrad |
| 6,312,594 B1 | 11/2001 | Conrad |
| 6,317,920 B1 | 11/2001 | Brickner |
| 6,328,527 B1 | 12/2001 | Conrad |
| 6,334,234 B1 | 1/2002 | Conrad |
| 6,344,064 B1 | 2/2002 | Conrad |
| 6,345,411 B1 | 2/2002 | Kato |
| 6,389,329 B1 | 5/2002 | Colens |
| 6,440,197 B1 | 8/2002 | Conrad |
| 6,442,792 B1 | 9/2002 | Sudou |
| 6,457,205 B1 | 10/2002 | Conrad |
| 6,533,834 B2 | 3/2003 | Conrad |
| 6,599,340 B2 | 7/2003 | Conrad |
| 6,782,585 B1 | 8/2004 | Conrad |
| 6,817,059 B2 | 11/2004 | Tsuchiya |
| D507,387 S | 7/2005 | Jacobs |
| 7,013,528 B2 | 3/2006 | Parker |
| 7,053,578 B2 | 5/2006 | Diehl |
| 7,222,393 B2 | 5/2007 | Kaffenberger |
| 7,223,298 B2 | 5/2007 | Platt |
| 7,225,503 B1 | 6/2007 | Lenkiewicz |
| 7,251,854 B2 | 8/2007 | Gerth |
| 7,329,294 B2 | 2/2008 | Conrad |
| 7,740,675 B2 | 6/2010 | Conrad |
| 7,749,293 B2 | 7/2010 | Conrad |
| 7,776,120 B2 | 8/2010 | Conrad |
| 7,779,505 B2 | 8/2010 | Krebs |
| 7,803,207 B2 | 9/2010 | Conrad |
| 7,811,345 B2 | 10/2010 | Conrad |
| 7,861,366 B2 | 1/2011 | Hahm |
| 7,867,308 B2 | 1/2011 | Conrad |
| 7,941,895 B2 | 5/2011 | Conrad |
| 7,996,957 B2 | 8/2011 | Kah, Jr. |
| 8,016,902 B2 | 9/2011 | Makarov |
| 8,020,251 B2 | 9/2011 | Luebbering |
| 8,117,713 B2 | 2/2012 | Kasper |
| 8,127,398 B2 | 3/2012 | Conrad |
| 8,146,201 B2 | 4/2012 | Conrad |
| 8,151,407 B2 | 4/2012 | Conrad |
| 8,176,596 B2 | 5/2012 | Conrad |
| 8,192,515 B2 | 6/2012 | Conrad |
| 8,268,029 B2 | 9/2012 | Yoo |
| 8,292,979 B2 | 10/2012 | Conrad |
| 8,296,900 B2 | 10/2012 | Conrad |
| 8,349,428 B2 | 1/2013 | Conrad |
| 8,370,993 B2 | 2/2013 | Conrad |
| 8,375,508 B2 | 2/2013 | Conrad |
| 8,381,352 B2 | 2/2013 | Huffman |
| 8,448,291 B2 | 5/2013 | Conrad |
| 8,465,597 B2 | 6/2013 | Turner |
| 8,479,358 B2 | 7/2013 | Conrad |
| 8,486,170 B2 | 7/2013 | Conrad |
| 8,510,907 B2 | 8/2013 | Conrad |
| 8,533,904 B2 | 9/2013 | Conrad |
| 8,561,257 B2 | 10/2013 | Conrad |
| 8,567,005 B2 | 10/2013 | Conrad |
| 8,572,799 B2 | 11/2013 | Won |
| 8,578,550 B2 | 11/2013 | Conrad |
| 8,578,553 B2 | 11/2013 | Conrad |
| 8,590,102 B2 | 11/2013 | Conrad |
| 8,607,407 B2 | 12/2013 | Conrad |
| 8,621,709 B2 | 1/2014 | Conrad |
| 8,640,304 B2 | 2/2014 | Conrad |
| 8,646,147 B2 | 2/2014 | Conrad |
| 8,659,184 B2 | 2/2014 | Conrad |
| 8,677,554 B2 | 3/2014 | Conrad |
| 8,677,558 B2 | 3/2014 | Conrad |
| 8,707,510 B2 | 4/2014 | Reed, Jr. |
| 8,713,751 B2 | 5/2014 | Conrad |
| 8,813,305 B2 | 8/2014 | Conrad |
| 8,834,209 B2 | 9/2014 | Conrad |
| 8,869,344 B2 | 10/2014 | Conrad |
| 8,869,345 B2 | 10/2014 | Conrad |
| 8,869,348 B2 | 10/2014 | Conrad |
| 8,875,340 B2 | 11/2014 | Conrad |
| 8,875,342 B2 | 11/2014 | Conrad |
| 8,984,708 B2 | 3/2015 | Kuhe |
| 9,027,198 B2 | 5/2015 | Conrad |
| 9,027,203 B2 | 5/2015 | Conrad |
| 9,039,799 B2 | 5/2015 | Schook |
| 9,066,642 B2 | 6/2015 | Conrad |
| 9,119,511 B2 | 9/2015 | Kah, Jr. |
| 9,119,513 B2 | 9/2015 | Conrad |
| 9,155,437 B2 | 10/2015 | Williams |
| 9,161,666 B2 | 10/2015 | Conrad |
| 9,161,669 B2 | 10/2015 | Conrad |
| 9,167,944 B2 | 10/2015 | Conrad |
| 9,204,769 B2 | 12/2015 | Conrad |
| 9,204,773 B2 | 12/2015 | Conrad |
| 9,215,960 B2 | 12/2015 | Conrad |
| 9,226,633 B2 | 1/2016 | Conrad |
| 9,227,151 B2 | 1/2016 | Conrad |
| 9,227,201 B2 | 1/2016 | Conrad |
| 9,232,881 B2 | 1/2016 | Conrad |
| 9,238,235 B2 | 1/2016 | Conrad |
| 9,295,995 B2 | 3/2016 | Conrad |
| 9,314,138 B2 | 4/2016 | Conrad |
| 9,314,139 B2 | 4/2016 | Conrad |
| 9,320,401 B2 | 4/2016 | Conrad |
| 9,326,652 B2 | 5/2016 | Conrad |
| 9,364,127 B2 | 6/2016 | Conrad |
| 9,427,122 B2 | 8/2016 | Conrad |
| 9,427,126 B2 | 8/2016 | Conrad |
| 9,433,332 B2 | 9/2016 | Conrad |
| 9,451,852 B2 | 9/2016 | Conrad |
| 9,451,855 B2 | 9/2016 | Conrad |
| 9,456,721 B2 | 10/2016 | Conrad |
| 9,462,920 B1 | 10/2016 | Morin |
| 9,492,045 B2 | 11/2016 | Conrad |
| 9,492,048 B2 | 11/2016 | Won |
| 9,526,394 B2 | 12/2016 | Conrad |
| 9,572,463 B2 | 2/2017 | Conrad |
| 9,591,952 B2 | 3/2017 | Conrad |
| 9,591,958 B2 | 3/2017 | Conrad |
| 9,615,703 B2 | 4/2017 | Moyher, Jr. |
| 9,668,630 B2 | 6/2017 | Conrad |
| 9,775,484 B2 | 10/2017 | Conrad |
| 9,788,698 B2 | 10/2017 | Morin |
| 9,801,513 B2 | 10/2017 | Conrad |
| 9,820,621 B2 | 11/2017 | Conrad |

(56) References Cited

U.S. PATENT DOCUMENTS

| | | | |
|---|---|---|---|
| 9,883,782 B2 | 2/2018 | York |
| 9,888,818 B2 | 2/2018 | Kuhe |
| 9,931,007 B2 | 4/2018 | Morin |
| 10,076,183 B2 | 9/2018 | Conrad |
| 10,143,346 B2 | 12/2018 | Williams |
| 10,149,587 B2 | 12/2018 | Conrad |
| 10,159,393 B2 | 12/2018 | Conrad |
| 10,201,260 B2 | 2/2019 | Conrad |
| 10,214,349 B2 | 2/2019 | Conrad |
| 10,251,519 B2 | 4/2019 | Conrad |
| 10,357,136 B2 | 7/2019 | Conrad |
| 10,512,383 B2 | 12/2019 | Luyckx |
| 10,537,216 B2 | 1/2020 | Conrad |
| 10,537,219 B2 | 1/2020 | Conrad |
| 10,568,477 B2 | 2/2020 | Conrad |
| 10,687,679 B2 | 6/2020 | Conrad |
| 10,729,294 B2 | 8/2020 | Conrad |
| 10,799,887 B2 | 10/2020 | Hyun |
| 10,820,762 B2 | 11/2020 | Paulla |
| 11,198,085 B2 | 12/2021 | Conrad |
| 11,285,495 B2 | 3/2022 | Conrad |
| 11,478,117 B2 | 10/2022 | Conrad |
| 11,534,041 B2 | 12/2022 | Conrad |
| 11,534,043 B2 | 12/2022 | Conrad |
| 11,571,097 B2 | 2/2023 | Conrad |
| 11,779,182 B1 | 10/2023 | Harmelink |
| 11,793,374 B2 | 10/2023 | Conrad |
| 11,857,142 B2 | 1/2024 | Conrad |
| 11,950,745 B2 | 4/2024 | Conrad |
| 11,980,334 B2 | 5/2024 | Conrad |
| 2001/0004879 A1 | 6/2001 | Umotoy |
| 2001/0027587 A1 | 10/2001 | Conrad |
| 2002/0162188 A1 | 11/2002 | Harmen |
| 2003/0201754 A1 | 10/2003 | Conrad |
| 2003/0217432 A1 | 11/2003 | Oh |
| 2004/0134026 A1 | 7/2004 | Brinkhoff |
| 2004/0216266 A1 | 11/2004 | Conrad |
| 2005/0025397 A1 | 2/2005 | Zhao |
| 2005/0091783 A1 | 5/2005 | Sepke |
| 2005/0115409 A1 | 6/2005 | Conrad |
| 2006/0150591 A1 | 7/2006 | Borinato |
| 2006/0156509 A1 | 7/2006 | Luebbering |
| 2006/0196004 A1 | 9/2006 | Conrad |
| 2006/0277714 A1 | 12/2006 | Dunning |
| 2006/0288520 A1 | 12/2006 | Oh |
| 2008/0172992 A1 | 7/2008 | Conrad |
| 2008/0178416 A1 | 7/2008 | Conrad |
| 2008/0178418 A1 | 7/2008 | Conrad |
| 2008/0178420 A1 | 7/2008 | Conrad |
| 2008/0179133 A1 | 7/2008 | Conrad |
| 2008/0196366 A1 | 8/2008 | Conrad |
| 2008/0201895 A1 | 8/2008 | Kim |
| 2008/0209669 A1* | 9/2008 | Kah .................. B04C 5/14 55/460 |
| 2008/0216281 A1 | 9/2008 | Conrad |
| 2008/0263813 A1 | 10/2008 | Han |
| 2009/0056060 A1 | 3/2009 | Han |
| 2009/0223188 A1 | 9/2009 | Oh |
| 2010/0175217 A1 | 7/2010 | Conrad |
| 2010/0205915 A1 | 8/2010 | Oh |
| 2010/0229323 A1 | 9/2010 | Conrad |
| 2010/0229325 A1 | 9/2010 | Conrad |
| 2010/0229326 A1 | 9/2010 | Conrad |
| 2010/0229334 A1 | 9/2010 | Conrad |
| 2010/0229335 A1 | 9/2010 | Conrad |
| 2010/0229337 A1 | 9/2010 | Conrad |
| 2010/0251507 A1 | 10/2010 | Conrad |
| 2011/0219567 A1 | 9/2011 | Conrad |
| 2011/0219579 A1 | 9/2011 | Conrad |
| 2011/0296648 A1 | 12/2011 | Kah, Jr. |
| 2012/0272474 A1 | 11/2012 | Follows |
| 2012/0284960 A1 | 11/2012 | Sutton |
| 2012/0304860 A1 | 12/2012 | Matson |
| 2012/0311813 A1 | 12/2012 | Gilbert, Jr. |
| 2013/0152525 A1 | 6/2013 | Brandner |
| 2013/0291333 A1 | 11/2013 | Grey |
| 2014/0033917 A1 | 2/2014 | Rodgers |
| 2014/0041151 A1 | 2/2014 | Ford |
| 2014/0090341 A1 | 4/2014 | Chen |
| 2014/0137364 A1 | 5/2014 | Stickney |
| 2014/0165313 A1 | 6/2014 | Hicke |
| 2014/0230179 A1 | 8/2014 | Matsubara |
| 2014/0237753 A1 | 8/2014 | Conrad |
| 2014/0237768 A1 | 8/2014 | Conrad |
| 2014/0245564 A1 | 9/2014 | Conrad |
| 2014/0373490 A1 | 12/2014 | Wuebbeling |
| 2015/0135474 A1 | 5/2015 | Gidwell |
| 2015/0216382 A1 | 8/2015 | Bower |
| 2015/0257618 A1 | 9/2015 | Bassett |
| 2015/0343366 A1 | 12/2015 | Wuebbeling |
| 2016/0174791 A1 | 6/2016 | Conrad |
| 2016/0174797 A1* | 6/2016 | Conrad .................. A47L 9/0411 15/347 |
| 2016/0175749 A1 | 6/2016 | Suda |
| 2017/0196430 A1 | 7/2017 | Machida |
| 2017/0273532 A1 | 9/2017 | Machida |
| 2018/0000302 A1 | 1/2018 | Hyun |
| 2018/0020894 A1 | 1/2018 | Sauer |
| 2018/0078106 A1 | 3/2018 | Scholten |
| 2018/0155946 A1 | 6/2018 | Londono |
| 2018/0177367 A1 | 6/2018 | Amaral |
| 2018/0199776 A1 | 7/2018 | Sato |
| 2018/0207573 A1 | 7/2018 | Perl-Olshvang |
| 2018/0368636 A1 | 12/2018 | Caldwell |
| 2019/0015840 A1 | 1/2019 | Wulfert |
| 2021/0212538 A1 | 7/2021 | Lee |
| 2022/0142440 A1 | 5/2022 | Conrad |
| 2022/0151446 A1 | 5/2022 | Conrad |
| 2023/0348169 A1 | 11/2023 | Conrad |
| 2024/0138634 A1 | 5/2024 | Conrad |
| 2024/0156317 A1 | 5/2024 | Knight |
| 2024/0180373 A1 | 6/2024 | Conrad |

FOREIGN PATENT DOCUMENTS

| | | |
|---|---|---|
| CA | 2276796 A1 | 1/2000 |
| CA | 2288544 A1 | 5/2000 |
| CA | 2258416 A1 | 7/2000 |
| CA | 2258419 A1 | 7/2000 |
| CA | 2258421 A1 | 7/2000 |
| CA | 2258422 A1 | 7/2000 |
| CA | 2258423 A1 | 7/2000 |
| CA | 2258426 A1 | 7/2000 |
| CA | 2330801 A1 | 7/2001 |
| CA | 2374961 A1 | 11/2001 |
| CA | 2338193 A1 | 7/2002 |
| CA | 2339514 A1 | 9/2002 |
| CA | 2342673 A1 | 9/2002 |
| CA | 2342993 A1 | 9/2002 |
| CA | 2391177 A1 | 12/2002 |
| CA | 2391180 A1 | 12/2002 |
| CA | 2192883 C | 2/2005 |
| CA | 2192909 C | 2/2005 |
| CA | 2492737 A1 | 11/2005 |
| CA | 2603508 A1 | 10/2006 |
| CA | 2706562 A1 | 5/2009 |
| CA | 2658014 A1 | 9/2010 |
| CA | 2658022 A1 | 9/2010 |
| CA | 2658160 A1 | 9/2010 |
| CA | 2658366 A1 | 9/2010 |
| CA | 2658397 A1 | 9/2010 |
| CA | 2658497 A1 | 9/2010 |
| CA | 2658643 A1 | 9/2010 |
| CA | 2658644 A1 | 9/2010 |
| CA | 2806339 A1 | 2/2012 |
| CA | 2821234 A1 | 6/2012 |
| CA | 3122883 A1 | 12/2022 |
| CN | 102048496 B | 3/2014 |
| CN | 107233049 A | 10/2017 |
| CN | 109846419 A | 6/2019 |
| CN | 112716358 A | 4/2021 |
| CN | 115399689 A | 11/2022 |
| CN | 117426699 A | 1/2024 |
| CN | 110037615 B | 8/2024 |

(56) References Cited

FOREIGN PATENT DOCUMENTS

| | | |
|---|---|---|
| DE | 202016104991 U1 | 12/2016 |
| EP | 1274337 A2 | 1/2003 |
| EP | 1243218 B1 | 5/2010 |
| EP | 2294961 A2 | 3/2011 |
| EP | 2783616 B1 | 5/2016 |
| EP | 4265166 A1 | 10/2023 |
| ES | 1206613 Y | 5/2018 |
| ES | 2782205 T3 | 9/2020 |
| GB | 1436403 A | 5/1976 |
| GB | 2467403 A | 8/2010 |
| GB | 2476812 B | 1/2014 |
| JP | S56130129 A | 3/1980 |
| JP | 2002045313 A | 2/2002 |
| JP | 2003180587 A | 7/2003 |
| JP | 2005034213 A | 2/2005 |
| JP | 2011172748 A | 9/2011 |
| KR | 1020070012109 A | 7/2005 |
| KR | 1020160037617 A | 9/2014 |
| WO | 2000010718 A1 | 3/2000 |

OTHER PUBLICATIONS

International Preliminary Report on Patentability, received in connection to International Patent Application No. PCT/CA2019/051431, mailed on May 6, 2021.
International Search Report and Written Opinion, received in connection to International Patent Application No. No. PCT/CA2019/051431 mailed on Jan. 2, 2020.

\* cited by examiner

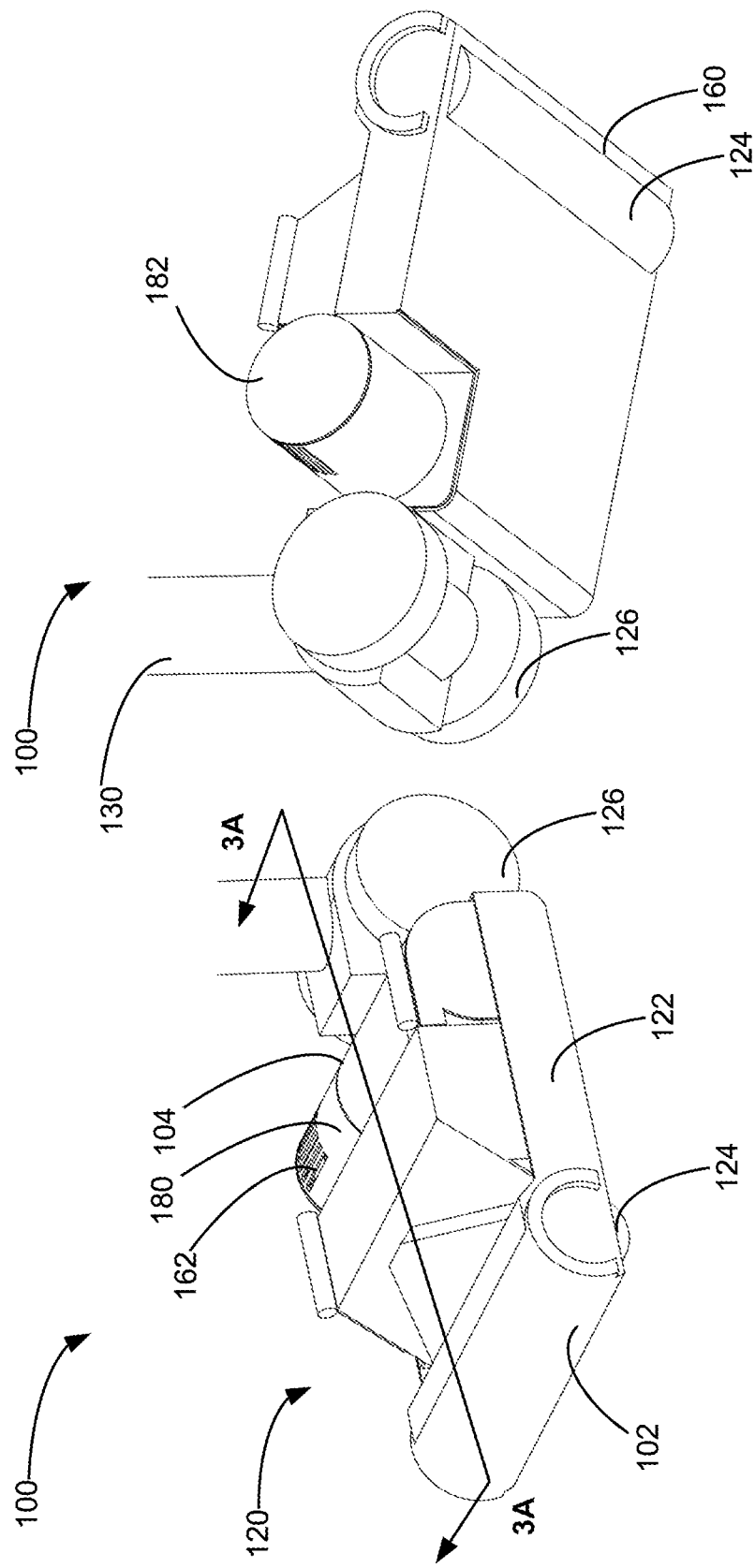

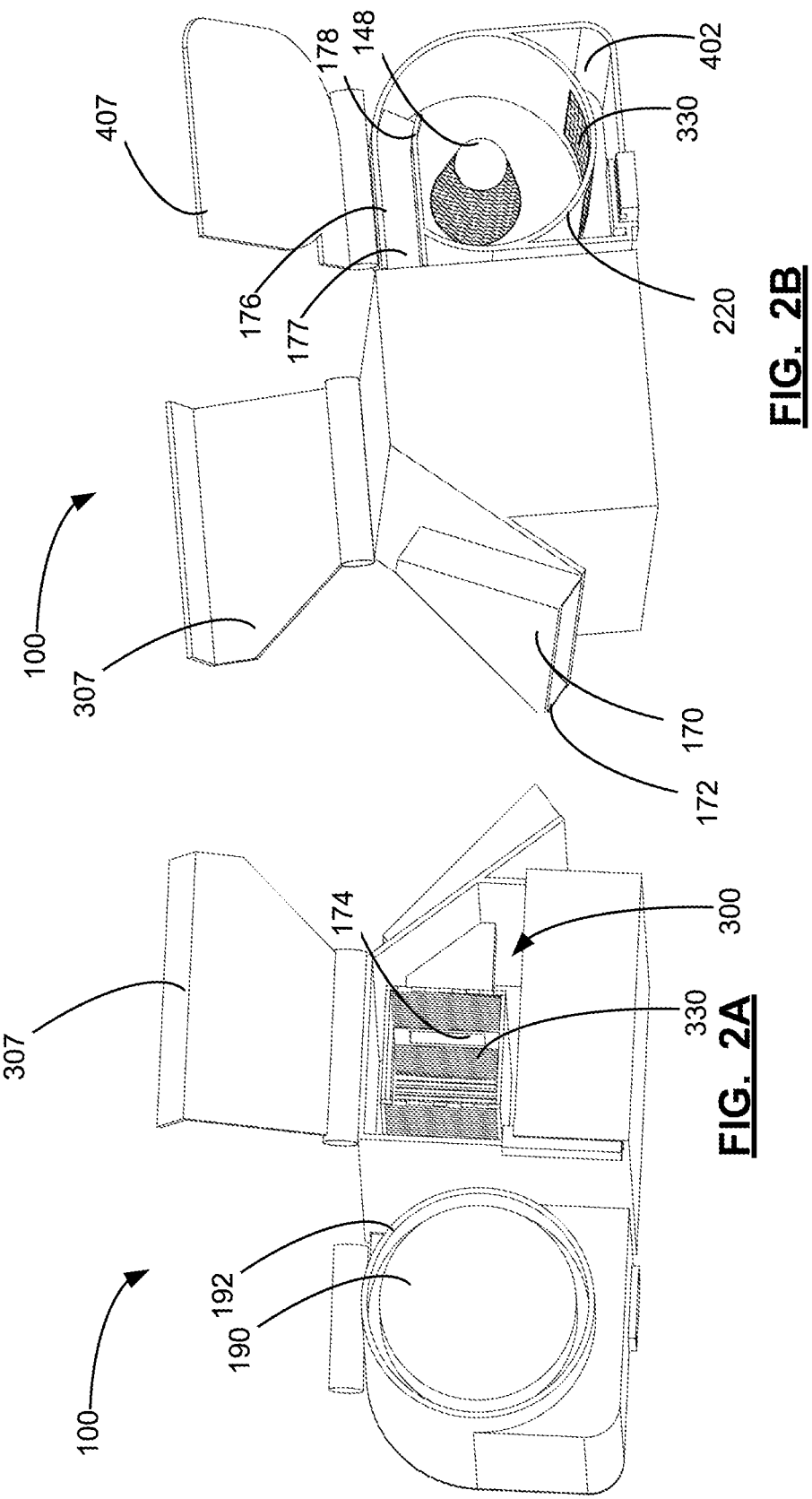

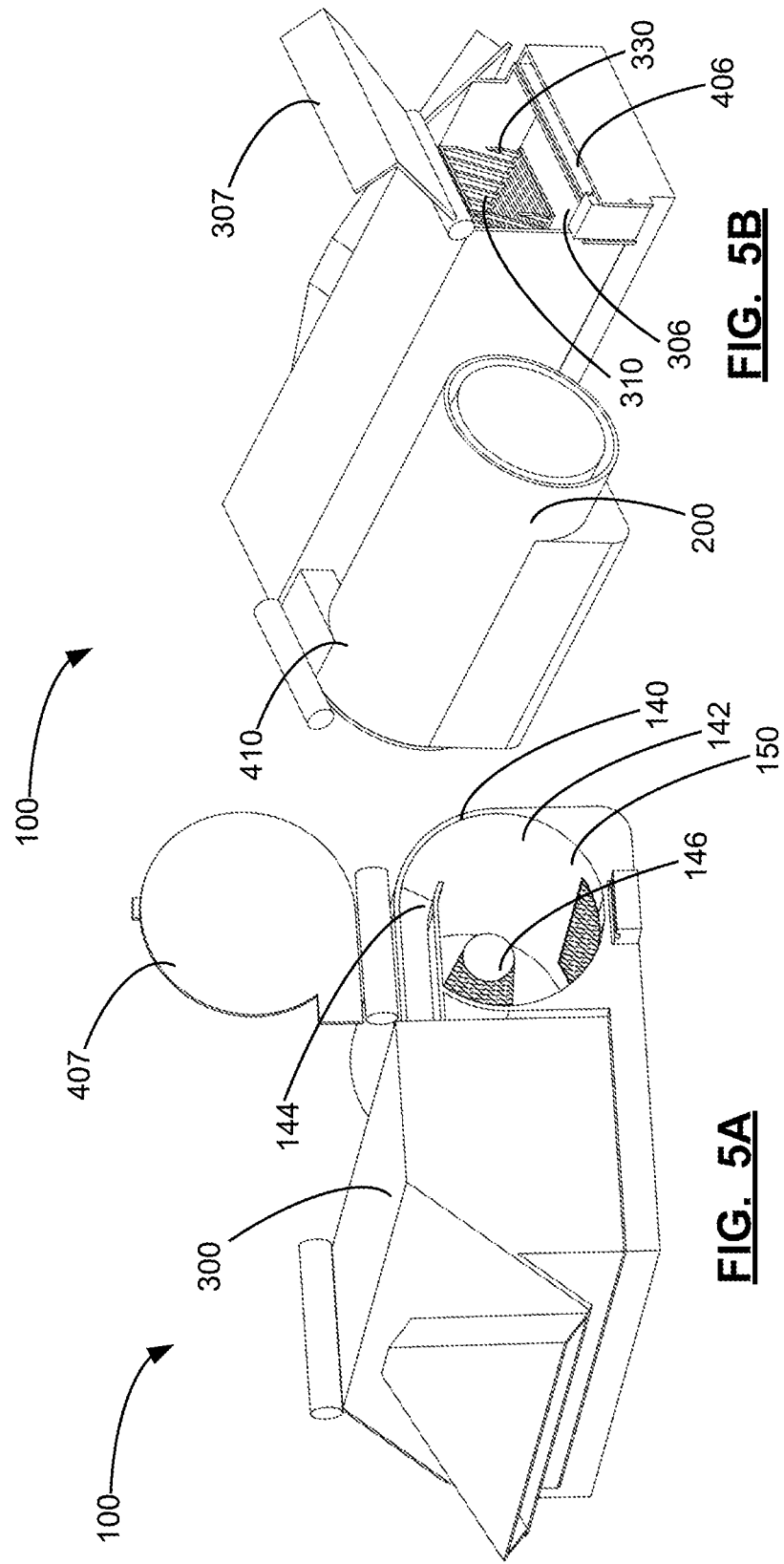

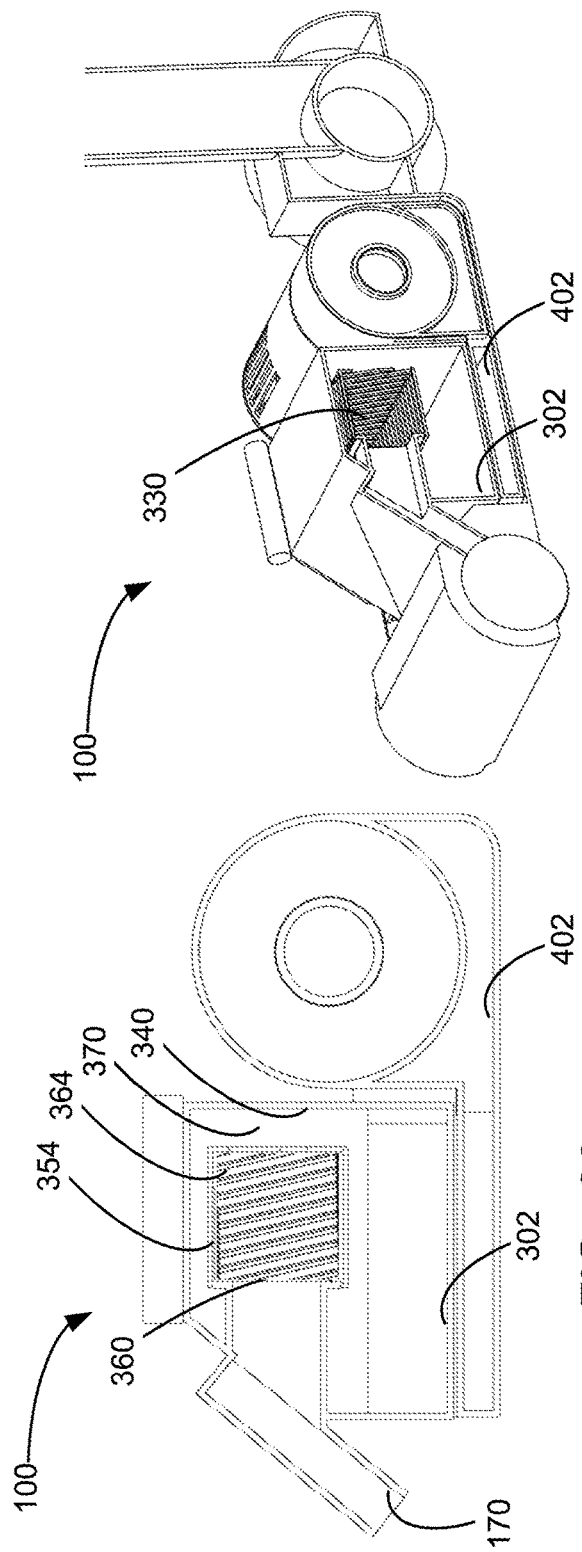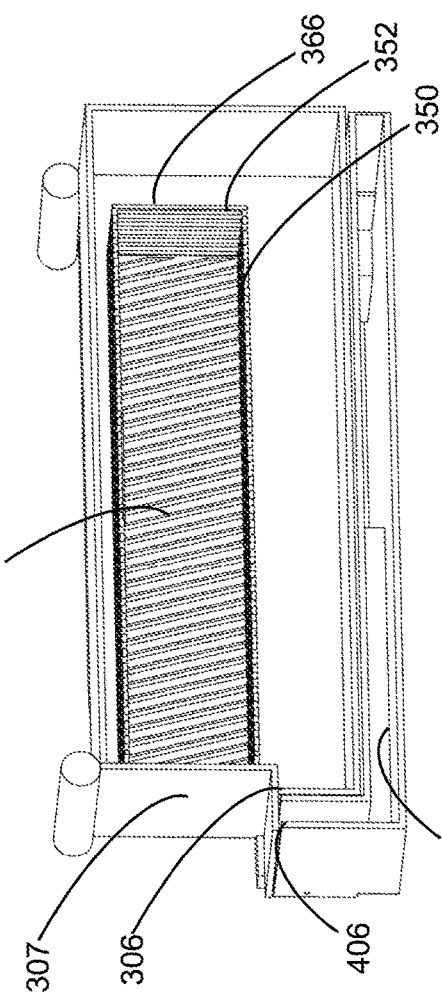

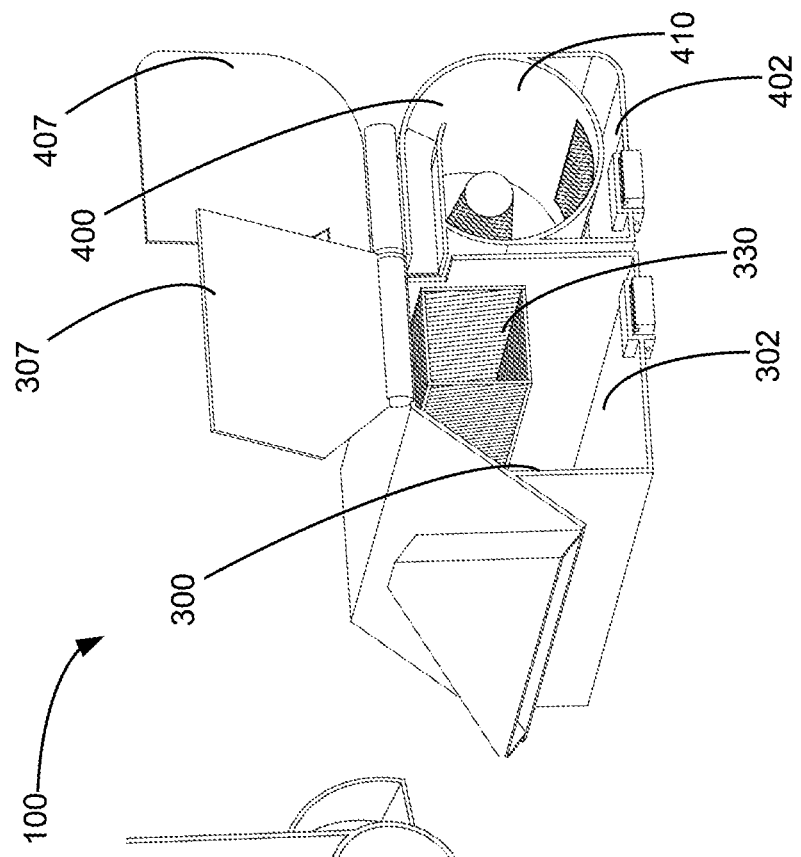
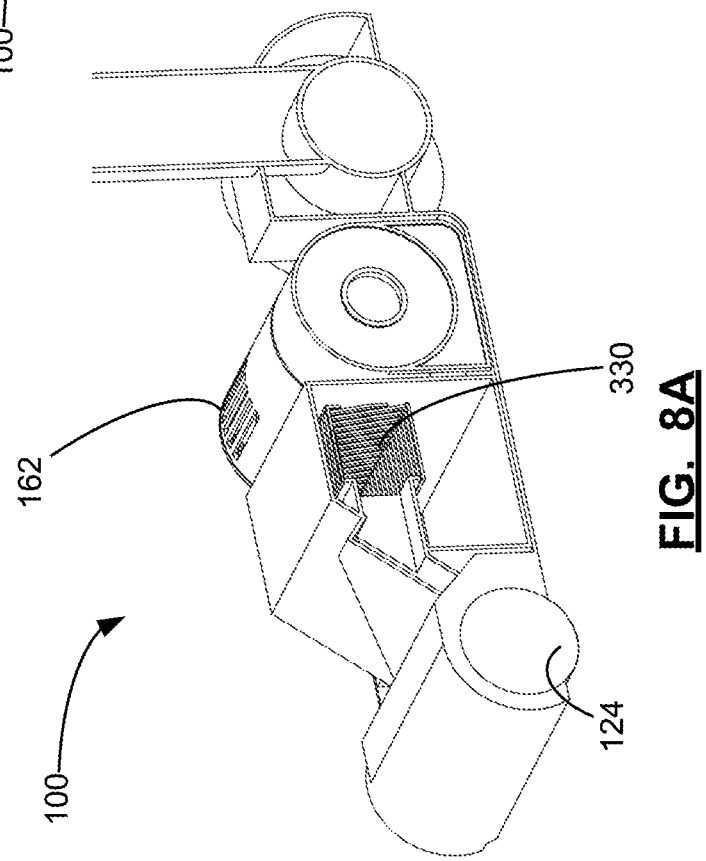
FIG. 8A
FIG. 8B

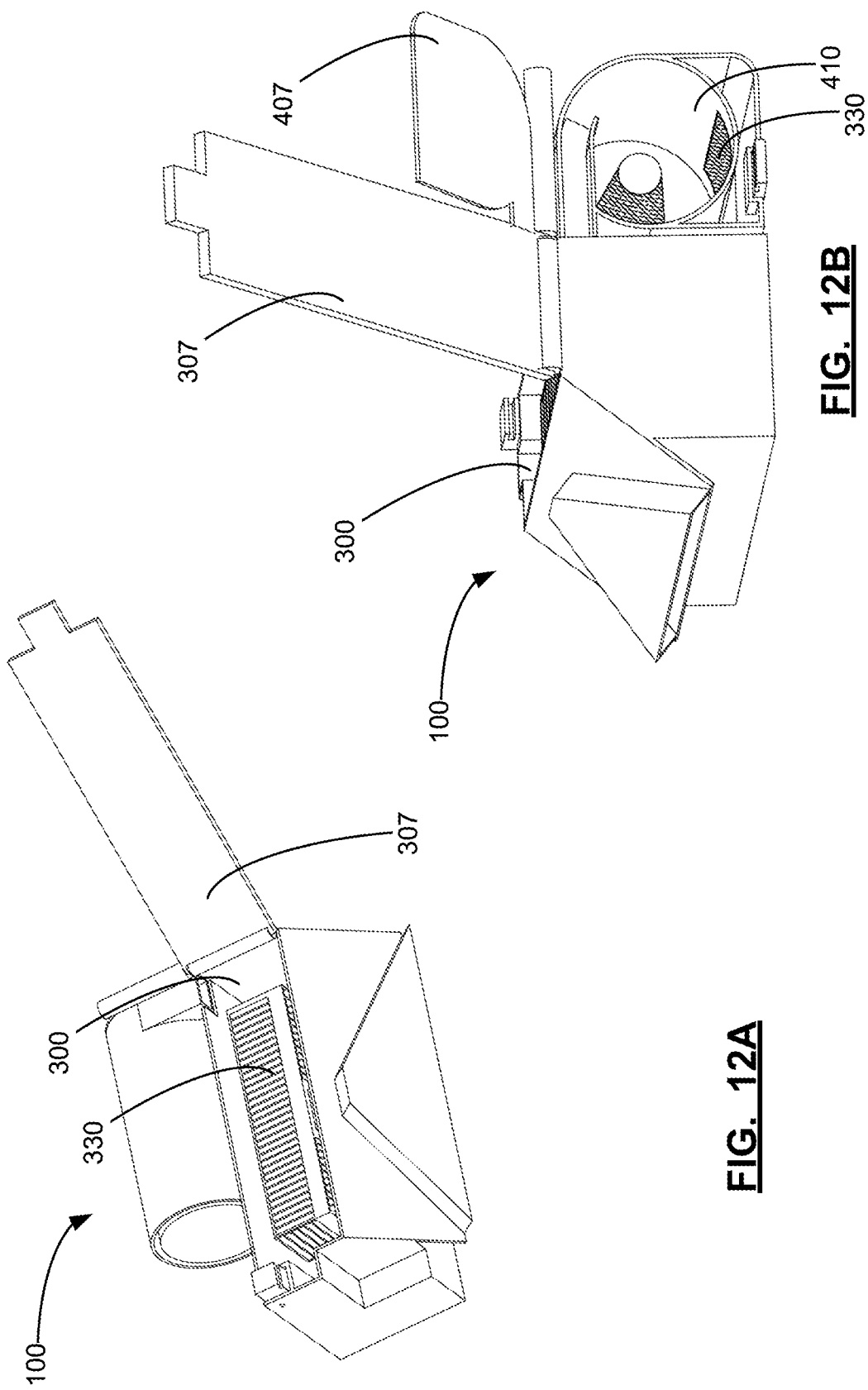

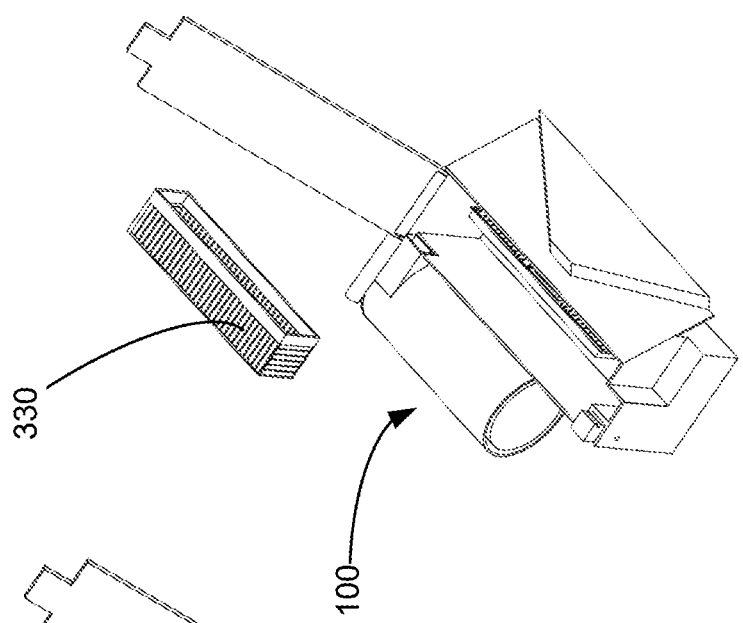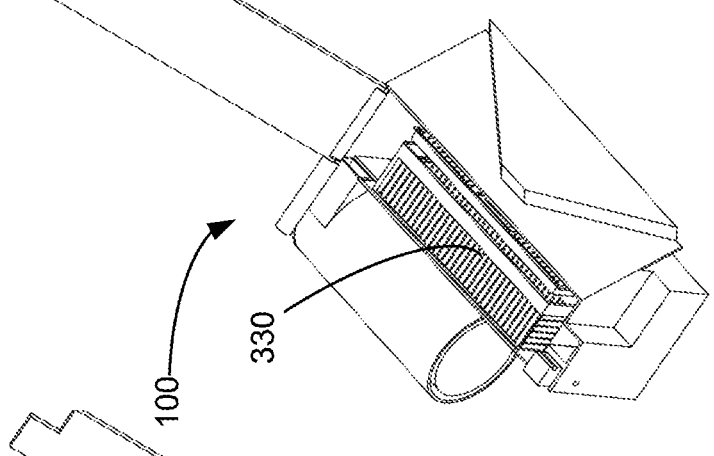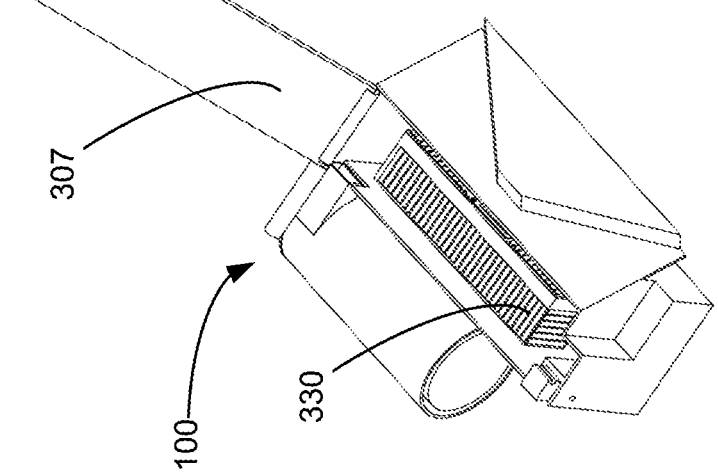

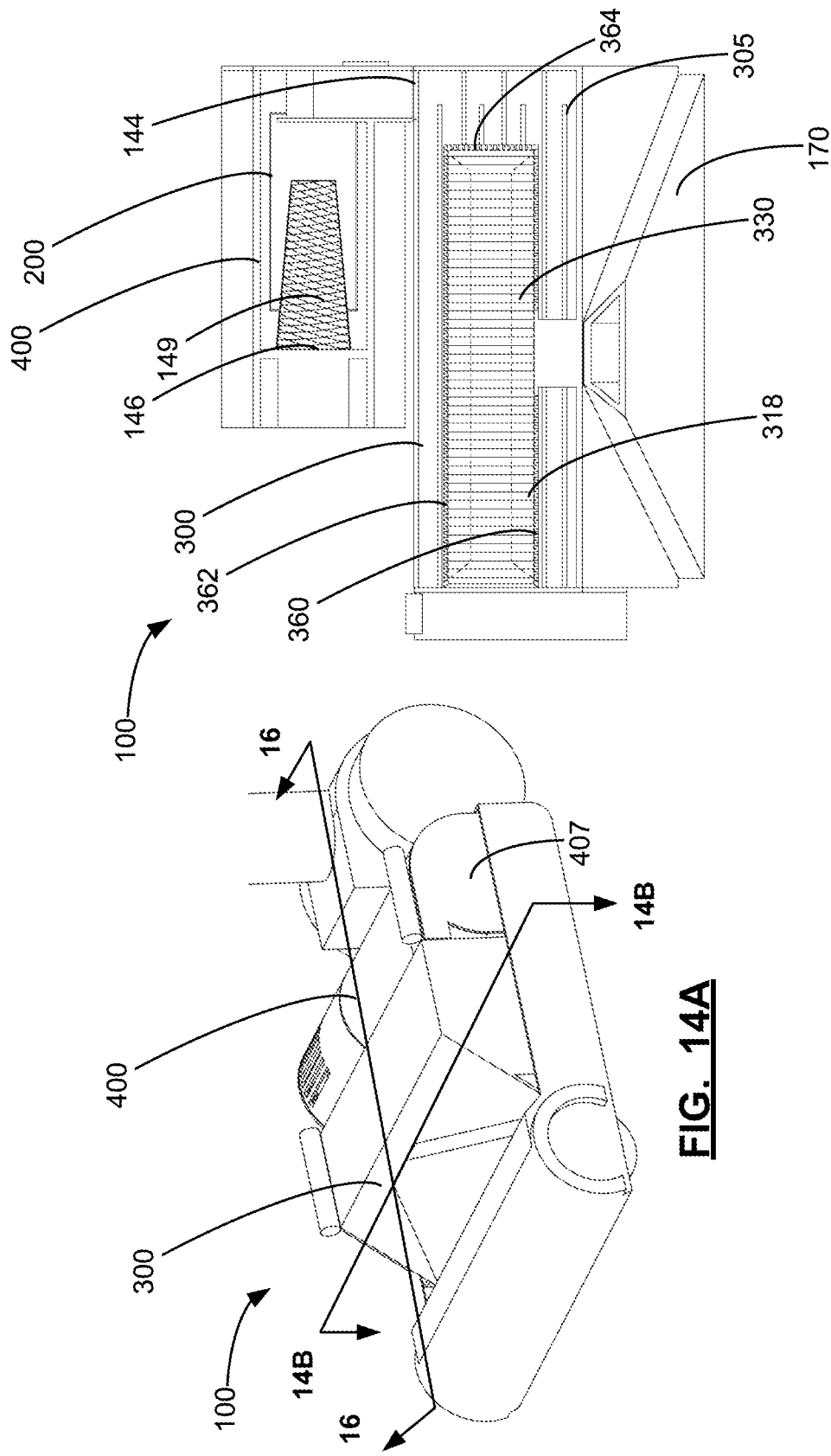

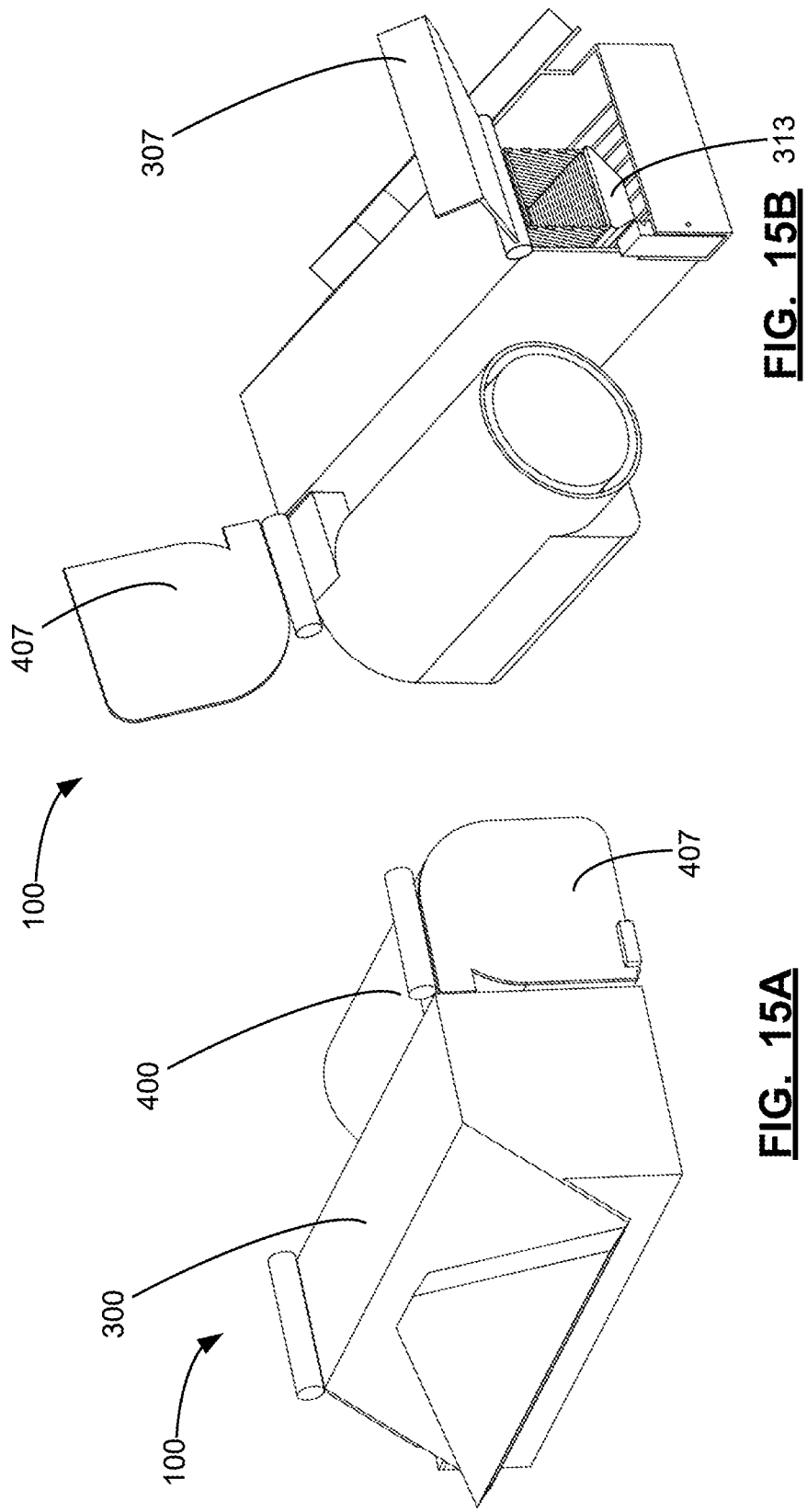

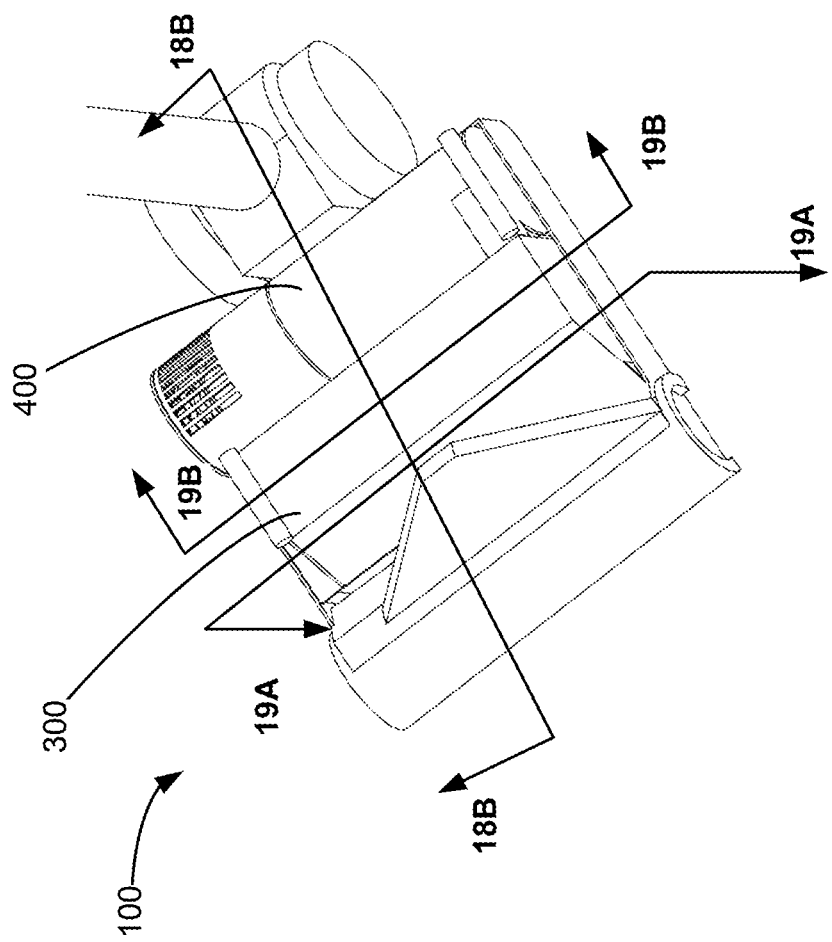

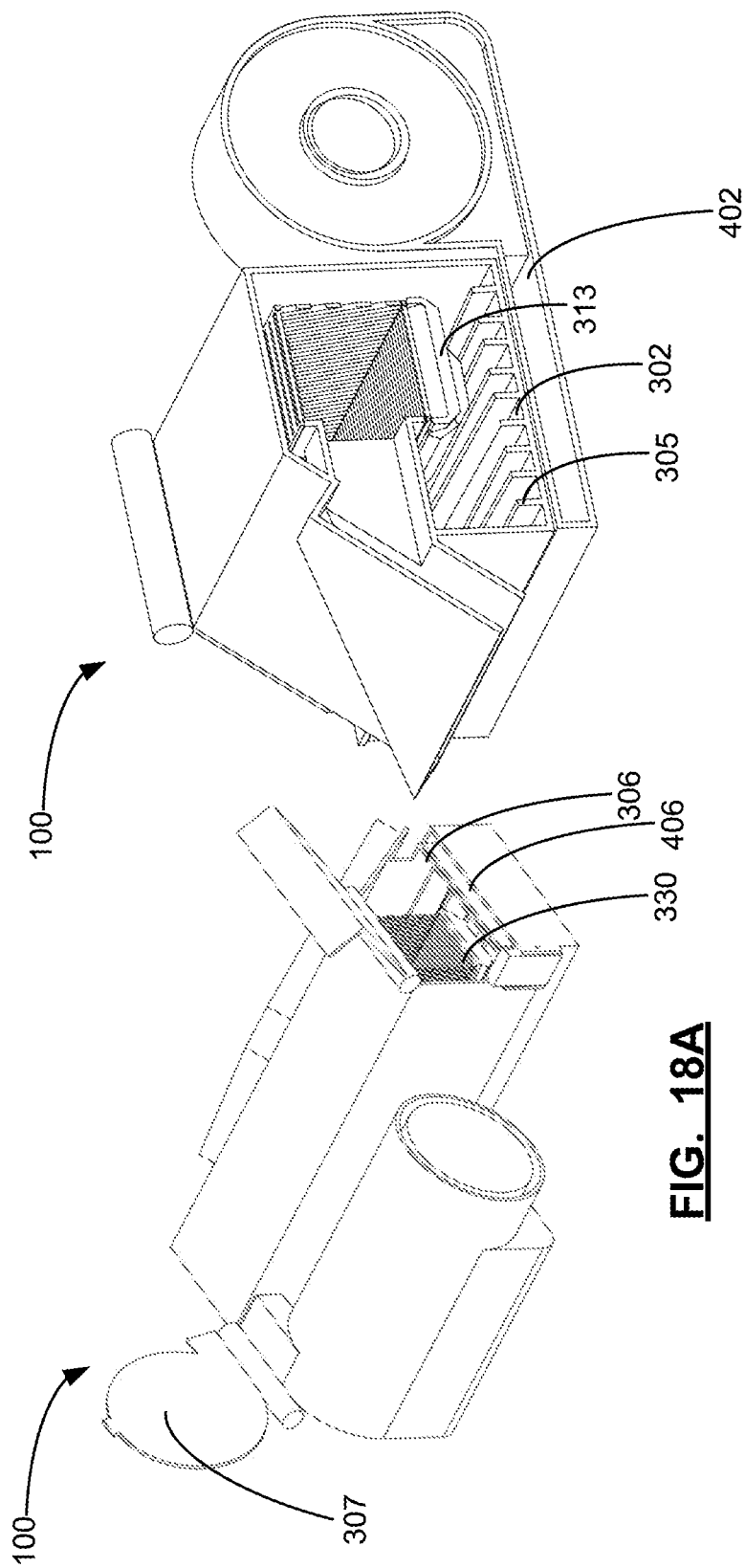

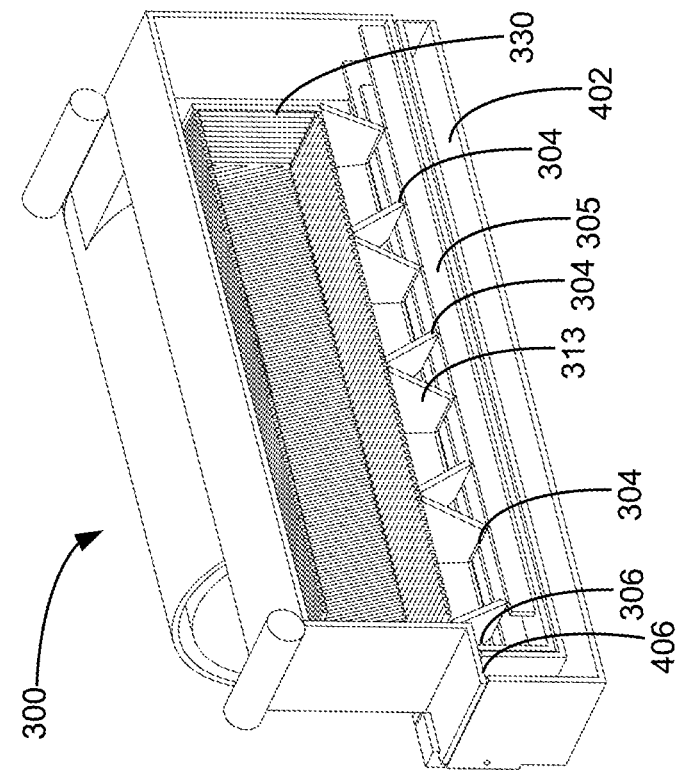
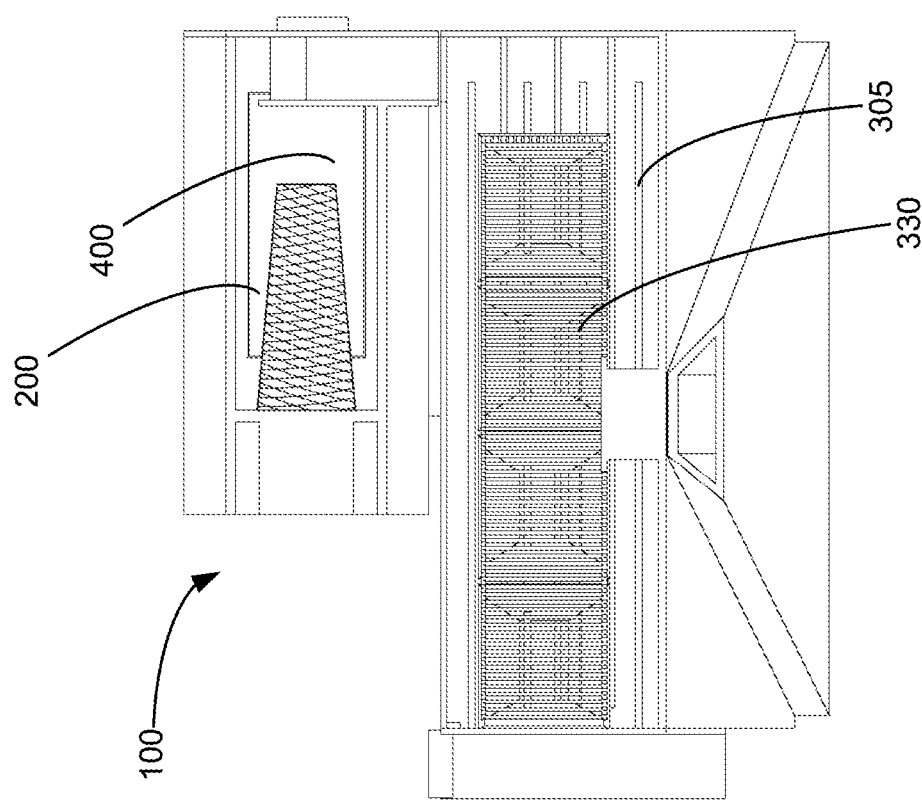
FIG. 19B
FIG. 19A

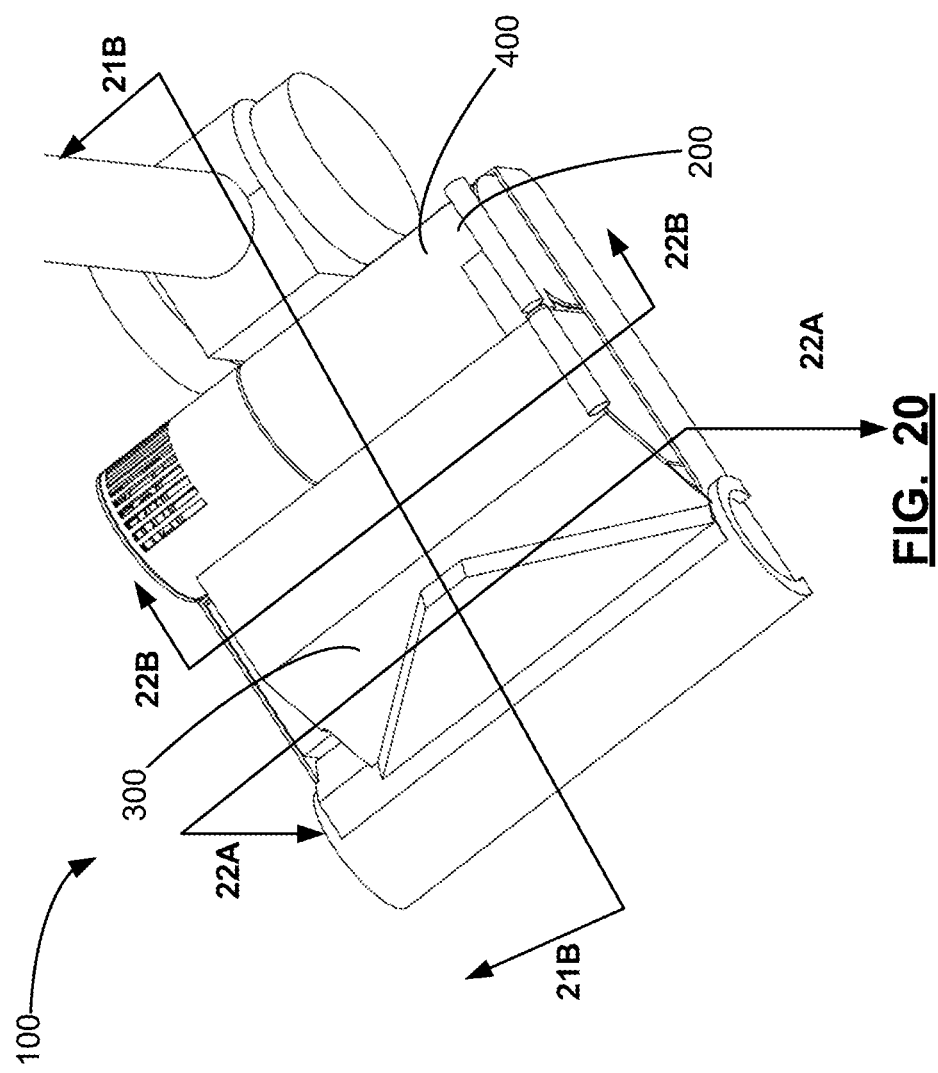

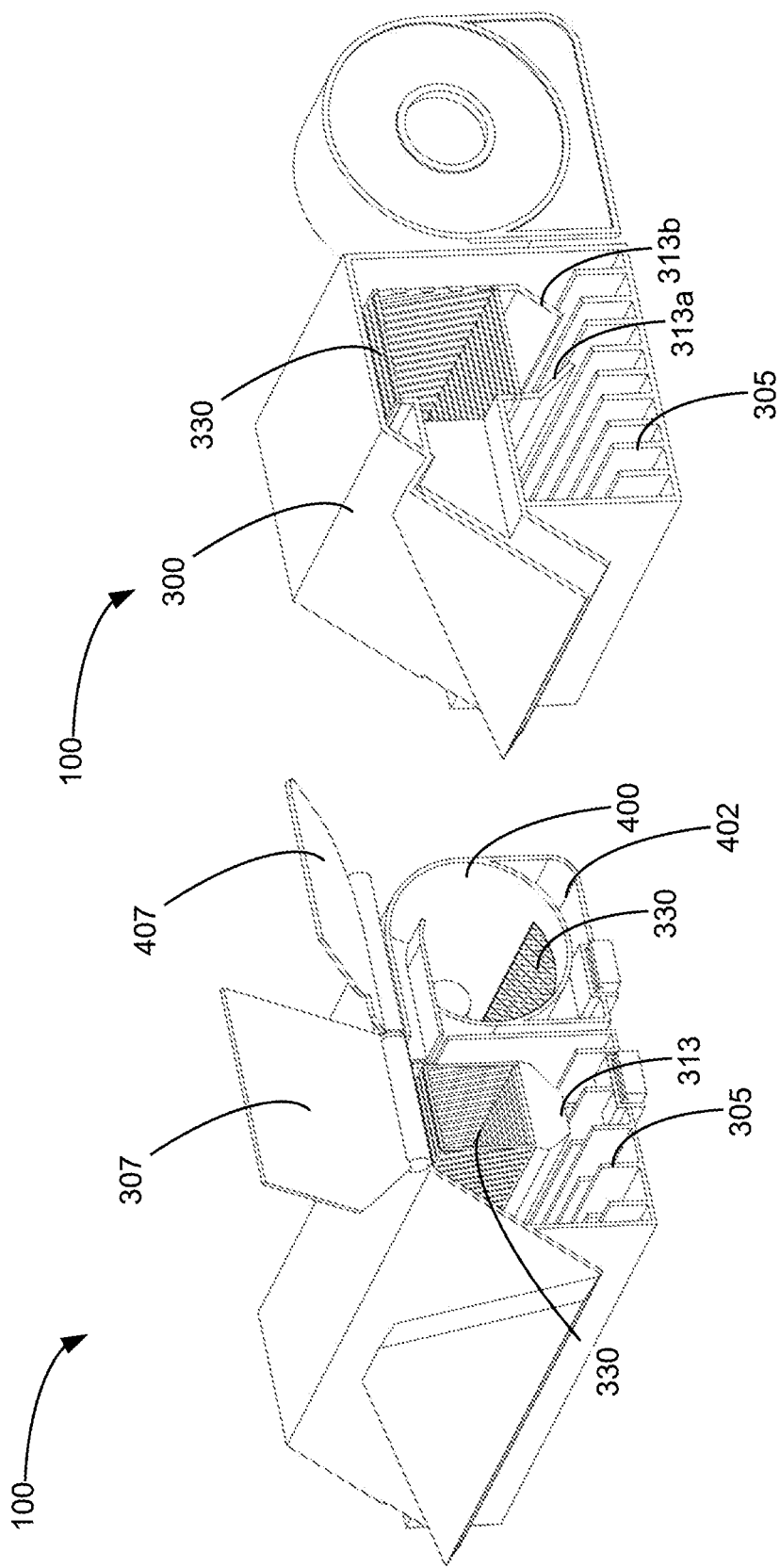

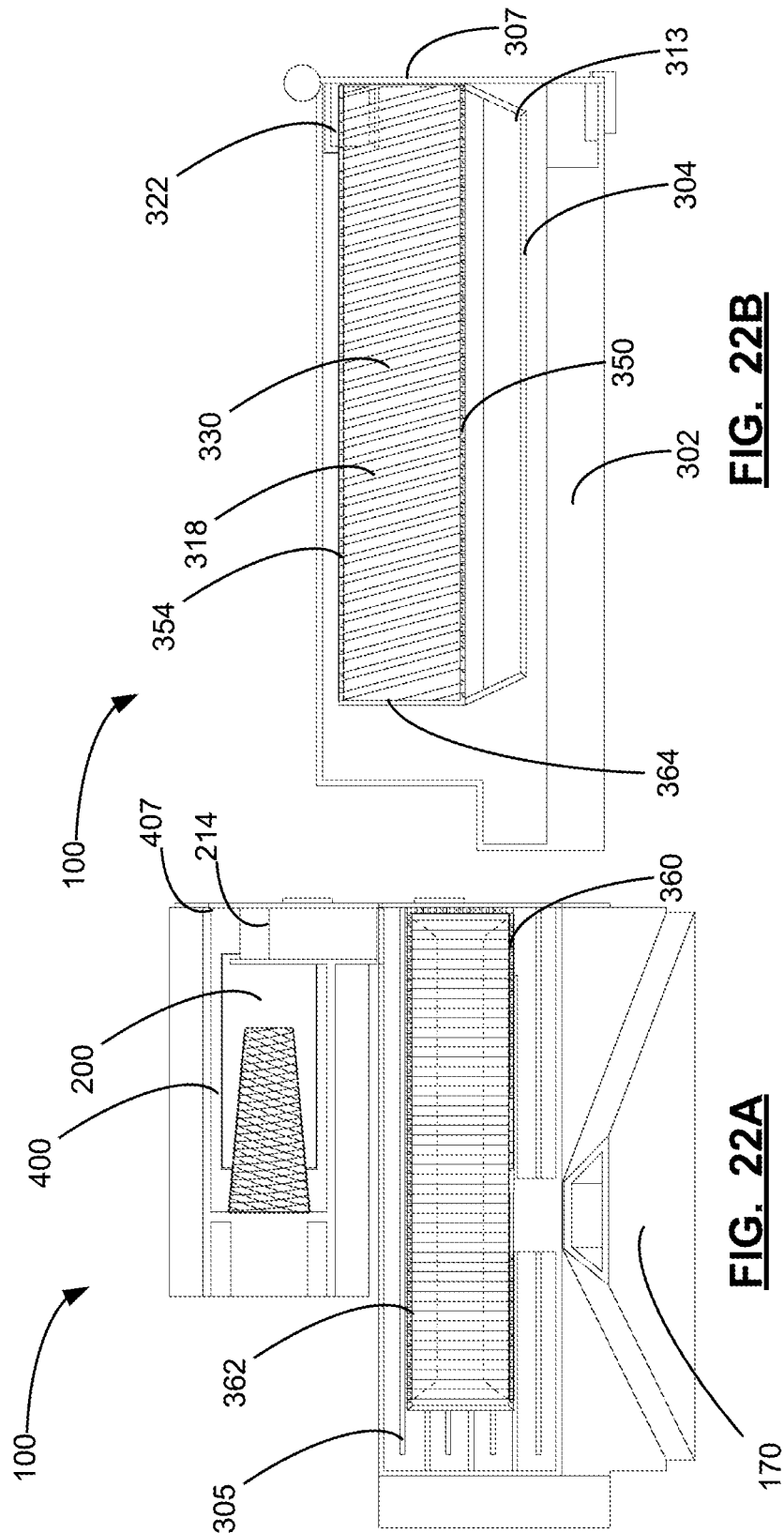

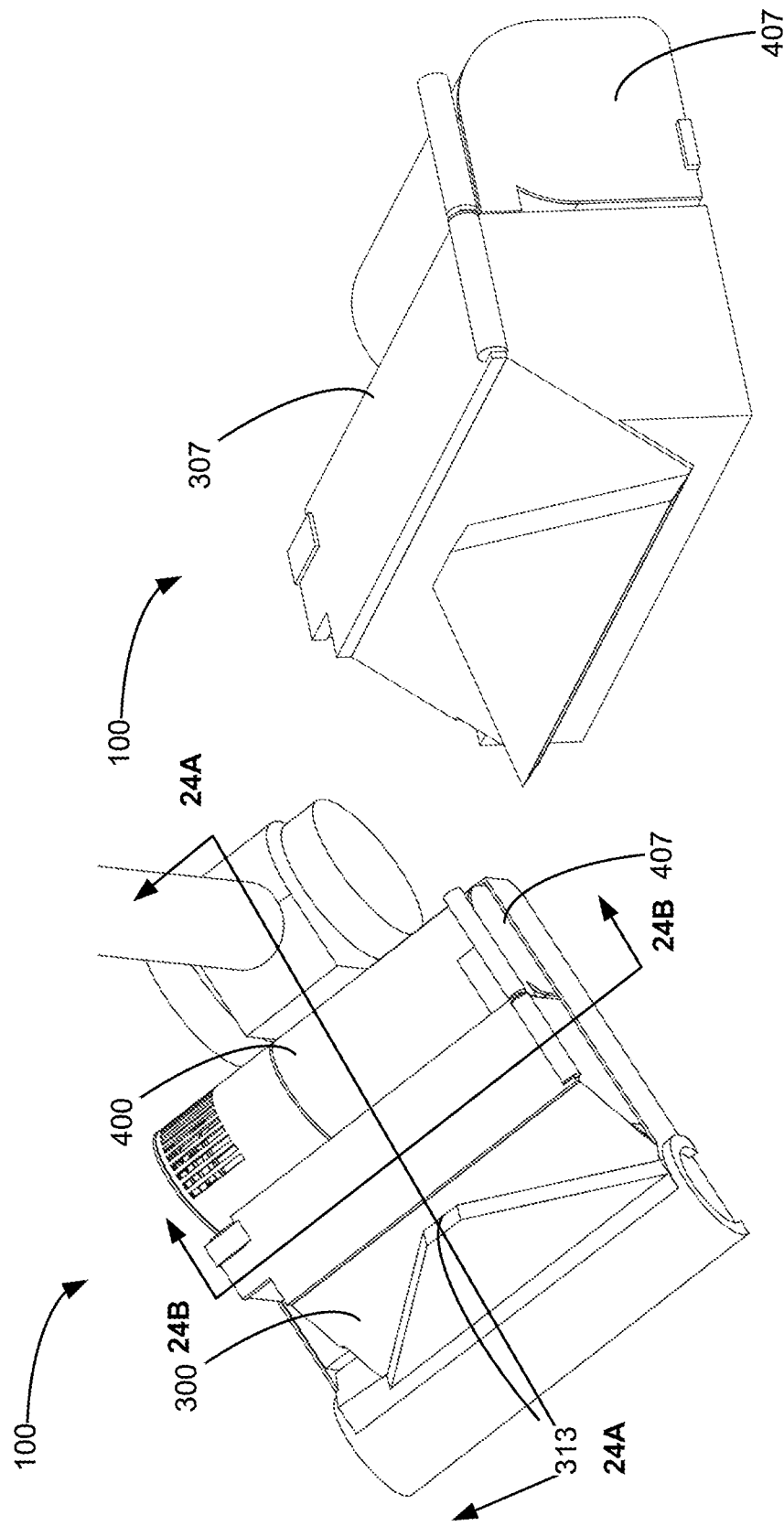

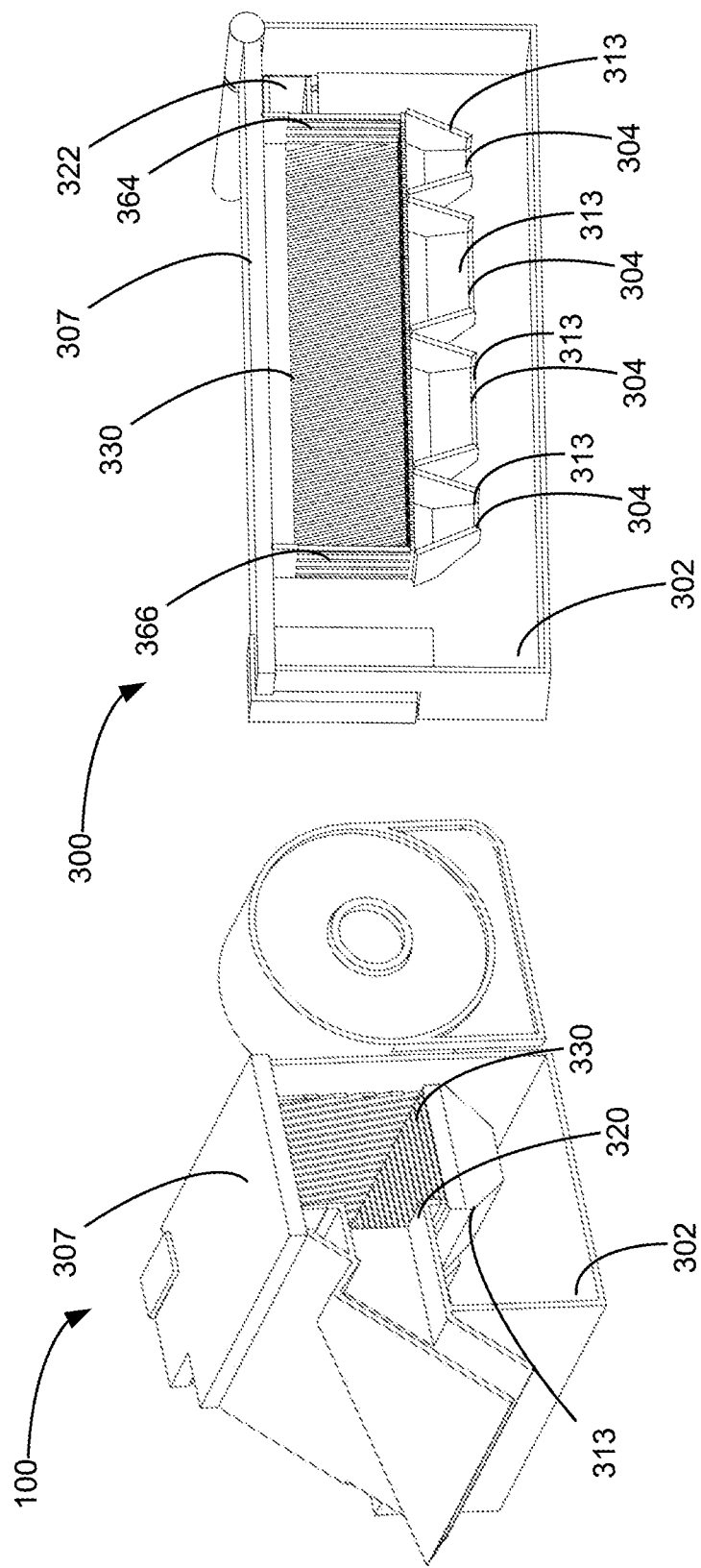

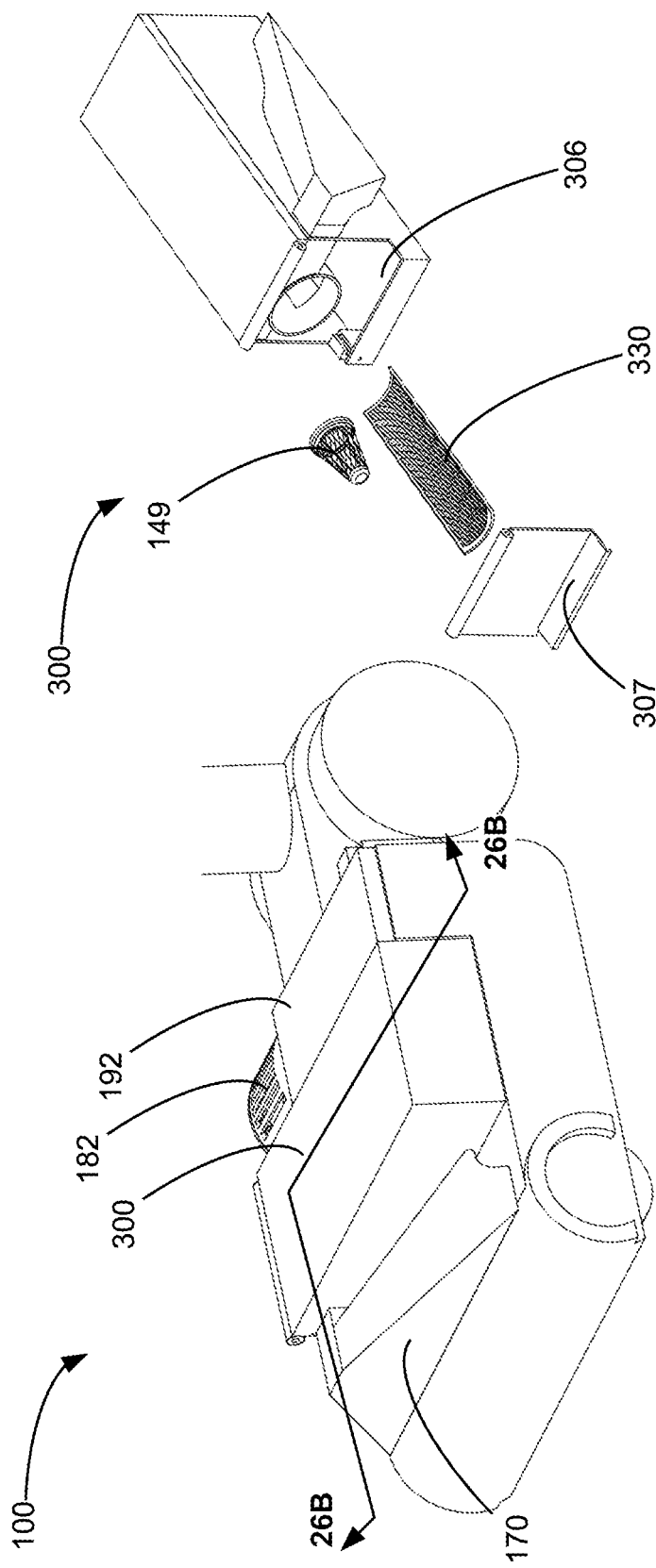

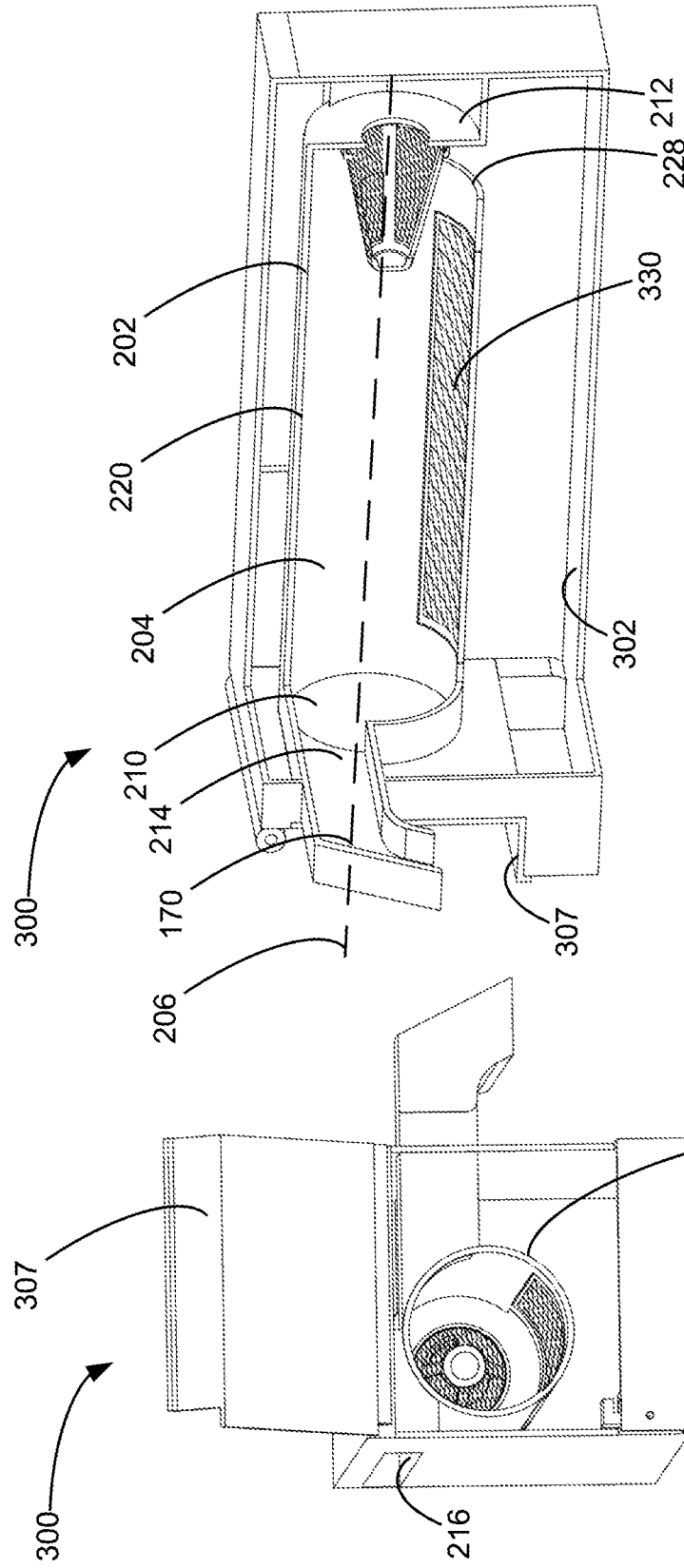

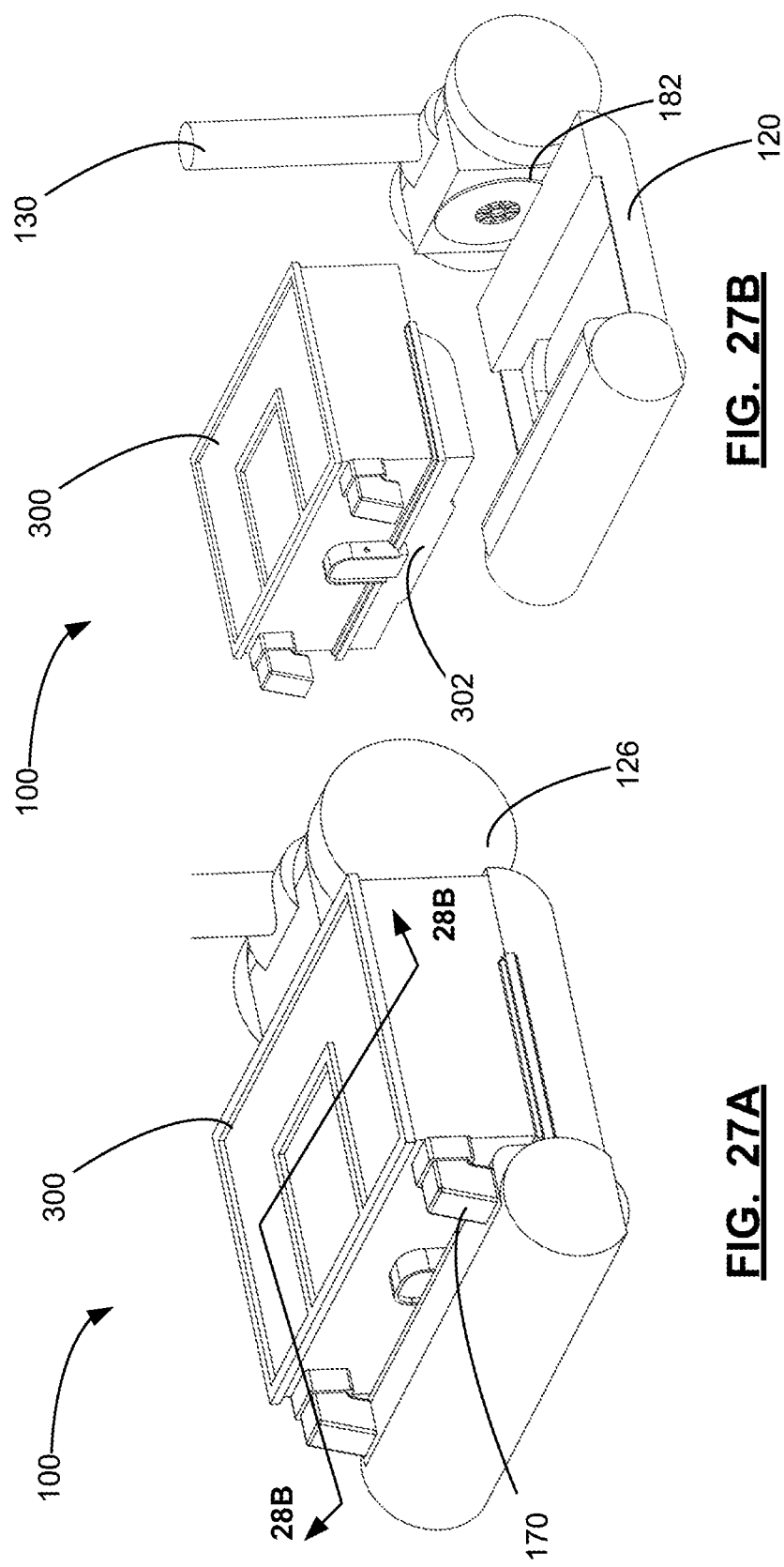

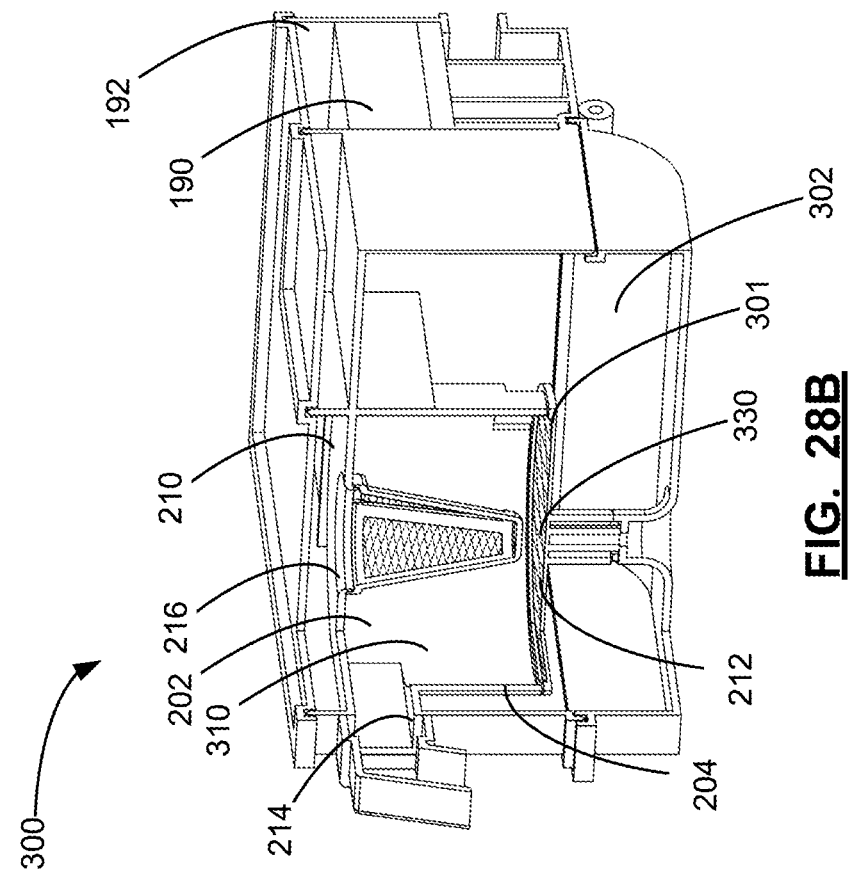
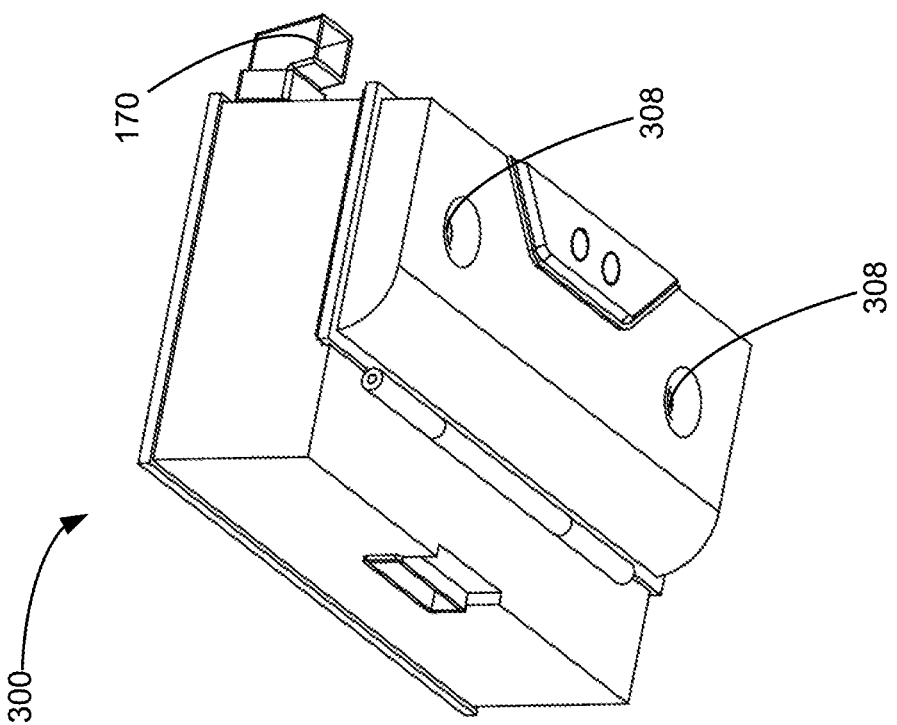
FIG. 28B
FIG. 28A

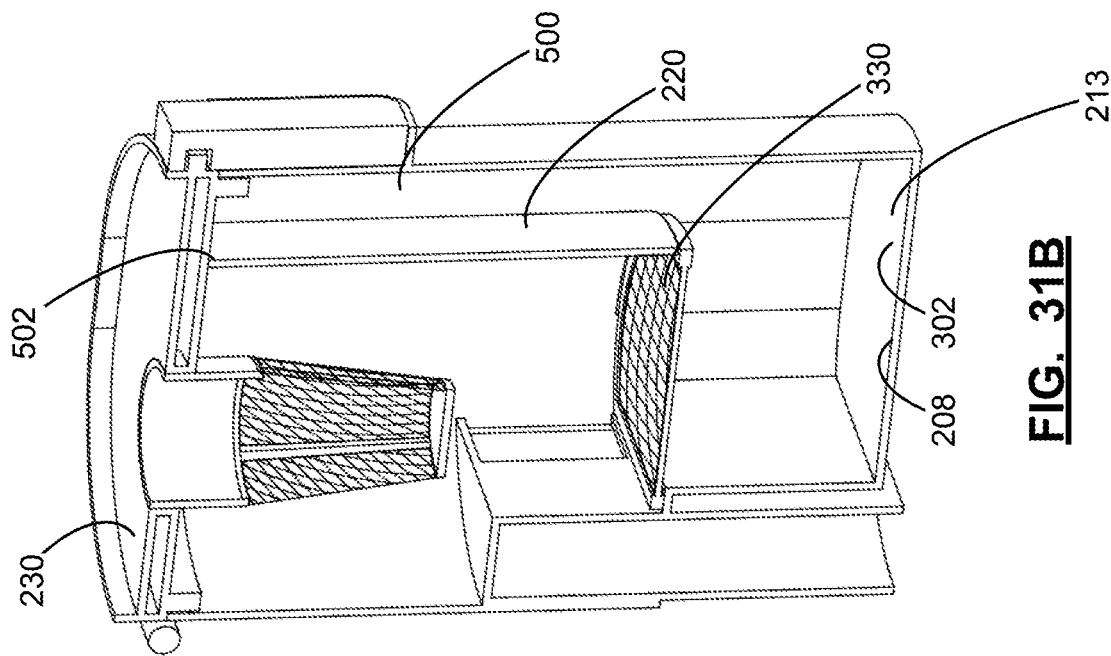
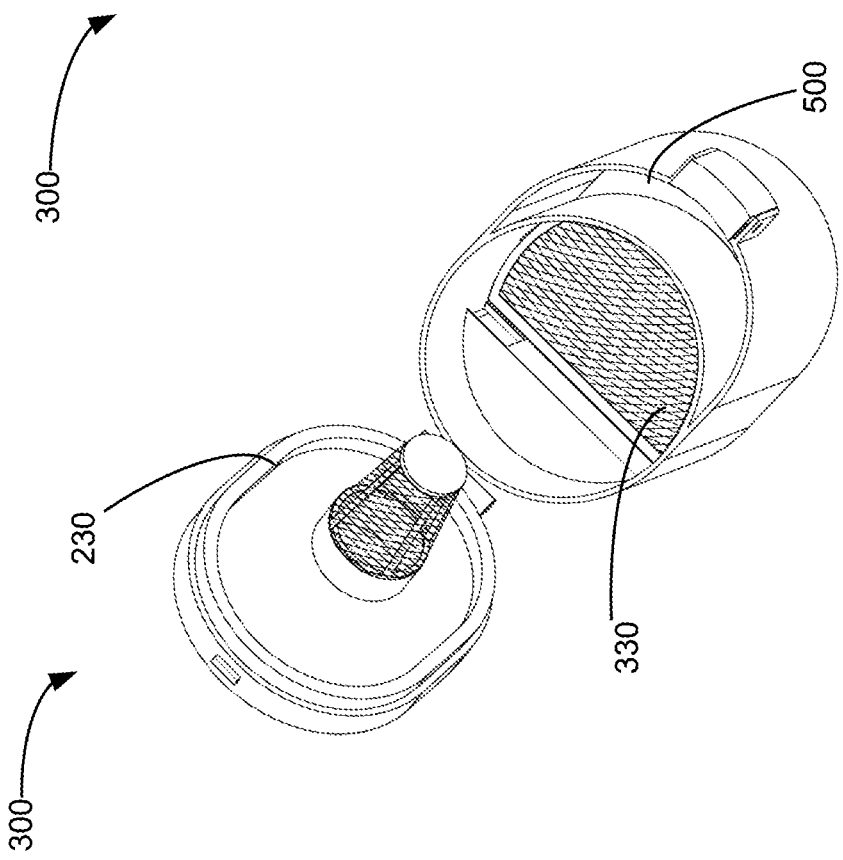
FIG. 31B
FIG. 31A

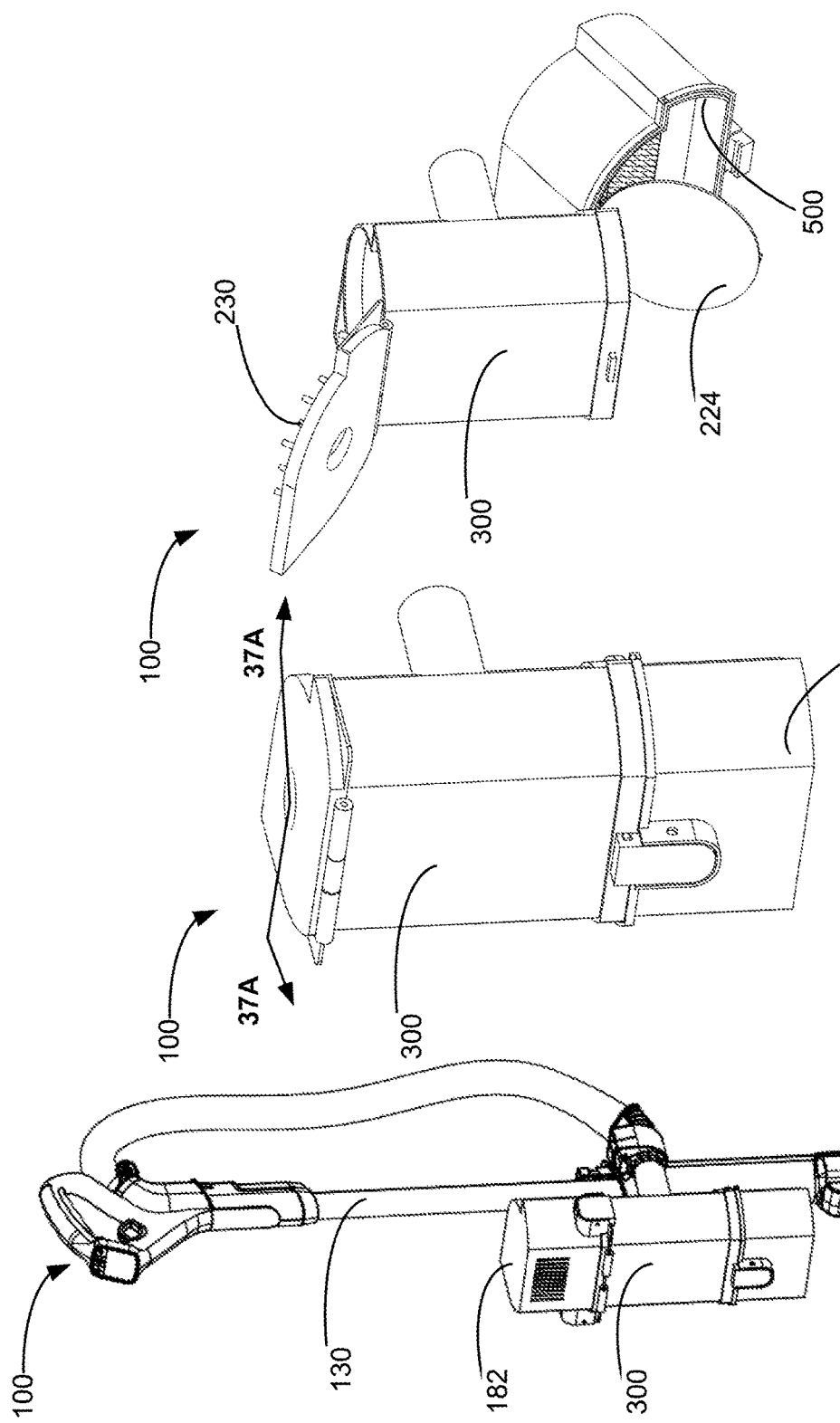

SURFACE CLEANING APPARATUS

CROSS REFERENCE TO RELATED APPLICATIONS

This application is a continuation of U.S. patent application Ser. No. 17/726,640, which was filed on Apr. 22, 2022, which itself is a continuation-in-part of U.S. patent application Ser. No. 15/852,186, which was filed on Dec. 22, 2017, and issued as U.S. Pat. No. 11,540,692 on Jan. 3, 2023, which itself claims the benefit of the filing date of U.S. Provisional Patent Application Ser. No. 62/559,151, filed Sep. 15, 2017, the specification of which is incorporated herein by reference.

FIELD

This application relates to the field of liquid separation and surface cleaning apparatus including the same.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, all-in-the-head surface cleaning apparatus, and hand carriable surface cleaning apparatus such as hand vacuums. Further, various designs for wet/dry surface cleaning apparatus have been used to collect both solid and liquid material.

SUMMARY

In accordance with one aspect of this disclosure, a surface cleaning apparatus has a surface cleaning head with a liquid separation stage and an air treatment stage that is downstream from the liquid separation stage. The liquid separation stage may comprise a liquid separation chamber having a porous separating element provided on one or more walls that define the chamber. For example, the liquid separation chamber may have one or more walls that comprise, consist essentially of or consist of a mesh material. An advantage of this design is that both separation stages are provided in the surface cleaning head, thereby providing a compact design. Accordingly, as the air passes through the surface cleaning head, the liquid may be removed from a dirty air stream prior to the air being treated by the air treatment stage. Further, liquid may be separated and collected in a different region from a separated solid storage region, thereby allowing for easier disposal the collected liquids and the collected solids.

In accordance with this aspect, there is provided a surface cleaning apparatus comprising a surface cleaning head, the surface cleaning head comprising:
  (a) a liquid separation stage having a separated liquid storage region; and,
  (b) an air treatment stage that is downstream from the liquid separation stage, the air treatment stage having a separated solid storage region.

In any embodiment, the separated liquid storage region may be emptyable independent of emptying the separated solid storage region.

In any embodiment, the separated liquid storage region and the separated solid storage region may be emptyable concurrently.

In any embodiment, the liquid separation stage may comprise a liquid separation chamber having a separated liquid outlet that is in flow communication with the separated liquid storage region, and the liquid separation chamber, the separated liquid storage region and the separated solid storage region may be emptyable concurrently.

In any embodiment, the liquid separation stage may comprise a liquid separation chamber having a separated liquid outlet that is in flow communication with the separated liquid storage region, the liquid separation chamber may comprise a non-cyclonic momentum separator and the separated liquid outlet may comprise an opening in an angled lower wall of the liquid separation chamber.

In any embodiment, the surface cleaning apparatus may further comprise a porous member overlying the opening.

In any embodiment, the porous member may overlie and may be vertically spaced from at least a portion of the angled lower wall.

In any embodiment, the liquid separation stage may comprise a liquid separation chamber comprising a lower wall, a sidewall and an upper wall, the lower, side and upper walls may define a volume having an air inlet and a partially treated air outlet, at least a portion of one or more of the lower and side walls may comprise a separated liquid outlet that is in flow communication with the separated liquid storage region, the separated liquid outlet may comprise a porous member and liquid separated as air travels through the volume may exit the volume through the separated liquid outlet and flows to the separated liquid storage region due to gravity.

In any embodiment, the porous member may form at least a portion of the lower and side walls.

In any embodiment, at least a portion of the lower and side walls may comprise a screen and at least a portion of the separated liquid storage region may be positioned under the volume.

In any embodiment, the liquid separation stage may further comprise an air impermeable wall spaced from and facing the porous member that forms at least a portion of the side wall, the liquid separation stage may have a separated liquid outlet port provided in an upper portion of the liquid separation stage and the separated water outlet port may be provided between the air impermeable wall and the porous member that forms at least a portion of the sidewall.

In any embodiment, the separated liquid outlet port may be provided in a sidewall of the liquid separation stage.

In any embodiment, the separated liquid outlet port may comprise an openable top wall of the liquid separation stage.

In any embodiment, the air inlet may be provided in a front side of the liquid separation chamber and the air outlet may be provided in a rear side of the liquid separation chamber and the air impermeable wall may be provided at the rear side of the liquid separation chamber.

In any embodiment, the liquid separation stage may have a front side having an air inlet, a rear side and first and second laterally opposed sides, the separated liquid storage region may have a lower wall having upwardly extending baffles wherein the baffles may be disposed laterally between the first and second laterally opposed sidewalls.

In any embodiment, the liquid separation stage may comprise a liquid separation chamber having a separated liquid outlet that may be in flow communication with the separated liquid storage region, at least a portion of the liquid separation chamber may overlie the separated liquid storage region, the liquid separation stage may have a front side having an air inlet, a rear side and first and second laterally opposed sides, and one of the first and second laterally opposed sides may be openable whereby the liquid separation chamber and the separated liquid storage region are opened.

In any embodiment, the separated liquid storage region may have a lower wall having upwardly extending baffles wherein the baffles may be disposed laterally between the first and second laterally opposed sidewalls.

In any embodiment, the liquid separation stage may have a front side having an air inlet, a rear side and first and second laterally opposed sides and the air treatment stage may comprise a cyclone that has a cyclone axis of rotation that extends laterally.

In any embodiment, at least a portion of the separated solid storage region may be positioned under the separated liquid storage region.

In any embodiment, the surface cleaning apparatus may further comprise a suction motor positioned in the surface cleaning head downstream of the air treatment stage.

In accordance with another aspect of this disclosure, the surface cleaning apparatus has a liquid separation stage comprising a liquid separation chamber being formed, at least in part, by a porous member (e.g., a screen) that overlies a liquid storage chamber. An advantage of this design is that liquid may be separated from solid debris, thereby allowing for an easier and cleaner emptying process.

In accordance with this aspect, there is provided a surface cleaning apparatus comprising a surface cleaning head, the surface cleaning head comprising:
(a) a liquid separation stage comprises a liquid separation chamber and a separated liquid storage region;
(b) the liquid separation chamber comprises an air inlet, a partially treated air outlet, a lower wall having a separated liquid outlet that is in flow communication with the separated liquid storage region and a volume internal the liquid separation stage that is defined by a volume lower wall, a volume sidewall and a volume upper wall, a porous member comprises at least a portion of the volume lower wall and the volume sidewall; and,
(c) the separated liquid storage region has a lower liquid collection wall that is positioned at a lower elevation than the lower wall of the liquid separation chamber, whereby liquid separated as air travels through the volume exits the volume through the separated liquid outlet and flows to the separated liquid storage region due to gravity.

In accordance with another aspect of this disclosure, the liquid separation chamber may have a lower wall with a front angled portion and a rear angled portion forming a separated liquid outlet therebetween. An advantage of this design is that the angled portions may provide a funnel like outlet for separated water, which may inhibit or reduce the separated water that has exited the chamber through the separated liquid outlet reentering the chamber.

In accordance with this aspect, there is provided a surface cleaning apparatus comprising:
(a) a liquid separation stage comprises a liquid separation chamber and a separated liquid storage region; and,
(b) the liquid separation chamber comprises an air inlet, a partially treated air outlet, a lower wall having a separated liquid outlet that is in flow communication with the separated liquid storage region and a volume internal the liquid separation stage that is defined by a volume lower wall, a volume sidewall and a volume upper wall, a porous member comprises at least a portion of the volume lower wall and the volume sidewall,
wherein the lower wall of the liquid separation chamber comprises a front portion that is angled rearwardly and downwardly and a rear portion that is angled forwardly and downwardly and the separated liquid outlet comprises an opening between the front portion and the rear portion.

In accordance with another aspect of this disclosure, a liquid separation chamber has a porous sidewall and a downflow region is provided between an air impermeable wall and the porous sidewall member, whereby liquid separated as air travels through the liquid separation chamber exits the liquid separation chamber through the porous sidewall and flows downwardly through the downflow region. An advantage of this design is that the downflow region provides an air flow region clear of solid debris that may be collected in the liquid separation stage. Accordingly, the efficiency of the surface cleaning apparatus may be improved.

In accordance with this aspect, there is provided a surface cleaning apparatus comprising:
(a) a liquid separation stage comprising a liquid separation chamber and a separated liquid storage region;
(b) the liquid separation chamber comprises an air inlet, a partially treated air outlet, a separated liquid outlet that is in flow communication with the separated liquid storage region and a volume internal the liquid separation stage that is defined by a volume lower wall, a volume sidewall and a volume upper wall, a porous member comprises at least a portion of the volume sidewall wherein an air impermeable wall is spaced from and faces the at least a portion of the volume sidewall which is comprised by the porous member,
whereby liquid separated as air travels through the volume exits the volume through the porous member and flows downwardly through a downflow region between the porous member and the air impermeable wall to the separated liquid storage region.

In accordance with another aspect of this disclosure, the liquid separation stage comprises a cyclone with a portion of the cyclone sidewall, e.g., a lower portion, formed by a porous member (e.g., a screen). An advantage of this design is that the cyclone may be used to separate liquid from the air flow and allow the separated liquid to be collected in a region separate from collected solid matter. Accordingly, the separated solid and liquids may be emptied independently. For example, the liquid may be emptied down a sink or toilet while reducing the likelihood of clogged plumbing.

In accordance with this aspect, there is provided a surface cleaning apparatus comprising:
(a) a first liquid separation stage comprising a cyclone having a cyclone axis of rotation, a cyclone first end, an axially spaced apart second end, a cyclone air inlet, a cyclone air outlet and an axially extending sidewall wherein a portion of the sidewall comprises a screen and, when the surface cleaning apparatus is in use to clean a floor, the cyclone axis of rotation extends generally horizontally; and,
(b) a first liquid collection region that is positioned at a lower elevation than the screen.

In accordance with another aspect of this disclosure, a liquid separation stage comprises a cyclone with a liquid collection region, which may be located at least partially below (underlying) the cyclone. An openable separated liquid outlet port is in communication with the liquid collection region. An advantage of this design is that the separated liquid may be emptied independently from collected solid matter.

In accordance with this aspect, there is provided a surface cleaning apparatus comprising:
- (a) a first liquid separation stage comprising a cyclone having a cyclone axis of rotation, a cyclone first end, an axially spaced apart second end, a cyclone air inlet, a cyclone air outlet, a separated liquid outlet and an axially extending sidewall, wherein when the surface cleaning apparatus is in use to clean a floor, the cyclone axis of rotation extends generally horizontally; and,
- (b) a first liquid collection region that is positioned at a lower elevation than the separated liquid outlet wherein the first liquid separation stage has an openable separated liquid outlet port that is in communication with the liquid collection region.

In accordance with another aspect of this disclosure, a liquid separation stage comprises a cyclone with a liquid collection region, which may be located at least partially below (underlying) the cyclone. An openable wall is provided which, when opened, opens both the cyclone and liquid collection region. An advantage of this design is that a user may be able to empty both the liquid and solid collection regions independently.

In accordance with this aspect, there is provided a surface cleaning apparatus comprising:
- (a) a first liquid separation stage comprising a cyclone having a cyclone axis of rotation, a cyclone first end, an axially spaced apart second end, a cyclone air inlet, a cyclone air outlet, a separated liquid outlet and an axially extending sidewall, wherein when the surface cleaning apparatus is in use to clean a floor, the cyclone axis of rotation extends generally horizontally; and,
- (b) a first liquid collection region that is positioned at a lower elevation than the separated liquid outlet, wherein the first liquid separation stage has an openable wall, the cyclone axis of rotation extends through the openable wall when the openable wall is in a closed position and the cyclone and the liquid collection region are opened when the openable wall is in an open position.

In accordance with another aspect of this disclosure, the liquid separation stage has a cyclone with a cyclone axis that extends generally vertically when a surface cleaning apparatus (e.g., an extractor) is in use. The liquid separation stage has a separated liquid outlet that includes a screen positioned at a lower end of the cyclone. An advantage of this design is that the cyclone may be used to separate both liquid and solid matter, with the liquid matter passing to a liquid collection region below the screen.

In accordance with this aspect, there is provided a surface cleaning apparatus comprising:
- (a) a first cyclonic liquid separation stage comprising a cyclone having a cyclone axis of rotation, a cyclone first end, an axially spaced apart cyclone second end, a cyclone air inlet, a cyclone air outlet, a separated liquid outlet and an axially extending sidewall, wherein when the surface cleaning apparatus is positioned on a floor in a storage position, the cyclone axis of rotation extends generally vertically; and,
- (b) a first liquid collection region,
  wherein the separated liquid outlet comprises a screen and, when the cyclone axis of rotation extends generally vertically, the screen is provided at a lower end of the cyclone and the first liquid collection region is positioned at an elevation below the screen.

In accordance with another aspect of this disclosure, the liquid separation stage has at least two cyclones in parallel with a screen forming a separated liquid outlet of each cyclone. The cyclones have a cyclone axis of rotation that extends generally vertically, with the liquid collection region underlying the at least two cyclones. An advantage of this design is that by operating in parallel, if one cyclone gets clogged with matter, the surface cleaning apparatus may continue to operate. Additionally, each cyclone may operate to separate both liquid and solid material from an airflow.

In accordance with this aspect, there is provided a surface cleaning apparatus comprising:
- (a) a first cyclonic liquid separation stage comprising at least two cyclones in parallel, each cyclone having a cyclone axis of rotation, a cyclone first end, an axially spaced apart cyclone second end, a cyclone air inlet, a cyclone air outlet, a separated liquid outlet and an axially extending sidewall, wherein when the surface cleaning apparatus is positioned on a floor in a storage position, the cyclone axis of rotation extends generally vertically; and,
- (b) a first liquid collection region,
  wherein the separated liquid outlet comprises a screen provided in each cyclone and, when the cyclone axis of rotation extends generally vertically, the first liquid collection region underlies the at least two cyclones.

In accordance with another aspect of this disclosure, a surface cleaning head comprises a liquid separation stage that has at least two cyclones in parallel and a per-motor filter housing positioned rearward of the at least two cyclones. An advantage of this design is that using two or more cyclones in parallel may enable the height of the surface cleaning head to be reduced thereby providing a surface cleaning head (such as for an extractor) wherein the surface cleaning head includes the liquid separation stage and has a low profile to pass under furniture.

In accordance with this aspect, there is provided a surface cleaning apparatus comprising a surface cleaning head, the surface cleaning head comprising:
- (a) a front end, a rear end and first and second laterally opposed sides;
- (b) a first cyclonic liquid separation stage comprising at least two cyclones in parallel, each cyclone having a cyclone axis of rotation, a cyclone first end, an axially spaced apart cyclone second end, a cyclone air inlet, a cyclone air outlet, a separated liquid outlet and an axially extending sidewall, wherein when the surface cleaning apparatus is positioned on a floor in a storage position, the cyclone axis of rotation extends generally vertically;
- (c) a first liquid collection region; and,
- (d) a pre-motor filter housing in which a pre-motor filter media is positionable, the pre-motor filter housing is positioned in the surface cleaning head rearward of the at least two cyclones.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 1A is a front perspective view of a surface cleaning apparatus in accordance with an embodiment;

FIG. 1B is a bottom perspective view of the surface cleaning apparatus of FIG. 1A;

FIG. 2A is a side view of the surface cleaning apparatus of FIG. 1A with a first door opened;

FIG. 2B is another side view of the surface cleaning apparatus of FIG. 1A with first and second doors opened;

FIG. 5A is a front perspective view of the liquid separation stage and the air treatment assembly of the surface cleaning apparatus of FIG. 4 with a first door opened;

FIG. 5B is a rear perspective view of the liquid separation stage and the air treatment assembly of the surface cleaning apparatus of FIG. 4 with a second door opened;

FIG. 6A is a side cross-sectional view of the surface cleaning apparatus of FIG. 4, taken along the line 6A-6A in FIG. 4;

FIG. 6B is a perspective cross-sectional view of the surface cleaning apparatus of FIG. 4, taken along the line 6A-6A in FIG. 4;

FIG. 6C is a cross-sectional view of a liquid separation stage of the surface cleaning apparatus of FIG. 4, taken along the line 6C-6C in FIG. 4:

FIG. 8A is a perspective cross-sectional view of the surface cleaning apparatus of FIG. 7A, taken along the line 8A-8A in FIG. 7A;

FIG. 8B is a front perspective view of the surface cleaning apparatus of FIG. 7A with a first and second door opened;

FIG. 12A is a top perspective view of the liquid separation stage and the air treatment assembly of the surface cleaning apparatus of FIG. 11 with a first door opened;

FIG. 12B is a side perspective view of the liquid separation stage and the air treatment assembly of the surface cleaning apparatus of FIG. 11 with first and second doors opened;

FIG. 13A-13C are top perspective views of the liquid separation stage and the air treatment assembly of the surface cleaning apparatus of FIG. 11 with a porous member in various states of removal;

FIG. 14A is a front perspective view of another surface cleaning apparatus;

FIG. 14B is a top cross-sectional view of the surface cleaning apparatus of FIG. 14A, taken along the line 14B-14B in FIG. 14A;

FIG. 15A is a front perspective view of the liquid separation stage and the air treatment assembly of the surface cleaning apparatus of FIG. 14A with both doors closed;

FIG. 15B is a rear perspective view of the liquid separation stage and the air treatment assembly of the surface cleaning apparatus of FIG. 14A with both doors opened;

FIG. 17 is a top perspective view of another surface cleaning apparatus;

FIG. 18A is a rear perspective view of the liquid separation stage and the air treatment assembly of the surface cleaning apparatus of FIG. 17 with both doors opened;

FIG. 18B is a side cross-sectional view of the liquid separation stage and the air treatment assembly of the surface cleaning apparatus of FIG. 17, taken along the line 18B-18B in FIG. 17;

FIG. 19A is a top cross-sectional view of the liquid separation stage and the air treatment assembly of the surface cleaning apparatus of FIG. 17A, taken along the line 19A-19A in FIG. 17;

FIG. 19B is a front cross-sectional view of the liquid separation stage and the air treatment assembly of the surface cleaning apparatus of FIG. 17, taken along line 19B-19B in FIG. 17;

FIG. 20 is a top perspective view of another surface cleaning apparatus;

FIG. 21A is a side perspective view of the liquid separation stage and the air treatment assembly of the surface cleaning apparatus of FIG. 20 with both doors opened;

FIG. 21B is a side cross-sectional view of the liquid separation stage and the air treatment assembly of the surface cleaning apparatus of FIG. 20, taken along the line 21B-21B in FIG. 20;

FIG. 22A is a top cross-sectional view of the liquid separation stage and the air treatment assembly of the surface cleaning apparatus of FIG. 20, taken along the line 22A-22A in FIG. 20;

FIG. 22B is a front cross-sectional view of the liquid separation stage and the air treatment assembly of the surface cleaning apparatus of FIG. 20, taken along line 22B-22B in FIG. 20;

FIG. 23A is a top perspective view of another surface cleaning apparatus;

FIG. 23B is a side perspective view of the surface cleaning apparatus of FIG. 23A with both doors closed;

FIG. 24A is a front cross-sectional view of the liquid separation stage and the air treatment assembly of the surface cleaning apparatus of FIG. 23A, taken along the line 24A-24A in FIG. 23A;

FIG. 24B is a front cross-sectional view of the liquid separation stage and the air treatment assembly of the surface cleaning apparatus of FIG. 23A, taken along the line 24B-24B in FIG. 23A;

FIG. 25A is a front perspective view of another surface cleaning apparatus;

FIG. 25B is an exploded view of the liquid separation stage of the surface cleaning apparatus of FIG. 25A;

FIG. 26A is a side view of the liquid separation stage of the surface cleaning apparatus of FIG. 25A with a door opened;

FIG. 26B is a front cross-sectional view of the liquid separation stage of the surface cleaning apparatus of FIG. 25A, taken along the line 26B-26B in FIG. 25A;

FIG. 27A is a front perspective view of another surface cleaning apparatus;

FIG. 27B is a front perspective view of the surface cleaning apparatus of FIG. 27A with a liquid separation stage removed;

FIG. 28A is a bottom perspective view of the liquid separation stage of the surface cleaning apparatus of FIG. 27A;

FIG. 28B is a front cross-sectional view of the liquid separation stage of the surface cleaning apparatus of FIG. 27A, taken along the line 28B-28B in FIG. 27A;

FIG. 31A is a top perspective view of the liquid separation stage of the surface cleaning apparatus of FIG. 30A with the door opened;

FIG. 31B is a side cross-sectional view of the liquid separation stage of the surface cleaning apparatus of FIG. 30A, taken along the line 31B-31B in FIG. 30B;

FIG. 36A is a front perspective view of another surface cleaning apparatus;

FIG. 36B is a front perspective view of the liquid separation stage of the surface cleaning apparatus of FIG. 36A with both doors closed;

FIG. 36C is a front perspective view of the liquid separation stage of the surface cleaning apparatus of FIG. 36A with both doors opened;

Figure 3A:
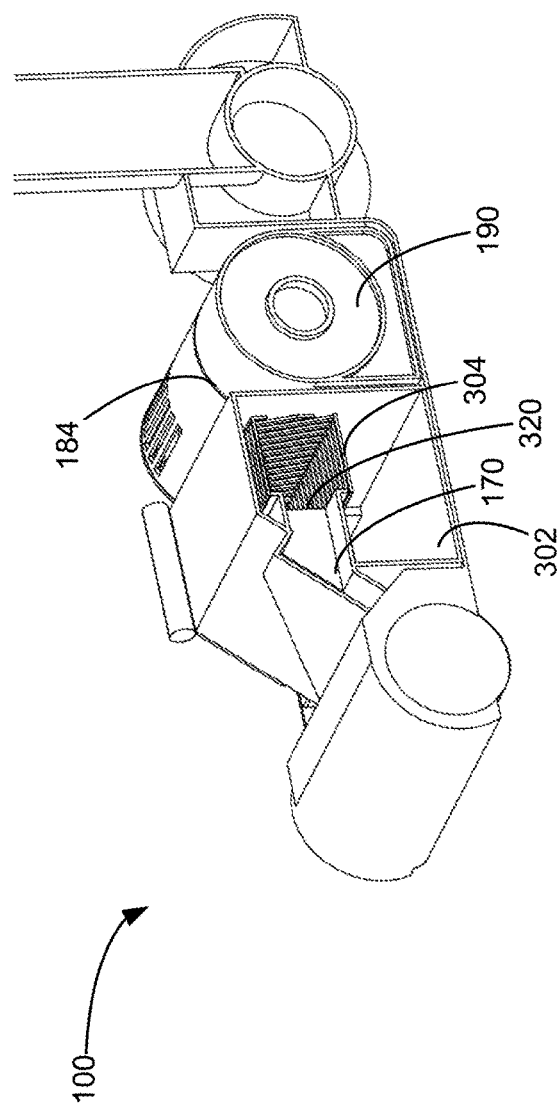
FIG. 3A is a cross-sectional view of the surface cleaning apparatus of FIG. 1A, taken along the line 3A-3A in FIG. 1A.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

As used herein and in the claims, two elements are said to be "parallel" where those elements are parallel and spaced apart, or where those elements are collinear.

General Description of a Surface Cleaning Apparatus

Referring to FIGS. 1A-3B, an exemplary embodiment of a surface cleaning apparatus is shown generally as 100. The following is a general discussion of apparatus 100, which provides a basis for understanding several of the features that are discussed herein. As discussed subsequently, each of the features may be used individually or in any particular combination or sub-combination in this or in other embodiments disclosed herein.

Embodiments described herein include a surface cleaning apparatus 100. Surface cleaning apparatus 100 may be any type of wet/dry surface cleaning apparatus, including for example an all-in-the-head vacuum cleaner as shown (100 in FIGS. 1A-29), an upright vacuum cleaner (100 in FIGS. 30A-39B), a hand vacuum cleaner, a stick vacuum cleaner, a canister vacuum cleaner, or an extractor. It will be appreciated that the liquid separator and air treatment assembly provided herein may enable a surface cleaning apparatus to be used both as an extractor and also as a vacuum cleaner.

In FIGS. 1A-29, surface cleaning apparatus 100 is illustrated as an all-in-the-head vacuum cleaner. Surface cleaning apparatus 100 has a front end 102, a rear end 104, an upper end (also referred to as the top) 106, and a lower end (also referred to as the bottom) 108. Surface cleaning apparatus 100 includes a surface cleaning head 120 having a main body 122, a front roller 124, and rear wheels 126. As shown, the surface cleaning head 120 is connectable to an upright portion 130. As exemplified, the upright section 130 may be a rigid tubular member which has a drive handle at an upper end thereof. The surface cleaning apparatus 100 has a dirty air inlet 160, a clean air outlet 162, and an air flow path extending between the dirty air inlet 160 and the clean air outlet 162. As shown, the dirty air inlet 160 is in the surface cleaning head 120 forming a surface cleaning head inlet.

As exemplified, the all-in-the-head vacuum cleaner has all of the operating components in the surface cleaning head. Accordingly the liquid separation stage, the air treatment assembly and the suction motor may be provided in the surface cleaning head. In other embodiments, one or more of these components may be provide elsewhere, such as part of the upright section 130.

In the embodiment shown, dirty air inlet 160 is at a lower portion of apparatus front end 102 and clean air outlet 162 is at a rearward portion of apparatus 100 at apparatus rear end 104. It will be appreciated that dirty air inlet 160 and clean air outlet 162 may be positioned in different locations of apparatus 100.

The surface cleaning apparatus 100 may have a liquid separation stage 300, which may have any one or more of the features discussed subsequently. The liquid separation member may be permanently affixed to the main body 122 or may be removable in part or in whole therefrom for emptying.

The surface cleaning apparatus 100 may have an air treatment member 140 (which may be permanently affixed to the main body 122 or may be removable in part or in whole therefrom for emptying). The air treatment member 140 may be downstream of the liquid separation stage 300 and may have an air treatment chamber 142, an air inlet 144, and an air outlet 146. Air treatment member 140 is configured to remove particles of dirt and other debris from the air flow. Air treatment member 140 has a solid collection region 150 (also referred to as a "solid storage region", "dirt collection region", "dirt collection bin", "dirt bin", or "dirt chamber"). The solid collection region(s) may be external to the air treatment chamber or internal thereof. The air treatment member 140 may be positioned anywhere on the surface cleaning apparatus 100. For example, the air treatment member 140 may be positioned in the surface cleaning head 120 (FIGS. 1A-29) or may be positioned in an upright portion (FIGS. 30A-39B). The air treatment member 140 may be, including, but not limited to, a cyclonic separator and/or a filter media.

A suction motor 180 is provided to generate vacuum suction through the air flow path, and is positioned within a motor housing 182. Suction motor 180 may be a fan-motor assembly including an electric motor and impeller blade(s). In the illustrated embodiment, suction motor 180 is positioned in the air flow path downstream of air treatment member 140. In this configuration, suction motor 180 may be referred to as a "clean air motor". Alternatively, suction motor 180 may be positioned upstream of air treatment member 140, and referred to as a "dirty air motor".

In alternate embodiments, the surface cleaning apparatus 100 may include an air treatment assembly having two or more air treatment members arranged in series with each other. Each air treatment stage may include a momentum separator and/or a cyclone arranged in parallel with each other, of any suitable configuration. Each air treatment member may have its own solid collection region or two or more air treatment members fluidically connected in parallel may have a single common solid collection region.

One or more air treatment members may include a cyclone assembly 200 (also referred to as a "cyclone bin assembly") having a cyclonic cleaning stage with a single cyclone 202 having a cyclone axis of rotation 206 and a cyclone chamber 204. Cyclone 202 and cyclone chamber 204 may be of any configuration suitable for separating dirt from an air stream and collecting the separated dirt respectively, and may be in communication with dirt outlet(s) of the cyclone chamber.

Referring to FIG. 2A, surface cleaning apparatus 100 may include a pre-motor filter 190 provided in the air flow path downstream of air treatment member 140 and upstream of suction motor 180. Pre-motor filter 190 may be formed from any suitable physical, porous filter media. For example, pre-motor filter 190 may be one or more of a foam filter, felt filter, HEPA filter, or other physical filter media. In some embodiments, pre-motor filter 190 may include an electrostatic filter, or the like. As shown, pre-motor filter 190 may be located in a pre-motor filter housing 192 that is external to the air treatment member 140.

Power may be supplied to suction motor 180 and other electrical components of apparatus 100 from an onboard energy storage member, which may include, for example, one or more batteries or other energy storage device. In some embodiments, apparatus 100 includes a battery pack. The battery pack may be permanently connected to apparatus 100 and rechargeable in-situ, or removable from apparatus 100. Alternatively, or in addition to a battery pack, power may be supplied to apparatus 100 by an electrical cord (not shown) connected to apparatus 100 that can be electrically connected to mains power by at a standard wall electrical outlet.

As exemplified in FIGS. 1A, 1B, 2A, 2B, dirty air inlet 160 is the inlet end 172 of an air inlet conduit 170 having an outlet end 174 that forms the air inlet 320 of the liquid separation stage 300. The airflow path 164 continues through the liquid separation stage 300 until it reaches an air inlet 177 of a second air inlet conduit 176 having an outlet end 178 which forms the air inlet 144 of the air treatment member 140.

In operation, after activating suction motor 180, dirty air enters apparatus 100 through dirty air inlet 160 and is directed along air inlet conduit 170 to the air inlet 320 of the liquid separation stage 300. Liquid is separated from the air as it passes through the liquid separation stage 300. The dirty air flow travels from the air outlet 322 to the air inlet 144 of the optional air treatment stage 140. Dirt particles and other debris may be dis-entrained (i.e., separated) from the dirty air flow as the air flows from the air inlet 144 to air outlet 146 of the air treatment stage 140. The dis-entrained dirt particles and debris may be collected in the solid storage region 150 until solid collection region 150 is emptied.

In some embodiments, the air outlet 146 may have an air outlet passage 148. The air outlet passage 148 may include an air permeable portion 149 (which may be referred to as a screen or shroud, e.g., a fine mesh screen) in the air flow path to remove large dirt particles and debris, such as hair, remaining in the exiting air flow. For example, if the air treatment stage 140 comprises a cyclone, then the air permeable portion 149 may be the outlet screen of the cyclone.

From air outlet 146, the air flow may be directed into an optional pre-motor filter housing 192 at an upstream side of pre-motor filter 190. The air flow may pass through pre-motor filter 190, and then exit through pre-motor filter chamber air outlet into motor housing 182. At motor housing 182, the clean air flow may be drawn into suction motor 180 and then discharged from apparatus 100 through clean air outlet 162. Prior to exiting the clean air outlet 162, the treated air may pass through an optional post-motor filter, which may be one or more layers of filter media.

Surface Cleaning Head with a Liquid Separation Stage

In accordance with this aspect, which may be used by itself or in combination with one or more other aspects, the surface cleaning head of a surface cleaning apparatus 100 has a liquid separation stage 300. Accordingly, the surface cleaning apparatus 100 may be used to clean up liquid spills. An advantage of this design is that the weight of liquid collected by the surface cleaning apparatus may be stored in the surface cleaning head. If the collected liquid was stored in the upright section, then the weight of the upright section perceived by a user would be increased. Therefore, the surface cleaning apparatus may be more easily maneuvered by a user. This aspect may be used with one or more of the porous liquid separation chamber, the angled floor of the liquid separation chamber, the emptying of the separated liquid storage region, the baffled wall of the separated liquid storage region, the emptying of the liquid separation chamber, the downflow region, the cyclonic liquid separator, the dual cyclone liquid separation stage, the pre-motor filter housing, the vertical cyclonic liquid separation stage, the vertical cyclonic liquid separation stage with an emptying channel, and the vertical cyclone with a downstream liquid separation stage.

The liquid separation stage 300 may have a separated liquid storage region 302 that is exterior to the liquid separating member. Solid material may be retained in the liquid separating member. An advantage of this aspect is that the surface cleaning apparatus 100 may be used to clean surfaces having both solid and liquid matter. By separating the liquid storage region from the solid storage region (e.g., the liquid separation member), the user may be able to more easily dispose of the separated liquids and solids. For example, the separated liquid may be emptied into a sink or toilet with a reduced risk of clogging plumbing.

The liquid separation stage 300 may be any system capable of separating liquid from an airflow. For example, the liquid separation stage 300 may be a non-cyclonic momentum separator wherein liquid is separated from an air flow due to the air flow following a tortuous path or the air flow entering a non-cyclonic momentum separator chamber wherein the velocity of the air flow decreases in the non-cyclonic momentum separator chamber such that entrained water will separate out of the air flow, as exemplified in FIGS. 1A-24B. In some embodiments, the liquid separation stage 300 may be a cyclonic separator, as exemplified in FIGS. 25A-39B.

The surface cleaning apparatus 100, and optionally the surface cleaning head, may have a plurality of stages. Optionally, as exemplified in FIGS. 1A-39B, the liquid separation stage 300 may be the first stage of the surface cleaning apparatus 100. As exemplified in FIGS. 1A-24B, the surface cleaning head has the liquid separation stage 300 and an air treatment stage 140 that is downstream from the liquid separation stage 300. In some embodiments, the air treatment stage 140 may be upstream from the liquid separation stage 300. The air treatment stage 140 may also be referred to as air treatment member 140.

As exemplified in FIGS. 1-24B, the air treatment stage 140 may be positioned rearward of the liquid separation stage 300. In some embodiments, the air treatment stage 140 may be positioned forward of, and/or may overlap with, the liquid separation stage 300. The cyclone 202 may include a porous member 330 that allows for separated liquid to move to a second liquid collection region. For example, as shown, the porous member 330 is a screen. Accordingly, the air treatment stage 140 may also operate as a second liquid separation stage 400.

If the air treatment stage 140 is to also operate as a second liquid separation stage 400, then as exemplified, the air treatment member 140 may have a separated solid storage region 150. It will be appreciated that the solid storage region 150 may be positioned anywhere in the surface cleaning head. For example, the separated solid storage region 150 may be positioned adjacent, above, and/or below the separated liquid storage region 302. In some embodiments, the separated solid storage region 150 may overlap with the liquid separation stage 300. For example, at least a portion of the separated solid storage region 150 may be positioned under the separated liquid storage region 302. The air treatment stage 140 may include a cyclone assembly 200 having a cyclone 202. As exemplified in FIG. 26B the cyclone 202 has a cyclone axis of rotation 206 that extends laterally.

Porous Liquid Separation Chamber

In accordance with this aspect, which may be used by itself or in combination with one or more other aspects, the liquid separation stage 300 comprises a liquid separation chamber 310 defined by one or more walls wherein at least a portion of one of more of the walls, and optionally all or substantially all of one of more of the walls, is porous whereby water may pass out of the liquid separation chamber 310 into a separated liquid storage region 302, optionally by gravity. An advantage of this design is that solid material may be retained in the liquid separation chamber 310 as it cannot pass through the porous member and thereby separated solid material is separated from the separated liquid that is received by the separated liquid storage region 302. This aspect may be used with one or more of the surface cleaning head with a liquid separation stage, the angled floor of the liquid separation chamber, the emptying of the separated liquid storage region, the baffled wall of the separated liquid storage region, the emptying of the liquid separation chamber, the downflow region, the cyclonic liquid separator, the dual cyclone liquid separation stage, the pre-motor filter housing, the vertical cyclonic liquid separation stage, the vertical cyclonic liquid separation stage with an emptying channel, and the vertical cyclone with a downstream liquid separation stage.

Figure 3B:
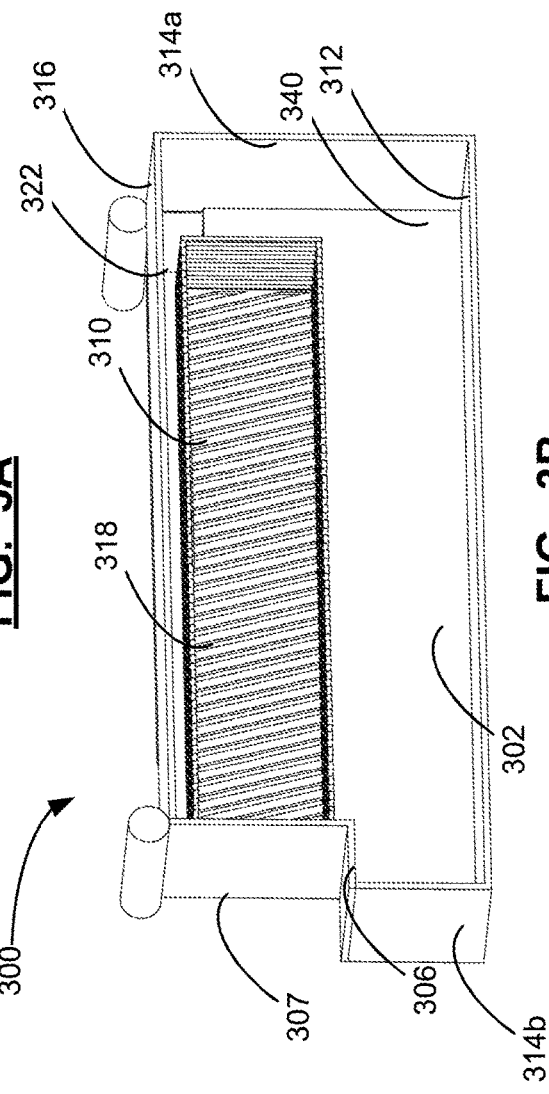
FIG. 3B is a cross-sectional view of a liquid separation stage of the surface cleaning apparatus of FIG. 1A, taken along the line 3A-3A in FIG. 1A.
Figure 4:
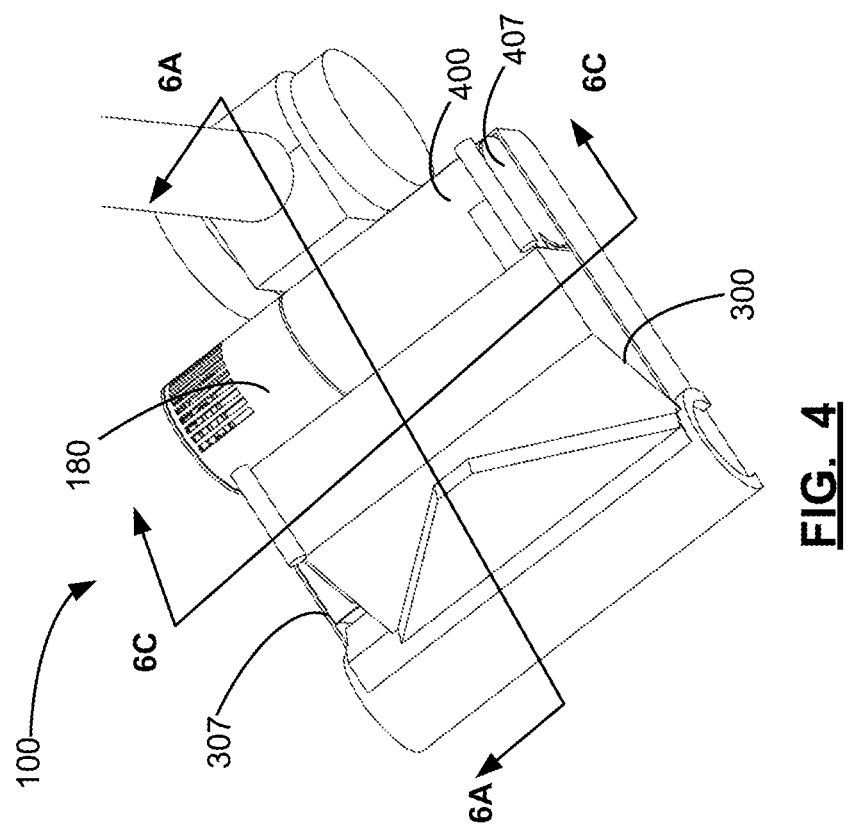
FIG. 4 is a top perspective view of another surface cleaning apparatus.
Figure 7B:
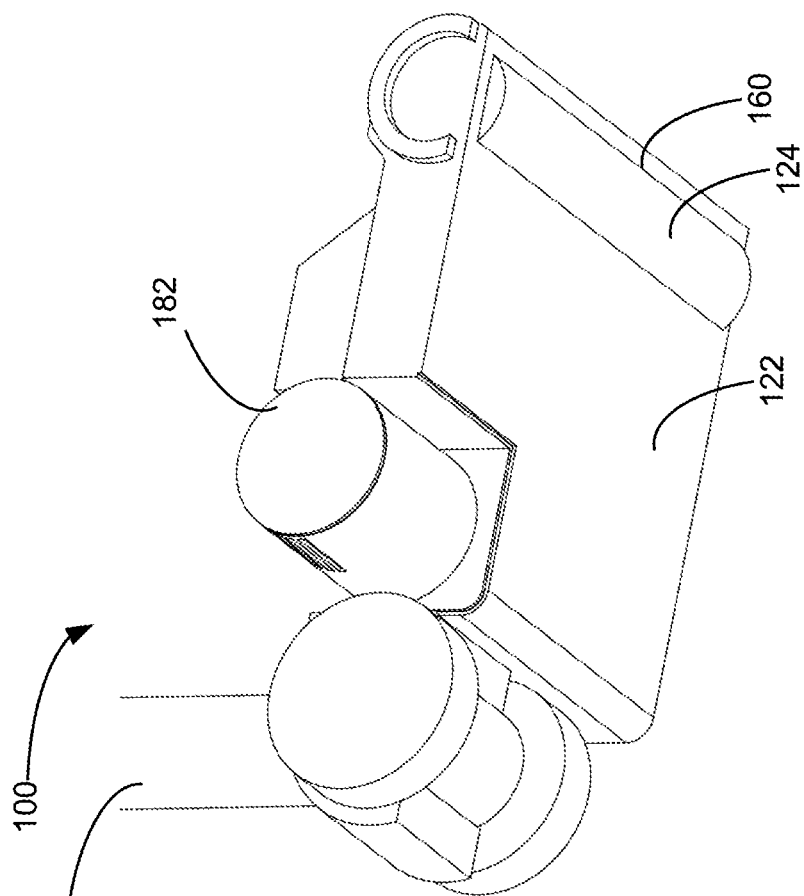
FIG. 7B is a bottom perspective view of the surface cleaning apparatus of FIG. 7A.
Figure 7A:
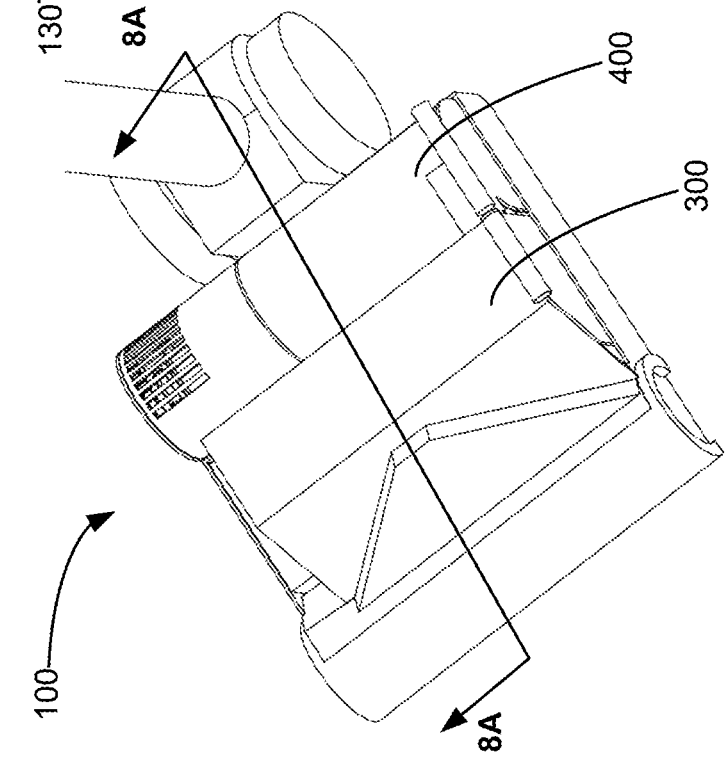
FIG. 7A is a top perspective view of another surface cleaning apparatus.
Figure 9:
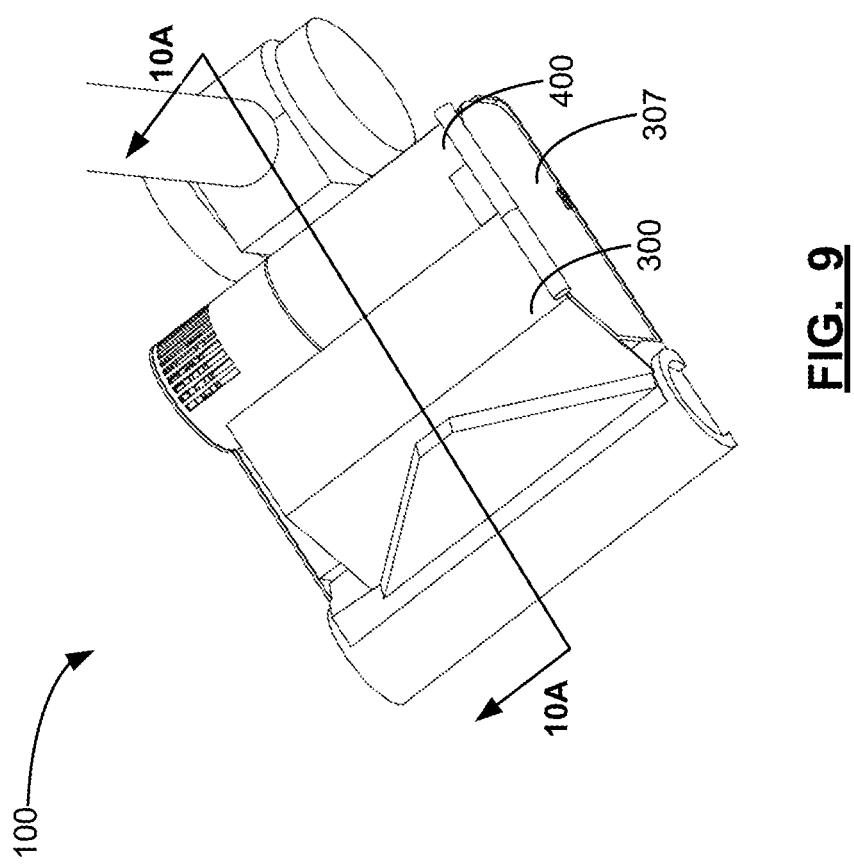
FIG. 9 is a top perspective view of another surface cleaning apparatus.
Figure 10:
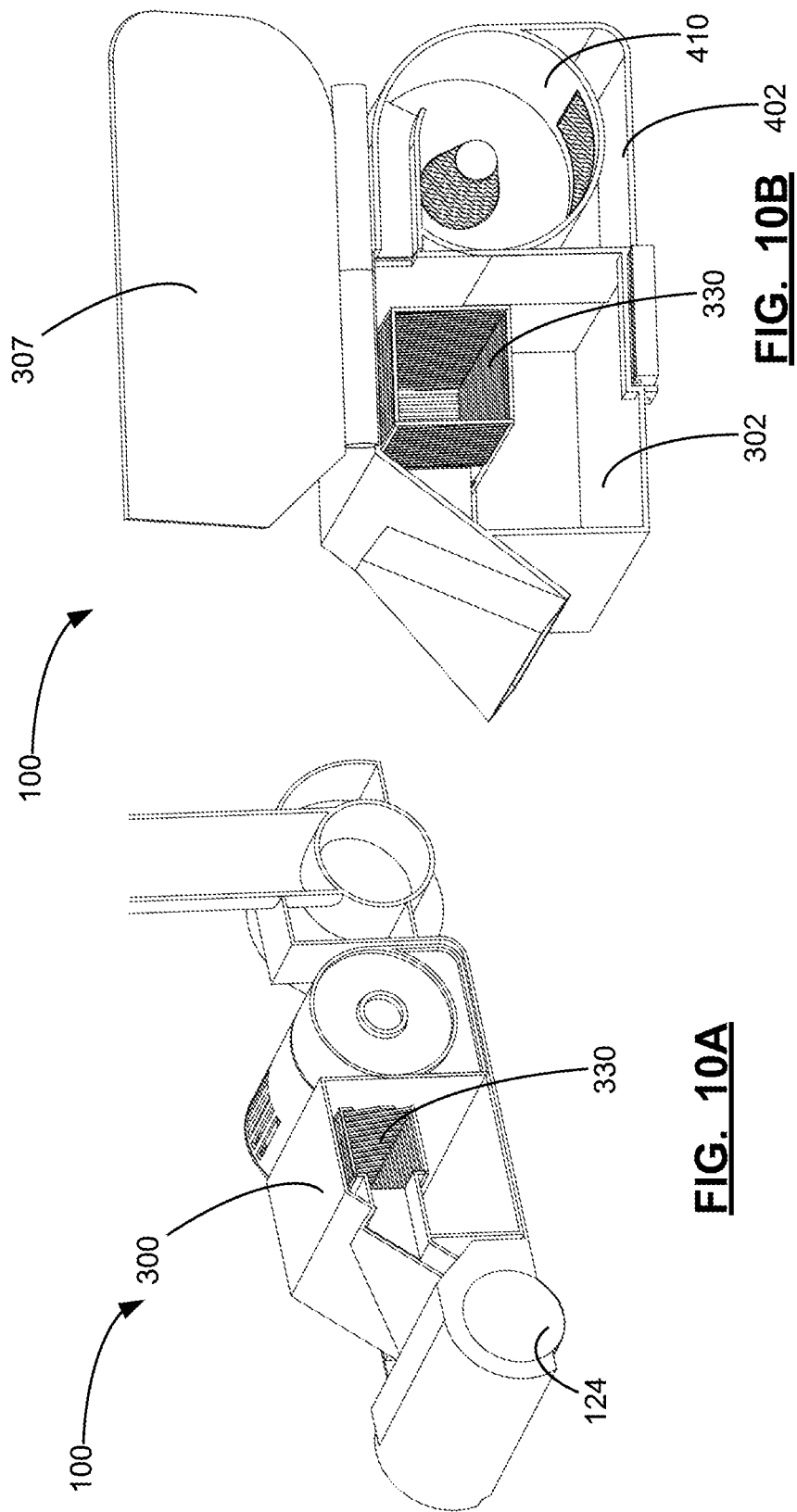
FIG. 10A is a perspective cross-sectional view of the surface cleaning apparatus of FIG. 9, taken along the line 10A-10A in FIG. 9.
FIG. 10B is a perspective view of the surface cleaning apparatus of FIG. 9 with a door opened.
Figure 11:
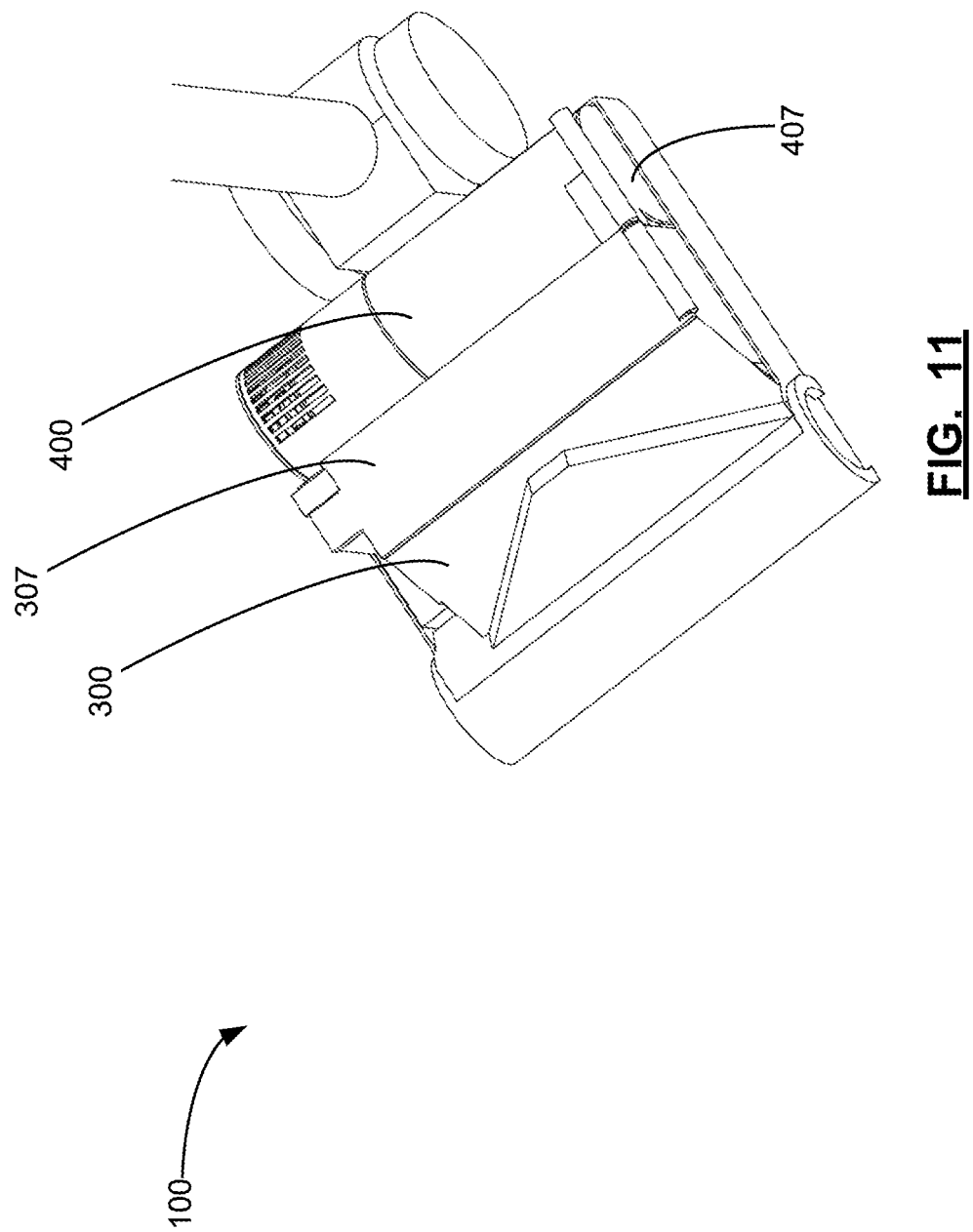
FIG. 11 is a top perspective view of another surface cleaning apparatus.

As exemplified in FIG. 3B, the liquid separation stage 300 has a lower wall 312, a sidewall 314, an upper wall 316, an air inlet 320 and an air outlet 322. At least a portion or one or more of lower wall 312, sidewall 314 and upper wall 316 may be porous, e.g., it may be made of a screen or the like. For convenience herein, the porous portion is referred to as a screen. The screen may be made of a wire mesh material.

The liquid separation chamber 310 is provided in the liquid separation stage 300 and may be provided in an upper portion thereof. As exemplified in FIG. 6C, the liquid separation chamber 310 has an interior volume 318 that is defined by a volume lower wall 350, a volume sidewall 352, and a volume upper wall 354. As exemplified in FIG. 3B, the separated liquid storage region 302 is provided in the liquid separation stage 300 and may be provided in a lower portion thereof. Accordingly, liquid may exit the liquid separation chamber 310 and pass to the separated liquid storage region 302 by gravity flow.

The liquid separation chamber 310 has a separated liquid outlet 304 that connects the liquid separation chamber 310 in flow communication with the separated liquid storage region 302. During operation, airflow containing liquid enters through the air inlet 320. The liquid separation stage 300 separates at least some of the liquid from the airflow, allowing the liquid to pass through the separated liquid outlet 304 into the separated liquid storage region 302. The partially treated air flow then exits the liquid separation chamber 310 and travel downstream.

As exemplified in FIGS. 1A-24B, the liquid separation chamber 310 may be a non-cyclonic momentum separator. As such, the velocity of the air flow as it enters and/or passes through the liquid separation chamber 310 is reduced whereby entrained liquid becomes dis-entrained from the air flow. As exemplified in FIG. 3A, air that enters the dirty air inlet of a surface cleaning head travels rearwardly up an incline (e.g., a ramp) to the air inlet 320, the air inlet 320 comprises an opening in, e.g., a side wall 314 of the liquid separation chamber 310. Heavier material is then collected in the liquid separation chamber 310 and the air flow continues to the air outlet 322.

The air outlet 322 is a partially treated air outlet since the liquid separation chamber 310 removes some solid debris and/or liquid from the airflow, but may allow some finer solid debris to pass through the partially treated air outlet 322.

The air outlet may be any opening in the liquid separation chamber 310 and/or the liquid separation stage 300. For example, the air outlet 322 may be an opening in a wall of the liquid separation chamber 310, e.g., a side wall 314, through which the air passes, e.g., to a second stage air treatment stage as discussed subsequently. In such a case, the air outlet may be at the inlet port to the air flow passage that extends downstream to the next air treatment stage. For example the air outlet 322 may be a port in the wall of the liquid separation chamber 310 which is also a wall defining the liquid separation stage. Alternately, as exemplified in FIG. 24B, the air may flow through a porous section of the walls that define the liquid separation chamber 310 and then through a further portion of the liquid separation stage 300 (e.g., a portion of the separated liquid storage region 302) before exiting through a port in an air impermeable wall 340 defining the liquid storage stage 300. Accordingly, as exemplified in FIGS. 3A and 3B, the air inlet 320 is positioned in a front side of the liquid separation chamber 310 and the air outlet 322 is positioned in a rear side of the liquid separation chamber 310, with the air outlet 322 being positioned in the air impermeable wall 340.

It will be appreciated that while the liquid separation chamber 310 is exemplified as rectangular, it may be of any shape (e.g., circular, cylindrical, etc.) and may be formed of one or more walls.

The separated liquid outlet 304 may be any shape, size, and/or material that facilitates liquid to pass from the liquid separation chamber 310 to the separated liquid storage region 302. The separated liquid outlet 304 may be an opening or slot in one or more walls of the liquid separation chamber 310. For example, as exemplified in FIG. 16, the separated liquid outlet 304 may be funnel shaped (e.g., the separated liquid outlet 304 may be an opening in an angled lower wall 313 of the liquid separation chamber 310).

Alternately, or in addition, as exemplified in FIG. 3B, the separated liquid outlet 304 may include a porous member 330. The porous member 330 may be any material that allows for the trapping of at least some solid particles while allowing liquid to pass through the separated liquid outlet 304 to the separated liquid storage region 302. For example, porous member 330 may be, including, but not limited to, a mesh, a screen, a foam, or any other material that can allow liquid to pass therethrough.

Optionally, the porous member 330 forms at least a portion of the volume lower wall 350 and/or the volume sidewall 352.

Figure 16:
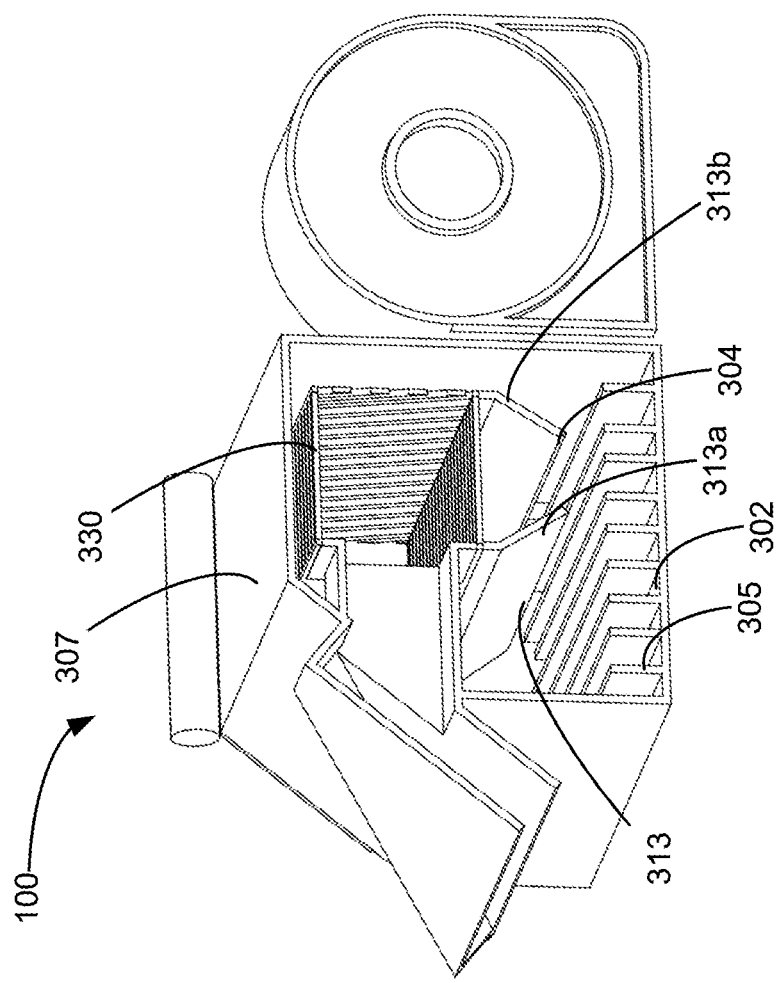
FIG. 16 is a cross-sectional view of the liquid separation stage and the air treatment assembly of the surface cleaning apparatus of FIG. 14A, taken along the line 16-16 in FIG. 14A.

As exemplified in FIG. 16, the porous member 330 may overly the separated liquid outlet 304. As shown, the porous member 330 overlies and is vertically spaced from at least a portion of the angled lower wall 313. In some embodiments, the porous member 330 may form the separated liquid outlet 304, as exemplified in FIG. 3B.

During operation, liquid separated from air travelling through the volume 318 exits the volume 318 by passing through the porous member 330, exits through the separated liquid outlet 304, and flows into the separated liquid storage region 302.

The liquid may pass into the separated liquid storage region 302 due to gravity. In other words, at least a portion of the separated liquid storage region 302 may be positioned at a lower elevation than the volume 318 and, optionally, at least a portion of or all of the separated liquid storage region 302 may be positioned under the volume 318 (i.e., it may underlie the separated liquid storage region 302), as exemplified in FIG. 25A-26B.

Accordingly, during operation, liquid separated from air as it travels through the volume 318 exits the volume 318 through the separated liquid outlet 304 and flows to the separated liquid storage region 302 due to gravity. An advantage of this aspect is that solid debris such as hair may be captured by the porous member 330 while still allowing liquid to be separated from the air and collected in the separated liquid collection region 302. Separating the liquid and solid matter collection regions may improve the emptying of the surface cleaning apparatus 100. For example, by maintaining a liquid collection region mostly free of solid debris, the liquid may be emptied in the sink or toilet without clogging the plumbing. Additionally, the solid debris captured in the volume 318 by the porous member 330 may be emptied in a different location and/or a different time than the separated liquid.

In accordance with this aspect, in some embodiments, the porous member 330 may form at least a portion of the lower and/or sidewalls of the liquid separation chamber 310. For example, at least a portion of the lower and/or sidewalls may be formed of a screen. Accordingly, the porous member 330 may form at least a portion of the volume lower wall 350 and/or the volume sidewall 352. It will be appreciated that the porous member 330 may form at least a portion of any one or more of the walls of the volume 318. As exemplified in FIGS. 1A-10B, the porous member 330 forms the volume lower wall 350, volume sidewall 352, and the volume upper wall 354. As exemplified in FIGS. 3B and 14B, the volume sidewall 352 may include a front sidewall 360, a rear sidewall 362, a first sidewall 364 and a second laterally opposed sidewall 366, with the rear sidewall 362 formed by the porous member 330.

It will be appreciated that one or more of the walls defining the liquid separation chamber 310 may be air impermeable wall.

Angled Floor of the Liquid Separation Chamber

In accordance with this aspect, which may be used by itself or in combination with one or more other aspects, the lower wall of the volume 318 may have an angled surface which may comprise or consist of the separated liquid outlet 304. An advantage of this aspect is that the angled lower wall may inhibit separated liquid re-entering the liquid separation chamber 310 as the surface cleaning head, or the surface cleaning apparatus, is moved across a floor. This aspect may be used with one or more of the surface cleaning head with a liquid separation stage, the porous liquid separation chamber, the emptying of the separated liquid storage region, the baffled wall of the separated liquid storage region, the emptying of the liquid separation chamber, the downflow region, the cyclonic liquid separator, the dual cyclone liquid separation stage, the pre-motor filter housing, the vertical cyclonic liquid separation stage, the vertical cyclonic liquid separation stage with an emptying channel, and the vertical cyclone with a downstream liquid separation stage.

As exemplified in FIG. 16, the lower wall 312 of the liquid separation chamber 310 may be angled downwardly, forming the angled lower wall 313. The angled lower wall 313 includes a front portion 313a that is angled rearwardly and downwardly and a rear portion 313b that is angled forwardly and downwardly. As shown, the separated liquid outlet 304 is formed by the opening between the front portion 313a and the rear portion 313b. The angled wall(s) may reduce sloshing in the liquid collection region 302. It will be appreciated that there may be a plurality of liquid outlets 304 formed by a plurality of lower walls 313. As exemplified in FIGS. 19B and 24B, there are four liquid outlets 304.

It will also be appreciated that only a single angled wall 313a, 313b may be provided. For example, on front angled wall 313a may be provided.

It will also be appreciated that the angled wall(s) may optionally extend in the forward/rearward direction.

Baffled Wall of the Separated Liquid Storage Region

In accordance with this aspect, which may be used by itself or in combination with one or more other aspects, one or more baffles may be provided in the liquid collection region 302. An advantage of this aspect is that the baffles may inhibit separated liquid moving around the liquid collection region 302 as the surface cleaning head, or the surface cleaning apparatus, is moved across a floor, which may cause separated liquid to re-enter the liquid separation chamber 310. This aspect may be used with one or more of the surface cleaning head with a liquid separation stage, the porous liquid separation chamber, the angled floor of the liquid separation chamber, the emptying of the separated liquid storage region, the emptying of the liquid separation chamber, the downflow region, the cyclonic liquid separator, the dual cyclone liquid separation stage, the pre-motor filter housing, the vertical cyclonic liquid separation stage, the vertical cyclonic liquid separation stage with an emptying channel, and the vertical cyclone with a downstream liquid separation stage.

Optionally, the separated liquid storage region 302 has a lower wall 312 having upwardly extending baffles 305. It will be appreciated that the baffles need not be provided on the lower wall 312, but descend from the upper wall or they may extend between the sidewalls.

As exemplified in FIGS. 16, 18B, and 21B, the sidewall 314 has first and second laterally opposed sides 314a and 314b and the baffles 305 are disposed laterally between the first and second laterally opposed sidewalls 314. It will be appreciated that the baffles need not extend laterally but may extend in any direction. Optionally, the baffles extend at least at an angle to the forward/rearward direction to reduce or inhibit water sloshing in the liquid storage region 302 as the surface cleaning apparatus 100 is moved over a surface.

It will be appreciated that the baffles may extend from one side of the liquid storage region 302 to the other. The baffles may extend continuously. Alternately, a series of discrete baffles may extend part way across the liquid storage region 302. Alternately the baffles may extend only part way across the liquid storage region 302.

Emptying the Liquid Separation Chamber

In accordance with this aspect, which may be used by itself or in combination with one or more other aspects, the liquid separation chamber 310 may be openable so as to remove solid material collected therein and/or to remove and clean the porous member. This aspect may be used with one or more of the surface cleaning head with a liquid separation stage, the porous liquid separation chamber, the angled floor of the liquid separation chamber, the baffled wall of the separated liquid storage region, the emptying of the separated liquid storage region, the downflow region, the cyclonic liquid separator, the dual cyclone liquid separation stage, the pre-motor filter housing, the vertical cyclonic liquid separation stage, the vertical cyclonic liquid separation stage with an emptying channel, and the vertical cyclone with a downstream liquid separation stage.

It will be appreciated that the liquid separation chamber 310 may be openable by itself. Alternately, as discussed subsequently, liquid separation chamber 310 may be openable concurrently with one or more collection regions of the surface cleaning apparatus, such as the liquid storage region 302.

It will be appreciated that the porous member 330 may be removable from the liquid separation stage 300 to empty solid matter collected in the volume 318. As exemplified in FIGS. 13A-13C, the liquid separation stage 300 may be openable, e.g., openable door 307 may be opened, so as to enable the porous member to be removed. As exemplified, the liquid separation chamber 310 may be defined by a plurality of porous walls and, accordingly, when the door 307 is opened, the entire liquid separation chamber 310 may be removed for emptying and/or cleaning.

It will also be appreciated that the door 307 may be provided on any surface of the liquid separation stage 300. As exemplified in FIGS. 13A-13C, the door 307 is an upper wall and the porous member 330 is removeable upwardly. As exemplified in FIG. 15B, the door 307 is a sidewall, enabling the porous member 330 to be slide laterally outwardly.

It will also be appreciated that only part of the liquid separation chamber 310 may be removable. For example, when the door 307 is opened, only the upper portion, e.g., the upper wall of the liquid separation chamber 310 may be subsequently removed so as to provide access to the interior volume 318 of liquid separation chamber 310.

It will also be appreciated that the liquid separation chamber may be defined in part by the openable door 307 and therefore, opening the openable door opens the liquid separation chamber 310. In such a case, a user may be able to remove solid material from the liquid separation chamber 310 without removing the liquid separation chamber 310 from the surface cleaning apparatus.

As exemplified in FIGS. 14A, 14B, a5A and 15B, the first laterally opposed sidewall 364 is porous while the second laterally opposed sidewall 366 is open. Therefore, when door 307 is opened, solids collected in the volume 318 may be poured out.

Emptying the Separated Liquid Storage Region

In accordance with this aspect, which may be used by itself or in combination with one or more other aspects, the liquid storage region 302 may be openable, by itself or concurrently with one or more other regions, to enable the liquid storage region 302 to be emptied. This aspect may be used with one or more of the surface cleaning head with a liquid separation stage, the porous liquid separation chamber, the angled floor of the liquid separation chamber, the emptying of the separated liquid storage region, the baffled wall of the separated liquid storage region, the downflow region, the cyclonic liquid separator, the dual cyclone liquid separation stage, the pre-motor filter housing, the vertical cyclonic liquid separation stage, the vertical cyclonic liquid separation stage with an emptying channel, and the vertical cyclone with a downstream liquid separation stage.

An advantage of this design is that the liquid storage region may be emptied in situ, without having to remove the liquid storage region 302 from the surface cleaning apparatus. Accordingly the liquid storage region need not have to be sealingly connected to the surface cleaning apparatus after emptying to avoid the surface cleaning apparatus leaking during operation.

As exemplified in FIG. 5B, the liquid separation stage 300 has a separated liquid outlet port 306. The separated liquid outlet port 306 may be used to remove liquid collected in the liquid collection region 302 from the surface cleaning apparatus 100. For example, the user may tip the surface cleaning head 120 in the direction of the separated liquid outlet port 302 to pour collected liquid out of the liquid collection region 302.

It will be appreciated that is the liquid collection region 302 is provided in the surface cleaning head 120, then the surface cleaning head may be tipped to empty the liquid collection region 302.

The separated liquid outlet port 306 may be positioned anywhere in the liquid separation stage 300 such that liquid may be removed from the separated liquid storage region 302. For example, the separated liquid outlet port 306 may be positioned in an upper portion of the liquid separation stage 300 or in a sidewall of the liquid separation stage 300, as exemplified in FIG. 5B. An air impermeable wall 340 of the liquid separation stage may be spaced from and face the porous member 330, which may form at least a portion of the sidewall of the volume 318, and the separated liquid outlet port 306 may be provided between the air impermeable wall 340 and the porous member 330. It will be appreciated that an openable door may comprise part or all of an air impermeable wall 340.

It will be appreciated that the separated liquid outlet port 306 may have an openable top wall, bottom wall, or side wall of the liquid separation stage 300. As exemplified in FIGS. 2A, 5B, 8B, 10B, 18A, 21A, and 26B the sidewall of the liquid separation stage 300 is an openable door 307 such that the liquid separation chamber 310 and the separated liquid storage region 302 are opened. As exemplified in FIGS. 12B, 26A the top wall of the liquid separation stage is the openable door 307 that opens the separated liquid outlet port 306. As exemplified in FIG. 29, the bottom wall forms the openable door 307 that opens the separated liquid outlet port 306.

It will be appreciated that the first and/or second air treatment stages of the surface cleaning apparatus 100 may be emptiable independently or concurrently. For example, referring to FIGS. 2B, 5B, 8B, 12B, 15B, 18A, and 21A, the separated liquid storage region 302 is emptiable independently of emptying the separated solid storage region 150. As exemplified in FIG. 10B, the separated liquid storage region 302 and the separated solid storage region 150 are emptiable concurrently.

It will be appreciated that, if a second air treatment stage is provided, then as discussed subsequently, the second air treatment stages may also separate water from the air flow and the separated water may be stored in a second stage liquid collection region and/or the first stage liquid collection region 302. In any such case, the liquid collection region(s) may be emptied concurrently with the liquid separation chamber 310. Alternately, or in addition, the liquid collection regions may be emptied concurrently by a single openable door.

Downflow Region

In accordance with this aspect, which may be used by itself or in combination with one or more other aspects, The air outlet of the internal volume 318, comprises, consists essentially of or consists of an air flow passage provided between a porous sidewall of the internal volume 318 and an opposed facing wall, which is air impermeable but may have an air outlet 322 provided therein. An advantage of this design is that solid material may be captured in the volume 318 while still allowing air to flow to other regions of the liquid separation stage 300 and/or to the air treatment member 140 through a sidewall or a portion thereof. This aspect may be used with one or more of the surface cleaning head with a liquid separation stage, the porous liquid separation chamber, the angled floor of the liquid separation chamber, the emptying of the separated liquid storage region, the baffled wall of the separated liquid storage region, the emptying of the liquid separation chamber, the cyclonic liquid separator, the dual cyclone liquid separation stage, the pre-motor filter housing, the vertical cyclonic liquid separation stage, the vertical cyclonic liquid separation stage with an emptying channel, and the vertical cyclone with a downstream liquid separation stage.

As exemplified in FIGS. 6A-6C, the air impermeable wall 340 may be spaced apart from and face at least a portion of the volume sidewall 352 that is formed by the porous member 330 such that a downflow region or passage 370 is formed between the porous member 330 and the air impermeable wall 340. During operation, liquid is separated from air that flows through the liquid separation stage 300 as air travels through the volume 318, exits the volume 318 through the porous member 330, and flows downwardly through the downflow region 370 between the porous member 330 and the air impermeable wall 340. The liquid is subsequently captured and stored in the separated liquid storage region 302.

It will be appreciated that solid material and elongate material such as hair may also be separated during the flow of air through volume 318. This separated material may block part of the porous member 330. It will be appreciated that some or all of the volume sidewall 352 may be porous, thereby providing a large surface area through which air may exit the volume 318. Accordingly, if the porous member 330 is partially blocked, a large surface area that is open for air flow may remain, thereby avoid the backpressure through the liquid separation state increasing as material is collected in the volume 318.

It will be appreciated that, in addition, the volume lower wall 350, as exemplified, may also be porous.

It will also be appreciated that more than one sidewall 352 may have a porous section or may be porous. Such a sidewall may be spaced from an opposed air impermeable wall of the liquid separation stage 300. Accordingly, air may exit the volume 318 through one or more sidewalls 352 and a downflow region 370 may be provided on more than one side of the volume 318.

The liquid collection region 302 may be located at the lower end of downflow passage 370. As exemplified, liquid separation region 302 underlies the downflow passage 370 and the downflow passage 370 may extend vertically when the surface cleaning head is positioned on a horizontal surface. Alternately, the liquid separation region 302 may be at a lower elevation that the porous region of the volume sidewall 352 and the downflow region 370 may extend downwardly, e.g., at an angle to the vertical, whether linearly or otherwise, to the liquid collection region 302.

Optionally, the rear portion 313b of the angled lower wall 313 may be located at the downflow region 370. As exemplified in FIG. 16, the rear portion 313b of the angled lower wall 313 forms a forward side of a lower end of the downflow region 370.

Cyclonic Liquid Separator

In accordance with this aspect, which may be used by itself or in combination with one or more other aspects, the liquid separation stage 300 comprises a cyclone 200. An advantage of this aspect is that liquid separation efficiency may be improved, thereby reducing the amount of entrained water passing downstream to the suction motor. This aspect may be used with one or more of the surface cleaning head with a liquid separation stage, the porous liquid separation chamber, the angled floor of the liquid separation chamber, the emptying of the separated liquid storage region, the baffled wall of the separated liquid storage region, the emptying of the liquid separation chamber, the downflow region, the dual cyclone liquid separation stage, the pre-motor filter housing, the vertical cyclonic liquid separation stage, the vertical cyclonic liquid separation stage with an emptying channel, and the vertical cyclone with a downstream liquid separation stage.

As discussed subsequently and as exemplified in FIG. 1A-24B, the cyclone 200 may be a second stage liquid separator, e.g., downstream from volume 318. Alternately, the cyclone 200 may be used as a first stage liquid separator or as the sole liquid separator (see for example FIGS. 25A-26B). Alternately, a plurality of cyclones 200, in parallel and/or in series, may be used as part of or as the liquid separator. If a plurality of liquid separation stages are provided, then each liquid separation stage may be any design capable of separating liquid from an airflow. For example, the first and the second stage may both be momentum separators, cyclones, or one may be a cyclone and the other may be a momentum separator. In some embodiments, the first stage is a cyclonic liquid separator and the second stage is a momentum separator, or vice versa.

It will be appreciated that if the surface cleaning apparatus is used as a vacuum cleaner (e.g., it is not being used to clean up a spill or as an extractor), then the cyclone(s) 200 may be used to separate dry solid material entrained in the incoming air stream.

As exemplified in FIGS. 25A-26B, the cyclone 200 is positioned in the surface cleaning head 120. The cyclone 200 has a cyclone first end 210, an axially spaced apart second end 212, a cyclone air inlet 214, a cyclone air outlet 216, and a cyclone axis of rotation 206.

The airflow in the cyclone 200 may vary depending on the surface cleaning apparatus 100. As exemplified in FIGS. 26A, 26B, the cyclone air inlet 214 is provided at the first end 210 and the cyclone air outlet 216 is provided at the second end 212. In some embodiments, the cyclone air inlet 214 and cyclone air outlet 216 may be positioned at the same end. As exemplified in FIGS. 1A-3B, the suction motor 180 is positioned in the surface cleaning head 120 downstream of the cyclone 202 and the suction motor has an inlet end 184 that faces the cyclone air outlet 216.

As exemplified, when the surface cleaning apparatus 100 is in use to clean a floor, the cyclone axis of rotation 206 extends generally horizontally. Further, as exemplified, the cyclone axis of rotation 206 is generally transverse to a forward direction of motion of the surface cleaning apparatus 100. In some embodiments, the cyclone axis of rotation 206 may be generally parallel to the forward direction of motion of the surface cleaning apparatus 100, or may be at an angle to the forward direction of motion. Optionally, the cyclone axis may extend vertically or at an angle to the vertical.

The cyclone(s) 200 may be of various designs that will separate water from an air stream. Optionally, as exemplified in FIGS. 26A, 26B, some or all of the axially extending sidewall 220 may be porous (e.g., it may comprise or consist essentially of or consist of a screen 330). The screen 330 provides a separated liquid outlet 304 for the cyclone 220 that is in flow communication with a separated liquid collection region 302, which may be the separated liquid collection region 302 of the volume 318.

The cyclone may also separate solid material from the air stream the solid material may be retained in the cyclone 200. Accordingly, a region of the cyclone 200, e.g., opposed to the cyclone air outlet 216, may be the dirt collection region of the cyclone 200. Alternately, a dirt collection chamber may be provided that is external to the cyclone 200. Accordingly, the cyclone 200 may have a dirt outlet of any design known in the cyclonic arts. As exemplified in FIG. 26B, the dirt outlet is a slot 228 proximate the cyclone second end 212. The slot may be formed as a gap between an end face of the cyclone sidewall and the end wall of the cyclone 200 at second end 212. It will be appreciated that water may also exit through the slot 228.

The slot 228 may be in flow communication with a liquid collection region that is isolated from the liquid collection region that is in flow communication with the screen 330 of the cyclone. Alternatively, both the screen 330 and the slot 228 may be in flow communication with a single liquid collection region. If the liquid separation stage has two liquid separators as exemplified in FIG. 1A-24B, then this single liquid collection region may be isolated from the liquid collection region of a first stage liquid separator (e.g., volume 318), it may be in flow communication with the liquid collection region of a first stage liquid separator (e.g., volume 318), of the first and second liquid collection regions may be a single continuous liquid collection region which may underlie part or all of the first stage liquid separator (e.g., volume 318) and the cyclone 200.

As exemplified in FIG. 26B, the liquid collection region 302 is positioned at a lower elevation than the screen 330. It will be appreciated that, as with the volume 318, the screen (porous member) 330 may be positioned at a higher elevation than the liquid collection region 302 and part or all of the screen may overlie the liquid collection region 302. Therefore, as water is separated in the cyclone 00, water may flow downwardly into the liquid collection region 302.

As discussed previously, the liquid collection region 302 of the cyclone stage 200 may have a one or more baffles 305 (e.g., a plurality of upwardly extending baffles), which may be disposed laterally between the first and second laterally opposed walls. Accordingly, the baffles 305 may extend generally parallel to the cyclone axis of rotation 206.

It will be appreciated that the liquid collection region of the cyclone 200 may be opened in a similar manner as discussed with respect to the opening of volume 318. If the cyclone is the sole liquid separation member as exemplified in FIGS. 25A, 25B, 26A and 26B, then the liquid collection region may be openable for emptying by itself or concurrently with the cyclone 200. As exemplified in FIGS. 25A, 25B, 26A and 26B, the liquid separation region 302 has a separated liquid outlet port 306. As described previously, the liquid outlet port 306 is openable. The openable separated liquid outlet port 306 may be provided anywhere on the surface cleaning apparatus 100. As exemplified in FIG. 26B, the openable separated liquid outlet port 306 is provided on a lateral side of the liquid separation stage 300.

The liquid separation stage 300 may be opened in various ways. As exemplified in FIG. 26B, the liquid separation stage 300 has an openable wall 307, with the cyclone axis of rotation 206 extending through the openable wall when the openable wall is in the closed position. As shown, both the cyclone 200 and the liquid collection region 302 are opened when the openable wall 307 is in the openable position. Accordingly, each of the solid collection region 150 (e.g., the interior of the cyclone 220 as exemplified in FIG. 5B) and the liquid collection region 302 are emptyable concurrently. In some embodiments the liquid collection region 302 and the solid collection region 150 may be independently openable.

FIG. 1A-24B exemplify a surface cleaning apparatus 100 having a first liquid separation stage 300 and a second liquid separation stage 400. As illustrated, the first liquid separation stage 300 may be a non-cyclonic momentum separator and the second liquid separation stage 400 may be cyclone 200.

FIG. 1A-2B exemplify an embodiment wherein the second liquid separation stage 400 is openable separately from the first liquid separation stage 300. As exemplified, the second liquid separation stage 400 has a second liquid collection region 402. The second liquid collection region 402 may form a part of the first liquid collection region 302, but in the exemplified embodiment, it is separate. As exemplified in FIG. 2B, the second liquid collection region 402 is external to a second liquid separation chamber 410 (e.g., the cyclone chamber as exemplified in FIG. 8B). The second liquid separation stage may in this embodiment is opened by an openable door 407, which is opened separately from door 307. Accordingly, the first liquid collection region 302 and the second liquid collection region 402 may be emptied independently.

If door 407 opens both the cyclone 200 and the second liquid collection region 402, then both the cyclone 200 and the second liquid collection region 402 may be emptied concurrently. If door 307 opens both the volume 318 and the first liquid collection region 302, then both the volume 318 and the first liquid collection region 302 may be emptied concurrently. It will be appreciated that a single door, which essentially comprises both doors 307 and 407, may be provided, in which case volume 318, the first liquid collection region 302, the cyclone 200 and the second liquid collection region 402 may be emptied concurrently.

Optionally, first liquid collection region 302 and second liquid collection region 402 may be in flow communication with a single separated liquid outlet port 306. In such an embodiment, liquid collected in the first liquid collection region 302 and additional liquid collected in the second liquid collection region 402 may be emptiable concurrently through a single separated liquid outlet port 306.

Alternately, there may be a conduit that provides for flow communication between the first liquid collection region 302 and the second liquid collection region 402. Accordingly, for example, liquid collected in the second liquid collection region 402 may pass through the conduit to the first liquid collection region 302 and may then be subsequently emptied from the first liquid collection region 302 through the separated liquid outlet port 306 of the first liquid collection region 302.

Alternately, each liquid collection region may have its own outlet port and the outlets ports may be openable concurrently, e.g., a single door may open both. Such an embodiment is exemplified in FIG. 6A-6C, wherein at least a portion of the second liquid collection region 402, or a conduit from the second liquid collection region 402, is positioned underneath the first liquid collection region 302. As shown, the first liquid collection region 302 has a first separated liquid outlet port 306 and the second liquid collection region 402 has a second separated liquid outlet port 406. during operation, the openable end may be lifted such that both of the first separated liquid outlet port 306 and the second separated liquid outlet port 406 may be opened concurrently, such that liquid collected in each region may be emptied concurrently.

Dual Cyclone Liquid Separation Stage

In accordance with this aspect, which may be used by itself or in combination with one or more other aspects, the liquid separation stage 300 has a cyclone assembly 200 having two or more cyclones 202 in parallel. An advantage of this aspect is that even if one cyclone 202 is partially or completely blocked with solid debris, the surface cleaning apparatus 100 may continue to operate through suction in the second cyclone 202. This aspect may be used with one or more of the surface cleaning head with a liquid separation stage, the porous liquid separation chamber, the angled floor of the liquid separation chamber, the emptying of the separated liquid storage region, the baffled wall of the separated liquid storage region, the emptying of the liquid separation chamber, the downflow region, the cyclonic liquid separator, the pre-motor filter housing, the vertical cyclonic liquid separation stage, the vertical cyclonic liquid separation stage with an emptying channel, and the vertical cyclone with a downstream liquid separation stage.

The cyclones 202 are positioned over the liquid collection region 302, which is separated by a porous member 330 in each cyclone 202.

As exemplified in FIG. 27A-29, two cyclones 202 are positioned laterally side by side. When the surface cleaning apparatus 100 is positioned on a floor in a storage position if the cyclones are provided in an upright section of an upright surface cleaning apparatus, the cyclone axis of rotation 206 extends generally vertically.

As exemplified in FIG. 28B, each cyclone 202 has a separated liquid outlet 304 having a porous member 330 positioned over the liquid collection region 302. In other words, the liquid collection region 302 underlies the two cyclones 202. It will be appreciated that the liquid collection region 302 may be located anywhere that is at a lower elevation than the separated liquid outlet 304 such that separated liquid will flow into the liquid collection region 302 due to gravity.

Figure 29:
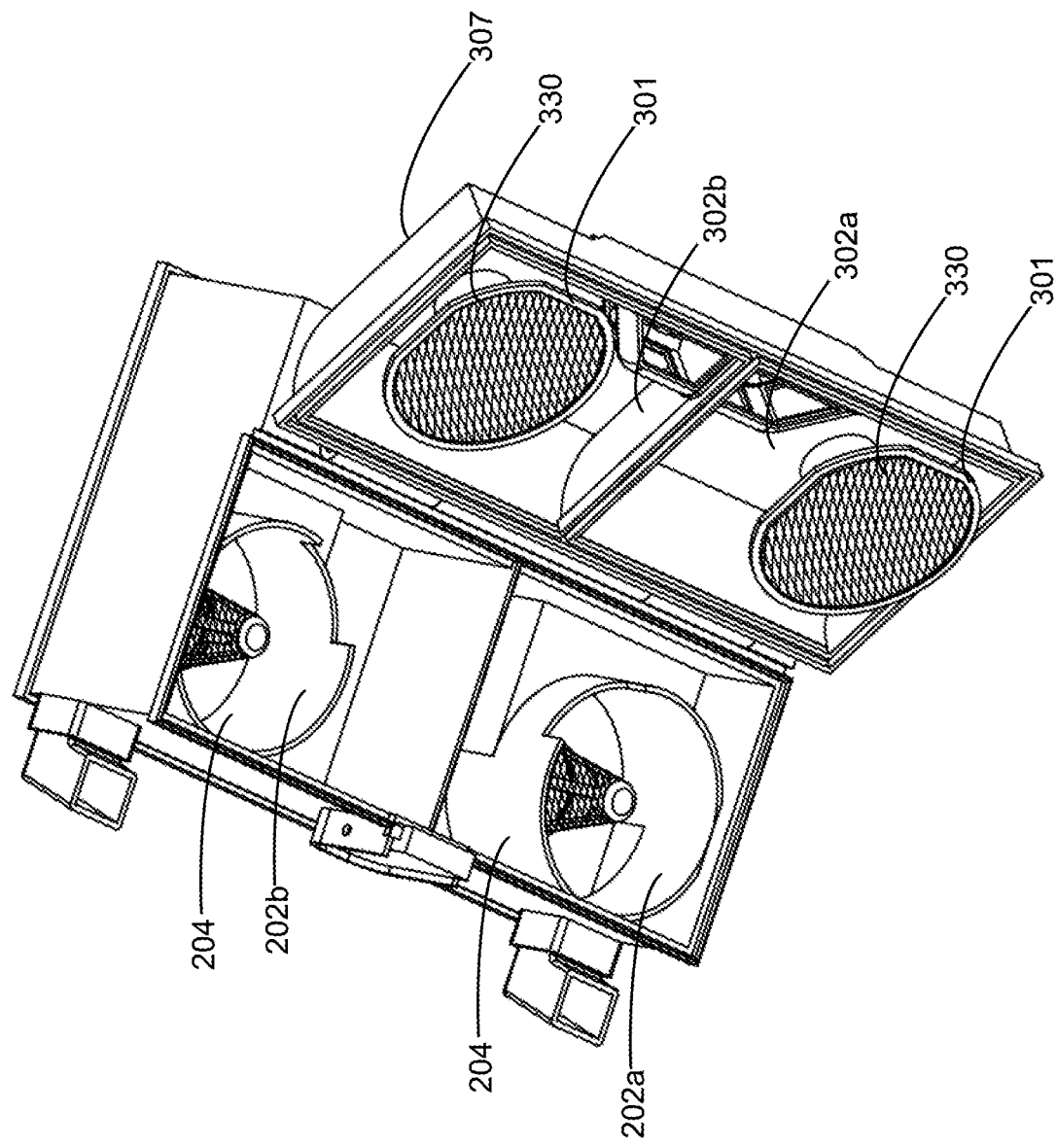
FIG. 29 is a bottom perspective view of the liquid separation stage of the surface cleaning apparatus of FIG. 27A, with a door to the liquid separation stage opened.
Figure 30C:
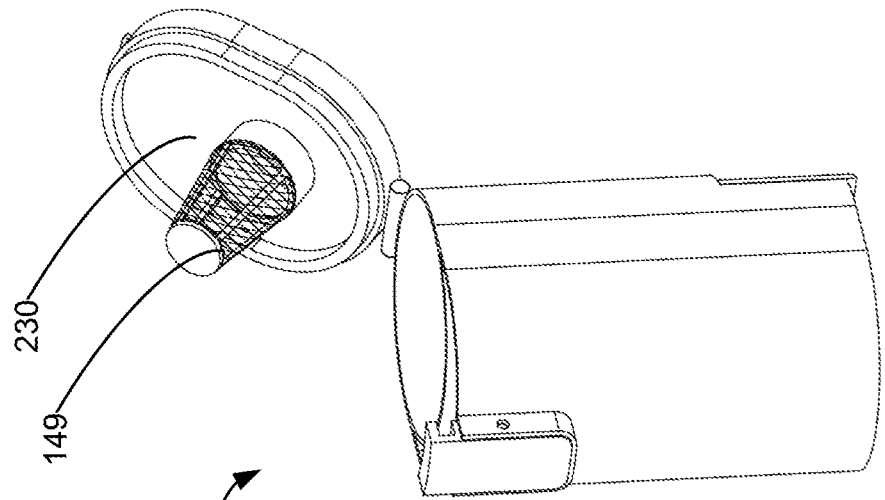
FIG. 30C is a front perspective view of the surface cleaning apparatus of FIG. 30A with the door opened.
Figure 30B:
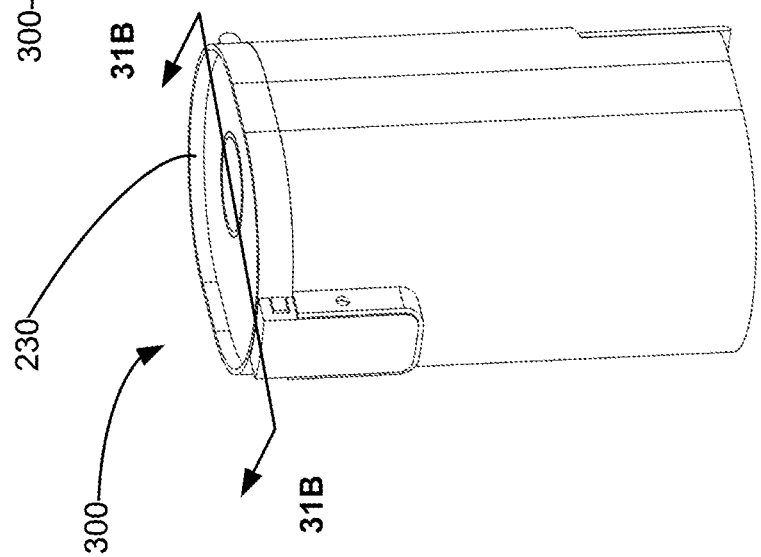
FIG. 30B is a front perspective view of the liquid separation stage of the surface cleaning apparatus of FIG. 30A with a door closed.
Figure 30A:
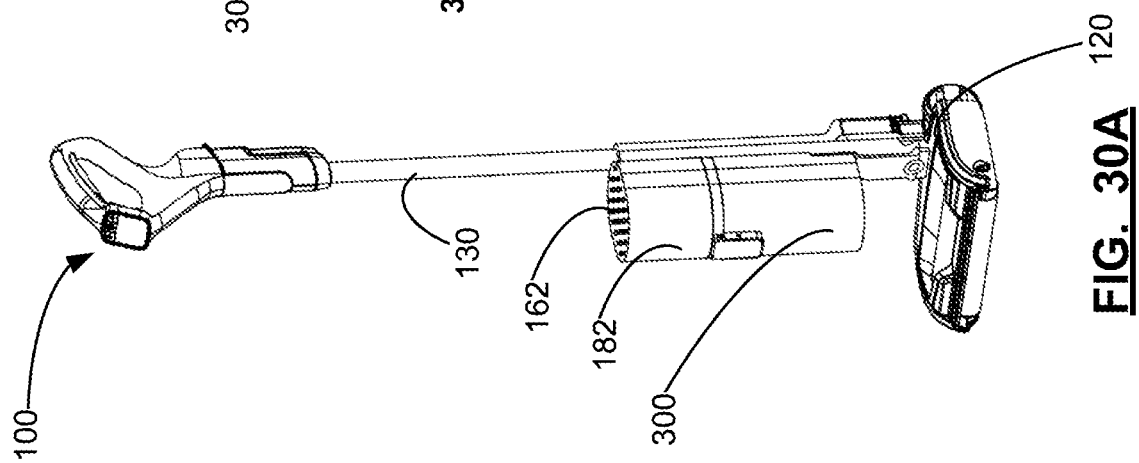
FIG. 30A is a front perspective view of another surface cleaning apparatus.
Figure 32B:
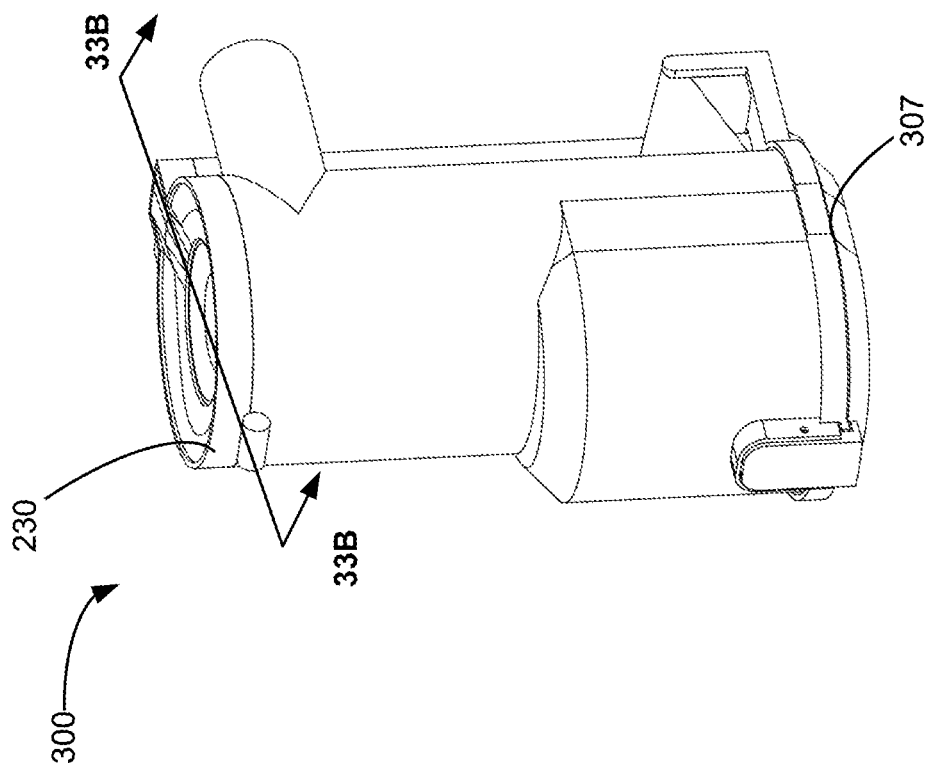
FIG. 32B is a front perspective view of the liquid separation stage of the surface cleaning apparatus of FIG. 32A with both doors closed.
Figure 32A:
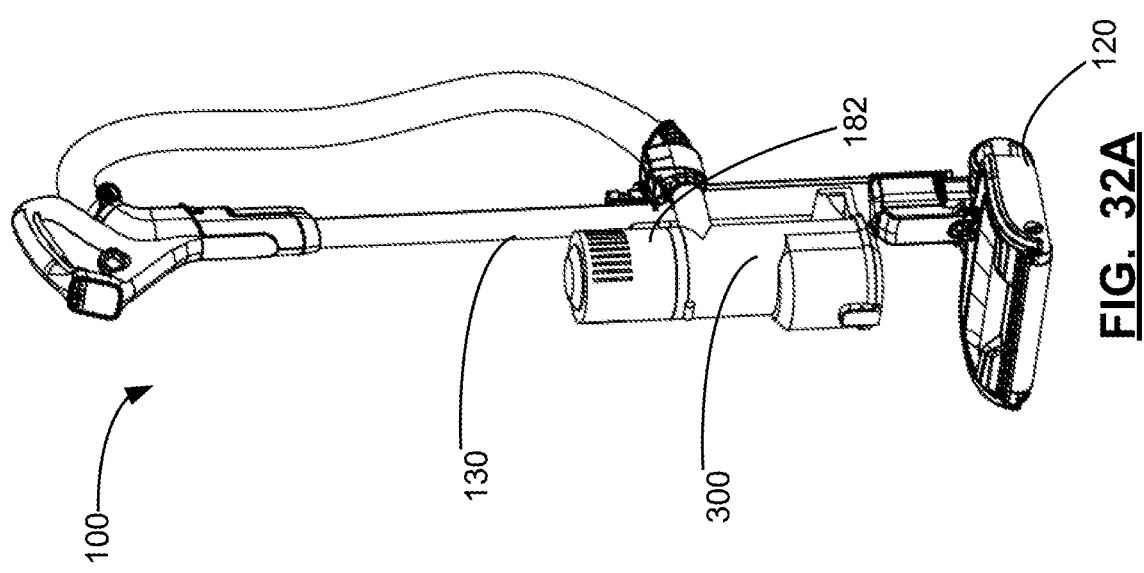
FIG. 32A is a front perspective view of another surface cleaning apparatus.

It will be appreciated that a single liquid collection region 302 may be shared by each cyclone 202, or as exemplified in FIG. 29, each cyclone may have its own liquid collection region that are independent from one another. For example, the liquid collection region 302 may include a first portion 302a in flow communication with the first cyclone 202a and a second portion 302b in flow communication with the second cyclone 202b. The first portion 302a and the second portion 302b are isolated from each other. It will be appreciated that, alternately, they may form a single contiguous region in communication with the cyclones 202.

If the cyclone 202 is oriented vertically, then a lower end of the liquid separation stage 300 may be openable to empty the cyclone chamber 204 and/or the pre-motor filter liquid collection region. As exemplified in FIG. 29, an upper end 301 of the pre-motor filter liquid collection region 302 is located at the elevation of the porous member 330. The upper end 301 of the liquid collection region 302 is moveably mounted to ta lower end of the liquid separation stage 300 between a closed position and an open emptying position in which the liquid collection region 302 is moved with respect to the cyclone chamber 210. As shown in FIG. 29, the porous member 330 may move to an open position when the liquid collection region 302 is moved to the open emptying position. In some embodiments, the porous member 330 may remain in position when the liquid collection region 302 is moved to the open emptying position.

As exemplified in FIG. 28A, the liquid collection region 302 may have one or more drain plugs 308 positioned in openings. During operation, the drain plug 308 is removed from the opening to allow liquid to drain from the liquid collection region 302. Drain plugs may be used in any liquid collection region and may be provided in any surface of the liquid collection region.

Pre-Motor Filter Housing

In accordance with this aspect, which may be used by itself or in combination with one or more other aspects, the surface cleaning apparatus 100 may include a pre-motor filter housing 192 in which a pre-motor filter media 190 is positionable. This aspect may be used with one or more of the surface cleaning head with a liquid separation stage, the porous liquid separation chamber, the angled floor of the liquid separation chamber, the emptying of the separated liquid storage region, the baffled wall of the separated liquid storage region, the emptying of the liquid separation chamber, the downflow region, the cyclonic liquid separator, the dual cyclone liquid separation stage, the vertical cyclonic liquid separation stage, the vertical cyclonic liquid separation stage with an emptying channel, and the vertical cyclone with a downstream liquid separation stage.

Optionally, as exemplified in FIG. 28B, the pre-motor filter housing 192 is positioned in the surface cleaning head 120 rearward of the cyclone assembly 200. The pre-motor filter housing 192 may extend from the first lateral side to the second lateral side of the surface cleaning head 120.

As exemplified in FIG. 27B, the liquid separation stage 300 may be removably mounted in the surface cleaning head 120. The pre-motor filter housing 192 may also be removable from the surface cleaning head 120, optionally concurrently with the liquid separation stage 300 as exemplified in FIG. 27B.

In some embodiments, the surface cleaning head 120 may include a pre-motor filter liquid collection region that is in flow communication with the pre-motor filter housing 192. The pre-motor filter liquid collection region may be positioned rearward of the first liquid collection region 302. As discussed with respect to the second liquid collection region 402, this pre-motor filter liquid collection region may be emptied independently from or concurrently with the first liquid collection region 302. In some embodiments, the pre-motor filter liquid collection region may be contiguous with the first liquid collection region 302.

Vertical Cyclonic Liquid Separation Stage

In accordance with this aspect, which may be used by itself or in combination with one or more other aspects, the liquid separation stage 300 is a cyclonic liquid separation stage having one or more cyclones 202 with a cyclone axis of rotation 206 that extends generally vertically and with a separated liquid outlet 304, which may be a porous member 330, provided at a lower end of the cyclone(s) 202 and optionally positioned above a liquid collection region 302. This aspect may be used with one or more of the surface cleaning head with a liquid separation stage, the porous liquid separation chamber, the angled floor of the liquid separation chamber, the emptying of the separated liquid storage region, the baffled wall of the separated liquid storage region, the emptying of the liquid separation chamber, the downflow region, the cyclonic liquid separator, the dual cyclone liquid separation stage, the pre-motor filter housing, the vertical cyclonic liquid separation stage with an emptying channel, and the vertical cyclone with a downstream liquid separation stage.

Figure 38B:
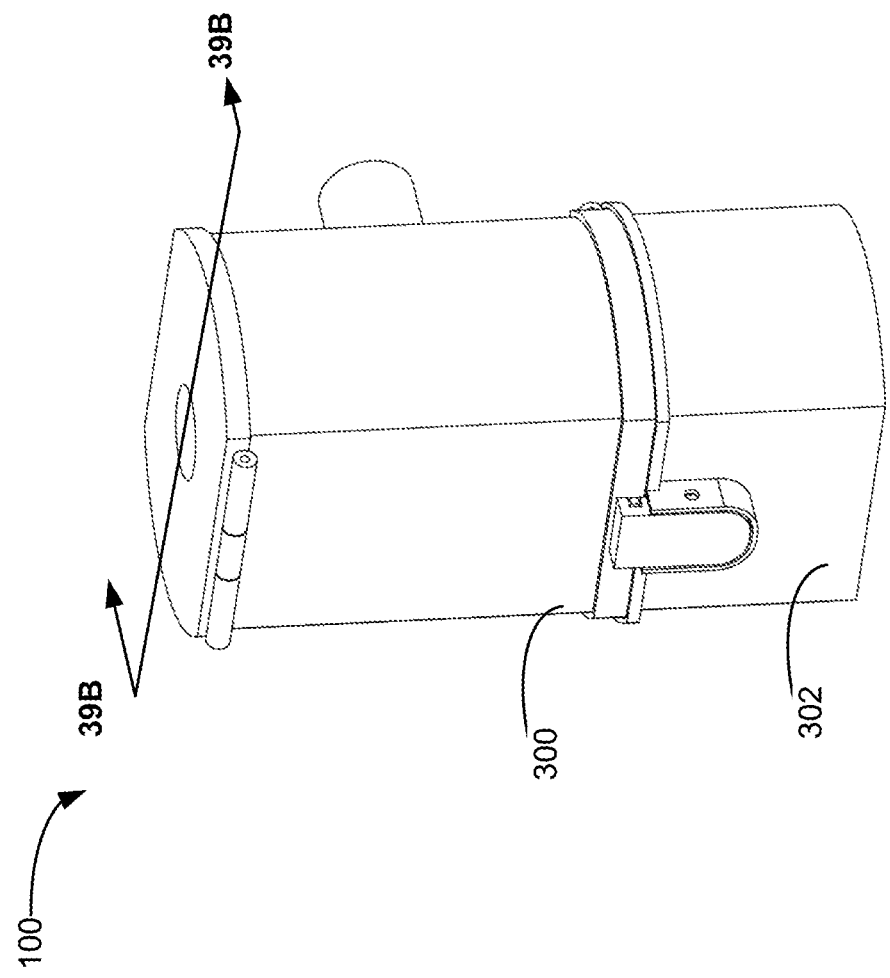
FIG. 38B is a front perspective view of the liquid separation stage of the surface cleaning apparatus of FIG. 38A with both doors closed.
Figure 38A:
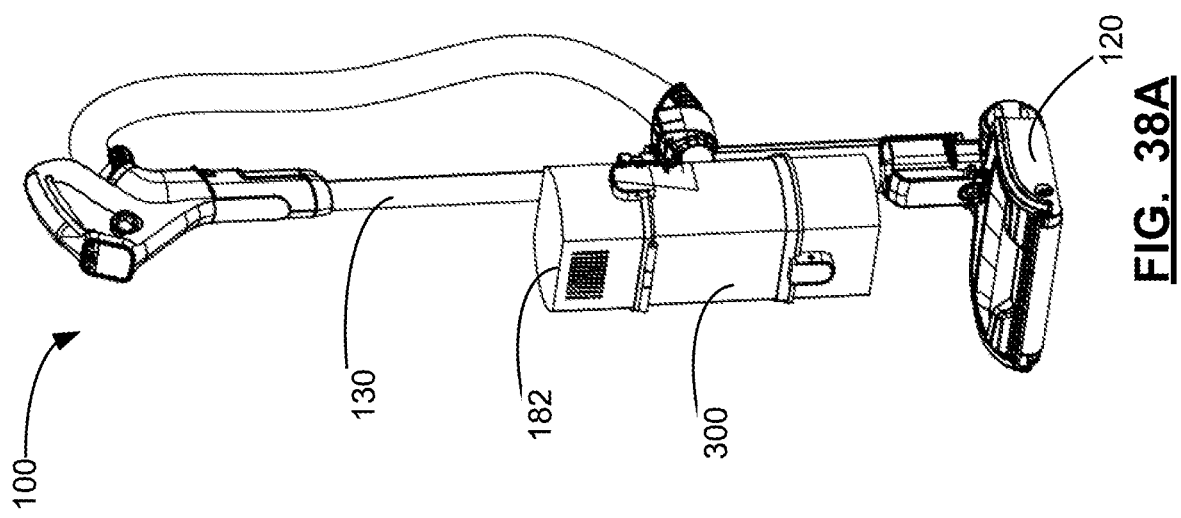
FIG. 38A is a front perspective view of another surface cleaning apparatus.

An advantage of this aspect is that by positioning the liquid collection region 302 below the cyclone assembly 200, the centre of mass may be lowered, thereby making the surface cleaning apparatus 100 easier for the user to operate, particularly if the cyclone assembly 200 is provided on the upright portion 130 of an upright vacuum cleaner as exemplified in FIG. 38A. Liquid collected by the cyclone assembly 200 can increase in weight rapidly during cleaning. Accordingly, lowering the centre of mass of the upright portion 130 may make it easier for the user to move the apparatus while also reducing the likelihood of injury.

As exemplified in FIGS. 30A-39B, the liquid separation stage 300 is positioned on the upright portion 130 of the surface cleaning apparatus 100. The upright portion 130 is moveably mounted to the surface cleaning head 120 between an upright storage position and a reclined in use position. The suction motor 180 may be positioned above the liquid separation stage 300, as exemplified in FIGS. 30A, 32A, 36A, and 38A or may be positioned below the liquid separation stage as exemplified in FIG. 34A.

As exemplified in FIGS. 30A-39B, the upright portion 130 has a single cyclone 202 with a cyclone axis of rotation 206 that extends generally vertically when the surface cleaning apparatus 100 is positioned on a floor and the upright portion 130 is in a storage position.

As exemplified in FIGS. 30A-39B, the liquid collection region 302 may underly the porous member 330 such that the cyclone axis of rotation 206 extends through the liquid collection region 302. As exemplified, the liquid collection region 302 underlies the separated liquid outlet 304, which comprises or consists of a porous member 330. In other words, the porous member 330 is positioned at the lower end of the cyclone 202 with the liquid collection region 302 positioned at an elevation below the porous member 330. The cyclone stage second end 208 has a lower wall 213 that forms a liquid collection surface of the liquid collection region 302. As discussed previously, the liquid collection region 302 may be at a lower elevation than the outlet 304 and need not partially or fully underlie the cyclone 202.

Optionally, the cyclone chamber 204 may have a cyclone chamber lower end wall 224. The cyclone chamber lower end wall 224 may be, for example, a moveable plate as discussed subsequently. As exemplified in FIG. 33B, the lower end wall 224 is positioned at an elevation above the porous member 330 and the separated liquid outlet 304 includes a gap 226 between the cyclone chamber lower end wall 224 and the sidewall 220. Accordingly, solid material may exit the cyclone chamber via the gap 226 and collect in a solid collection region that is located between the plate and the screen 330. Liquid may also exit the cyclone chamber via the gap 226 and then flow downwardly through the screen in to the liquid collection region.

It will be appreciated that each of the cyclone chamber, the solid collection region and the liquid collection region may be emptiable concurrently or one or more, and optionally all, may be emptied concurrently. Accordingly, as discussed previously with respect to FIG. 29, the lower end of the cyclone assembly 200 may be openable to empty the liquid collection region and/or the cyclone 202.

FIG. 31A exemplifies an embodiment wherein the cyclone chamber and the liquid collection region are opened concurrently. As exemplified, the cyclone stage second end 208 is openable such that liquid collection region is opened. The porous member 330 is, e.g., pivotally mounted to a sidewall of the cyclone chamber 204 such that, when cyclone stage second end 208 is opened, the porous member 330 is moveable from the in use position in which the screen overlies the lower wall 213 of the liquid collection region 302 (as shown in FIG. 31B) to an emptying position in which the porous member 330 is moved (pivots) downwardly to an open position (as shown in FIG. 31A). In the open position, the cyclone chamber 204 is opened.

Figures 33A, 33B:
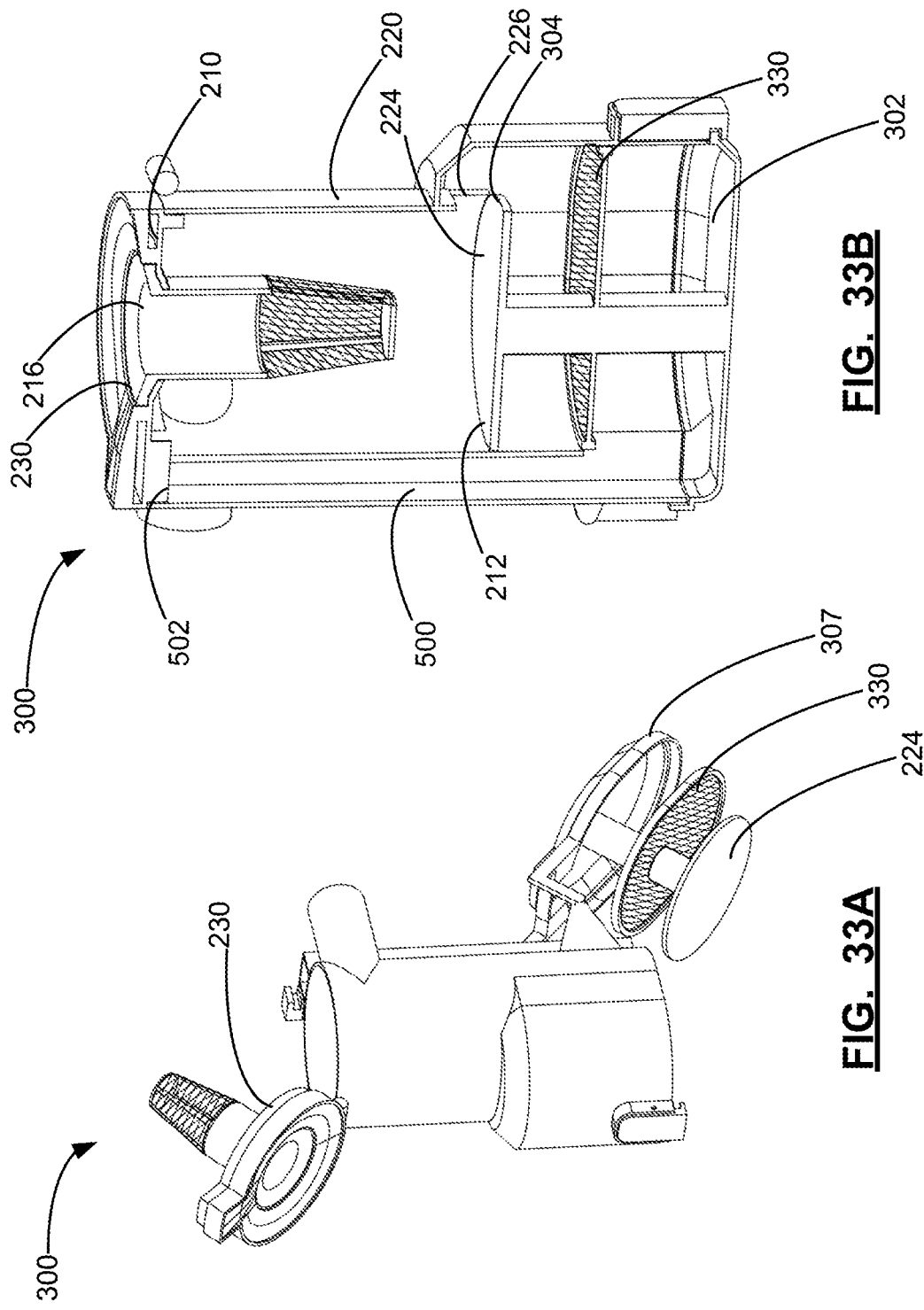
FIG. 33A is a front perspective view of the liquid separation stage of the surface cleaning apparatus of FIG. 33A with both doors opened.
FIG. 33B is a side cross-sectional view of the liquid separation stage of the surface cleaning apparatus of FIG. 33A, taken along the line 33B-33B in FIG. 32B.
Figure 34B:
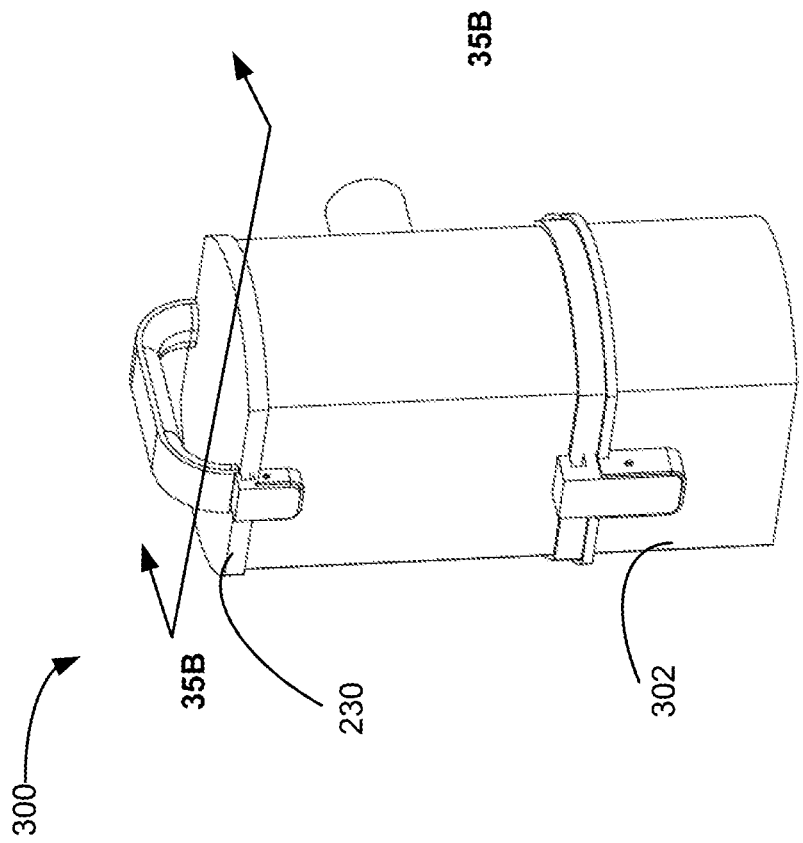
FIG. 34B is a front perspective view of the liquid separation stage of the surface cleaning apparatus of FIG. 34A with both doors closed.
Figure 34A:
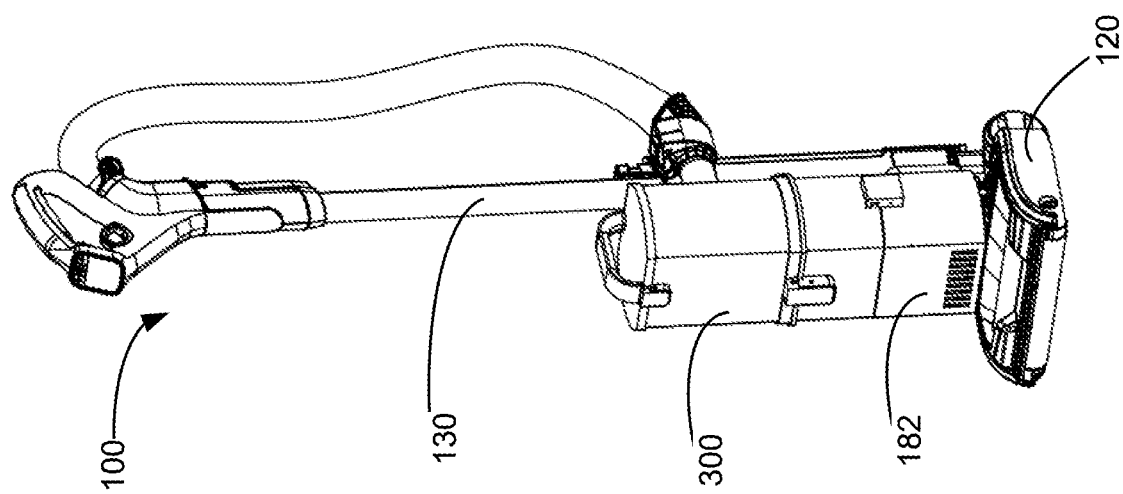
FIG. 34A is a front perspective view of another surface cleaning apparatus.

FIG. 33A exemplifies an embodiment wherein the cyclone chamber, the solid collection region and the liquid collection region are opened concurrently. As exemplified, the cyclone chamber lower end wall 224 is moveable between an in use position, in which the cyclone chamber lower end wall 224 closes the cyclone chamber other than the gap 226 and an emptying position in which the cyclone chamber lower end wall 224 is moved (e.g., rotated) so as to open the lower end of the cyclone chamber.

As exemplified in FIG. 33A, the cyclone chamber lower end wall 224 and the porous member 330 are supported by lower wall 213 such that cyclone chamber lower end wall 224, porous member 330 and lower wall 213 move concurrently to open each of the cyclone chamber, the solid collection region and the liquid collection region.

Figure 35B:
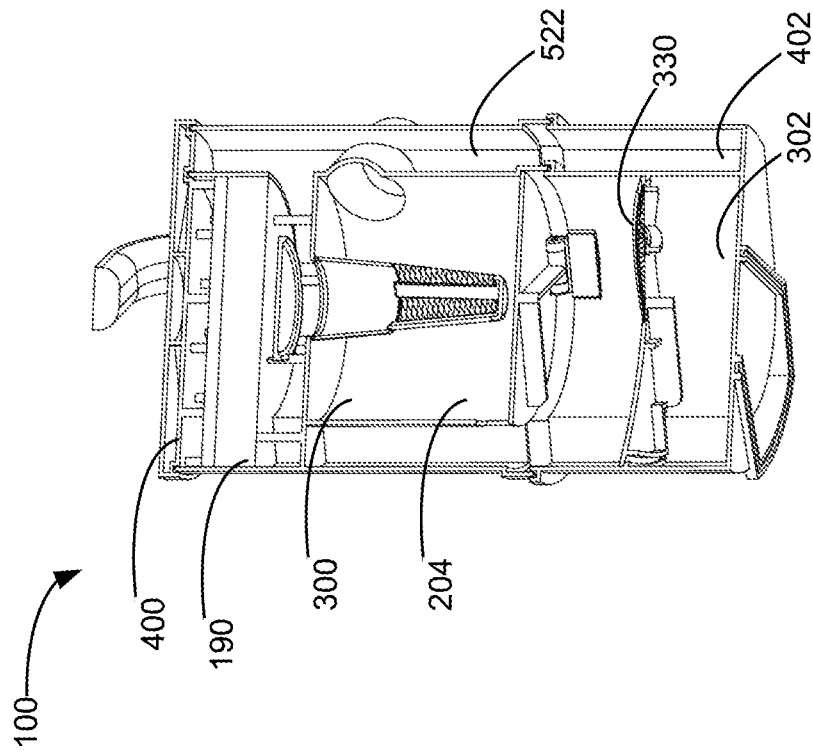
FIG. 35B is a front cross-sectional view of the liquid separation stage of the surface cleaning apparatus of FIG. 34A, taken along the line 35B-35B in FIG. 34B.
Figure 35A:
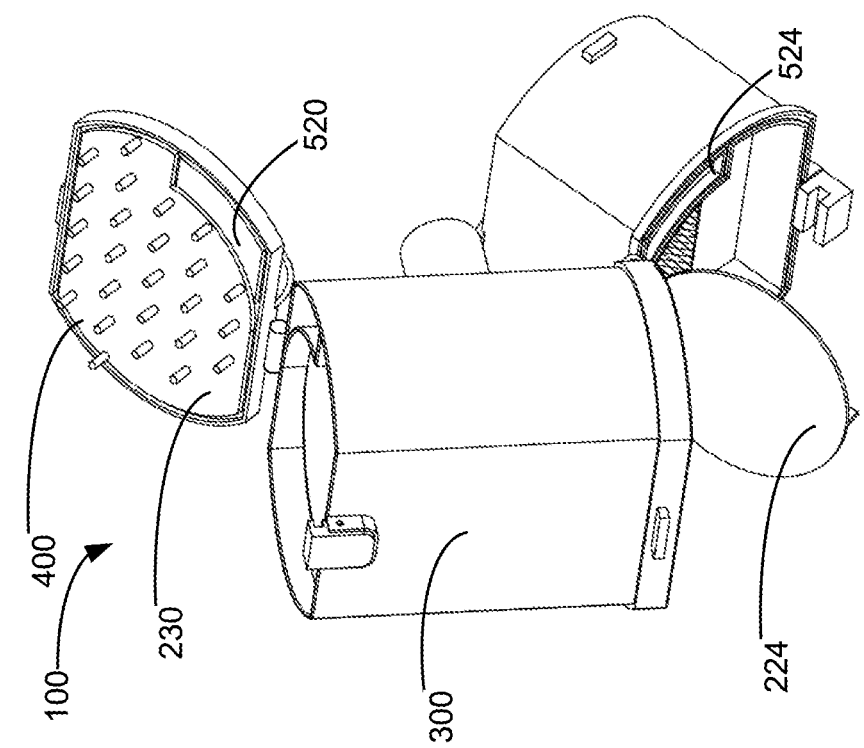
FIG. 35A is a front perspective view of the liquid separation stage of the surface cleaning apparatus of FIG. 34A with both doors opened.
Figure 39B:
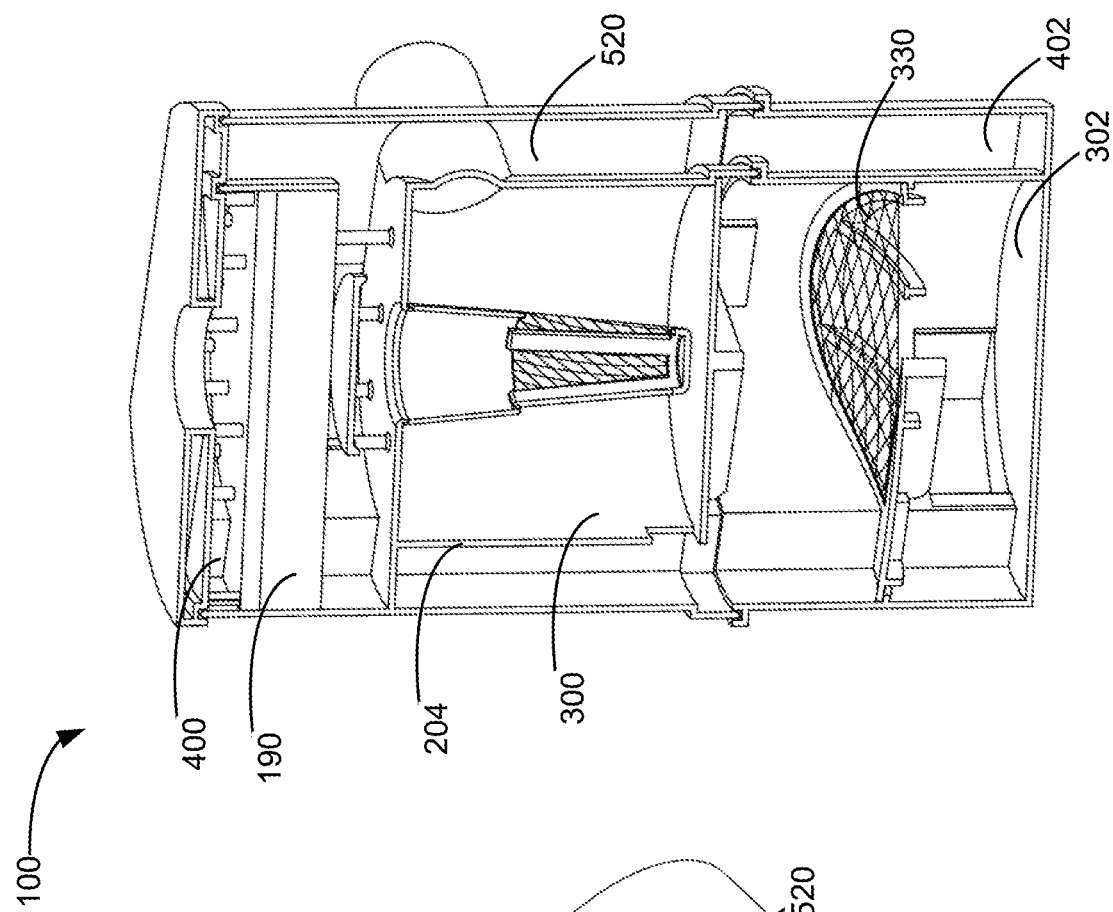
FIG. 39B is a front cross-sectional view of the liquid separation stage of the surface cleaning apparatus of FIG. 38A, taken along the line 39B-39B in FIG. 38B.
Figure 39A:
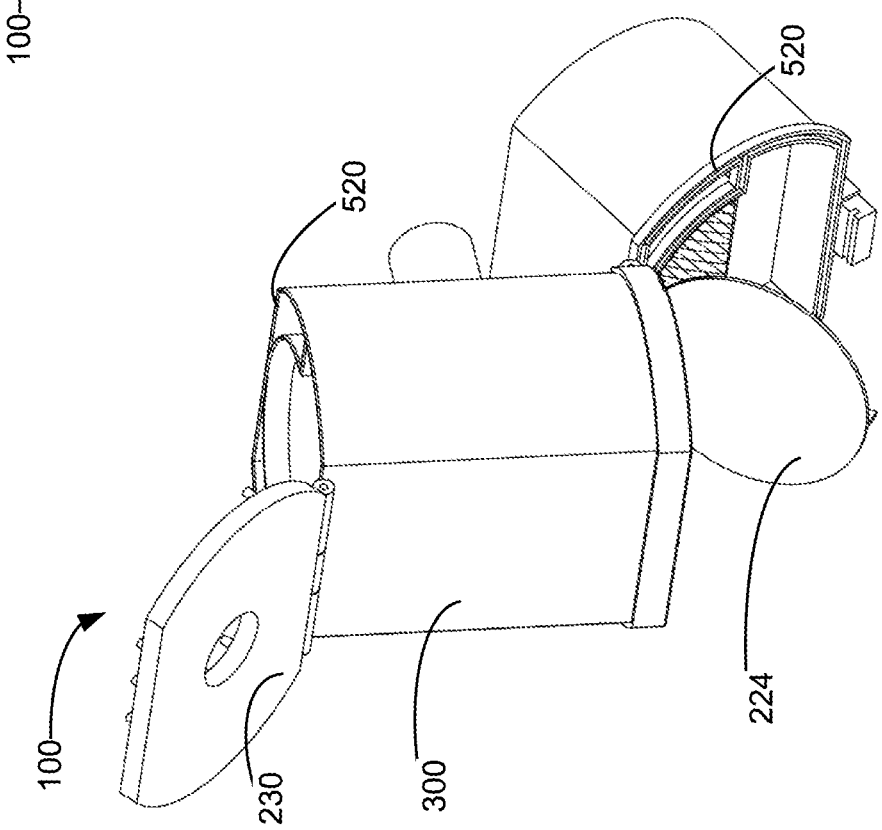
FIG. 39A is a front perspective view of the liquid separation stage of the surface cleaning apparatus of FIG. 38A with both doors opened.

As exemplified in FIGS. 35A, 36C, and 39A, the cyclone chamber lower end wall 224 is moveable separately from the porous member 330 and lower wall 213. As exemplified, the cyclone chamber lower end wall 224 is pivotally mounted to the cyclone chamber sidewall. When the lower wall 213 is opened, the porous member 330 moves concurrently with the lower end wall 213 such that the liquid collection region remains closed. The cyclone chamber lower end wall 224 moves when the lower end wall 213 opens whereby the cyclone chamber and the solid collection region may be emptied concurrently. Accordingly solid material collected in the cyclone chamber and the solid collection region may be empties separately from liquid collected in the liquid collection region.

As discussed previously, one or more baffles may be provided in the liquid collection region 302. The baffles may extend generally axially in the liquid collection region 302, extending from the lower wall 213. The baffles may extend perpendicular to the forward direction of the surface cleaning apparatus 100.

Vertical Cyclonic Liquid Separation Stage with an Emptying Channel

In accordance with this aspect, which may be used by itself or in combination with one or more other aspects, a vertically oriented cyclone has a pour out channel to enable the liquid collection region to be empties without moving the porous member 300. This aspect may be used with one or more of the surface cleaning head with a liquid separation stage, the porous liquid separation chamber, the angled floor of the liquid separation chamber, the emptying of the separated liquid storage region, the baffled wall of the separated liquid storage region, the emptying of the liquid separation chamber, the downflow region, the cyclonic liquid separator, the dual cyclone liquid separation stage, the pre-motor filter housing, the vertical cyclonic liquid separation stage, and the vertical cyclone with a downstream liquid separation stage.

As exemplified in FIG. 33B, the surface cleaning apparatus 100 has a top openable cyclone assembly to enable liquid collected in the liquid collection region 302 to be poured out of the cyclone assembly 200. In this embodiment, liquid emptying channel 500 extends between the liquid collection region 302 and the cyclone first end 210. As shown in FIGS. 31B and 33B, the liquid emptying channel 500 is positioned between the cyclone chamber sidewall 220 and the sidewall of the cyclone assembly. The liquid emptying channel 500 has an upper end 502 that is openable such that liquid from the liquid collection region 302 may be poured out when the cyclone assembly 200 is inverted. Accordingly, a user may remove the liquid separation stage from the surface cleaning apparatus 100 and tilt the liquid separation stage 300 to pour out collected liquid from the liquid collection region 302 through the liquid emptying channel 500.

Optionally, as exemplified in FIG. 33A, the cyclone first end 210 may be openable concurrently with the upper end 502 of the liquid emptying channel 500 such that the cyclone chamber 204 is opened concurrently with the liquid emptying channel 500. Accordingly, the solid and the liquid debris may be emptied through the same end of the liquid separation stage 300. In some embodiments, the cyclone chamber 204 and liquid emptying channel 500 may be emptied independently of each other.

If the lower end of the cyclone assembly 200 is openable, then the upper end of the liquid emptying channel 500 may open with the lower end of the cyclone assembly 200. Accordingly, as exemplified in FIG. 35A, opening the lower end of the cyclone assembly may open the cyclone chamber and the solid collection region and liquid collected in the liquid collection region may then be poured out through upper end 502 of the liquid emptying channel 500 (upper end 502 of the liquid emptying channel 500 may be positioned beside second liquid emptying port 524 but is not shown in FIG. 35A).

Vertical Cyclone with a Downstream Liquid Separation Stage

In accordance with this aspect, which may be used by itself or in combination with one or more other aspects, the surface cleaning apparatus 100 may include a second liquid separation stage 400 downstream from the vertical cyclone(s). This aspect may be used if the vertical cyclone(s) are the first liquid separation stage. This aspect may be used with one or more of the surface cleaning head with a liquid separation stage, the porous liquid separation chamber, the angled floor of the liquid separation chamber, the emptying of the separated liquid storage region, the baffled wall of the separated liquid storage region, the emptying of the liquid separation chamber, the downflow region, the cyclonic liquid separator, the dual cyclone liquid separation stage, the pre-motor filter housing, the vertical cyclonic liquid separation stage and the vertical cyclonic liquid separation stage with an emptying channel.

The second liquid separation stage 400 may be any system capable of separating liquid from air flow. As exemplified, the second liquid separation stage 400 may be a filter media.

The second liquid separation stage 400 has a second liquid collection region 402 that is at a lower elevation than the second liquid separation stage 400 such that separated water may flow to the second liquid collection region 402 due to gravity.

As discussed previously, the second liquid collection region 402 may be isolated from the first liquid collection region 302 and emptiable separately or concurrently therewith. Alternately, the second liquid collection region 402 may be in flow communication with or contiguous with the first liquid collection region 302. Any embodiment discussed herein to enable a second liquid collection region 402 and a first liquid collection region 302 to be emptied separately or concurrently may be used. Accordingly, the second liquid collection region 402 may be openable concurrently with the cyclone chamber 204 and/or the liquid emptying channel 500.

As exemplified in FIG. 35A, 35B, the second liquid separation stage 400 may be positioned above the first cyclonic liquid separation stage 300 when the surface cleaning apparatus 100 is in the storage position and the liquid separation stages are provided on an upright portion 130 that is in the upright storage position. Optionally, the cyclone first end 210 comprises an openable lid 230 and the second liquid separation stage 400 is positioned in the openable lid 230. In such an embodiment, the second liquid collection region 402 may be positioned at an elevation below the openable lid 230.

The second liquid collection region 402 may have a second liquid emptying channel 520 extending between the second liquid separation stage 400 and the second liquid separation region 402. As exemplified in FIG. 35B, water separated by the second liquid separation stage may pass through upper port 522 and fall downwardly due to gravity through the second liquid emptying channel 520 to the second liquid collection region 402. The second liquid emptying channel 520 may be openable concurrently with the cyclone first end 210, as exemplified in FIG. 35A. Accordingly, as exemplified in FIG. 35A, the second liquid collection region 402 may be emptied through the second liquid emptying port 524 of the second liquid emptying channel 520.

Figure 37A:
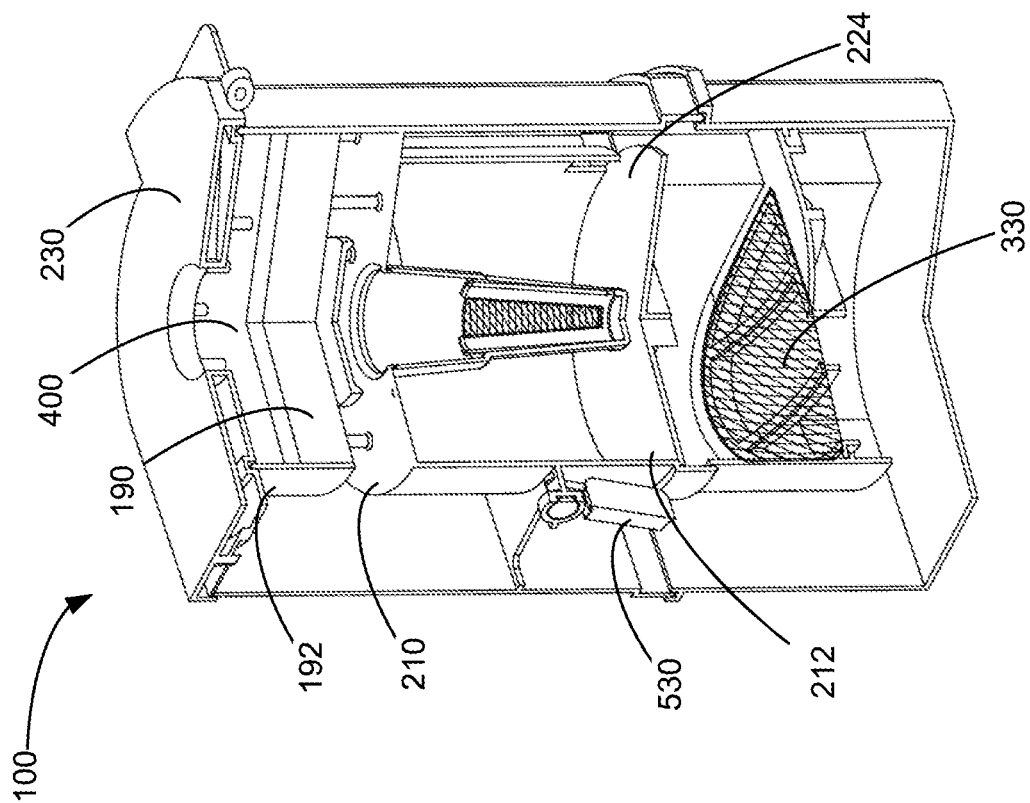
FIG. 37A is a front cross-sectional view of the liquid separation stage of the surface cleaning apparatus of FIG. 37A, taken along the line 37A-37A in FIG. 36B with a valve closed.
Figure 37B:
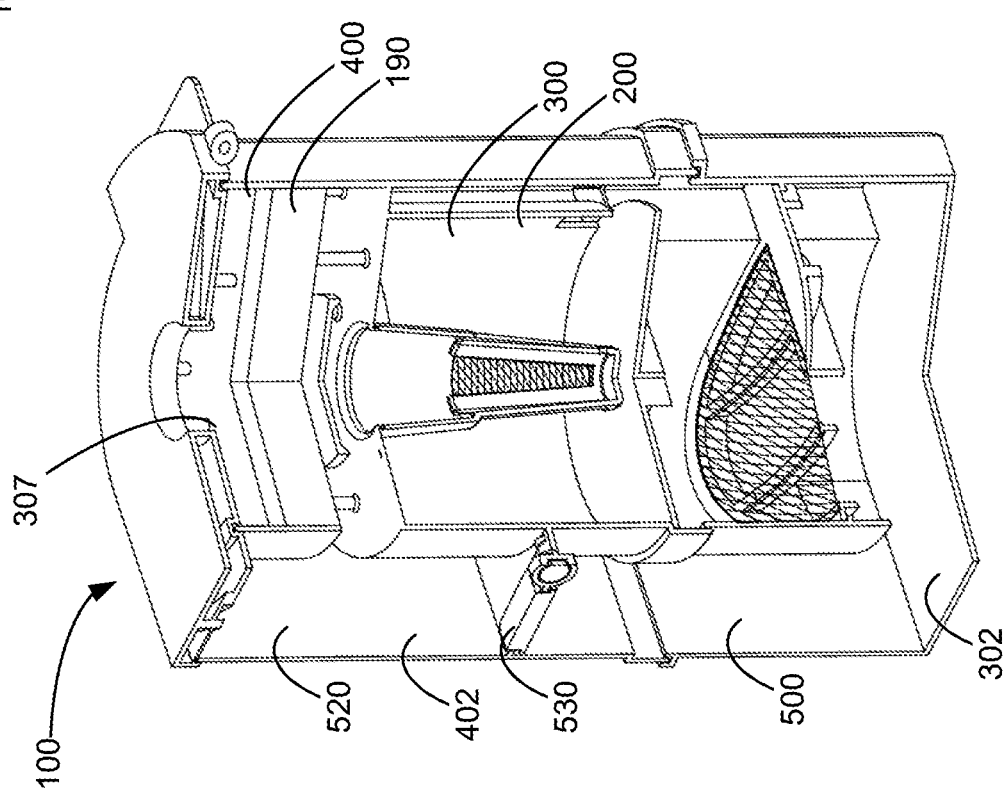
FIG. 37B is a cross-sectional view of the liquid separation stage of the surface cleaning apparatus of FIG. 36A, taken along the line 37A-37A in FIG. 36B with a valve open.

In some embodiments, as exemplified in FIGS. 37A-37B, the first liquid collection region 302 and the second liquid collection region 402 may be isolated from each other during use of the surface cleaning apparatus 100 to clean a floor, but may be connected in flow communication when the liquid separation stage 300 is to be emptied. As exemplified, the second liquid collection region 402 is positioned above the first liquid collection region 302, and may partially or fully overlie it. Alternately or in addition, the second liquid emptying channel 520 may be isolated from the first liquid emptying channel 500 during a cleaning operation and connected in flow communication when the liquid separation stage 300 is to be emptied. Accordingly, the second liquid emptying channel 520 may be positioned above the first liquid emptying channel 500, and may partially or fully overlie it. In the exemplified embodiment, the liquid collection regions comprise the channels.

As shown, a valve 530 separates the first liquid emptying channel 500 from the second liquid emptying channel 520. The valve 530 is closed while the surface cleaning apparatus 100 is in operation (FIG. 37A) and may be opened (FIG. 37A) when the surface cleaning apparatus 100 is turned off or the cyclone assembly 200 is opened. Accordingly, during operation, liquid may collect in the first liquid collection region 302 and in the second liquid collection region 402. When the user opens the openable lid 230 to empty the liquid collection regions, the valve 530 may be opened such that liquid from both regions may be emptied simultaneously.

Alternately, the valve 530 may be a solenoid valve that is coupled to the power supply to the suction motor 180. Accordingly, when the surface cleaning apparatus 100 is in use, the valve 530 may be in the closed position, as exemplified in FIG. 37A. When the surface cleaning apparatus 100 is no longer in use, the solenoid valve 530 may move to the open position, as exemplified in FIG. 37B, causing liquid collected in the second liquid collection region 402 to combine with the liquid collected in the first liquid collection region 302, thereby allowing for concurrent emptying of both liquid collection regions.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Clause Set A:
1. A surface cleaning apparatus comprising a surface cleaning head, the surface cleaning head comprising:
    (a) a liquid separation stage comprises a liquid separation chamber and a separated liquid storage region;
    (b) the liquid separation chamber comprises an air inlet, a partially treated air outlet, a lower wall having a separated liquid outlet that is in flow communication with the separated liquid storage region and a volume internal the liquid separation stage that is defined by a volume lower wall, a volume sidewall and a volume upper wall, a porous member comprises at least a portion of the volume lower wall and the volume sidewall; and, (c) the separated liquid storage region has a lower liquid collection wall that is positioned at a lower elevation than the lower wall of the liquid separation chamber,
whereby liquid separated as air travels through the volume exits the volume through the separated liquid outlet and flows to the separated liquid storage region due to gravity.

2. The surface cleaning apparatus of clause 1 wherein at least a portion of the separated liquid storage region is positioned under the liquid separation chamber.

3. The surface cleaning apparatus of clause 1 wherein the liquid separation stage has a front side having the air inlet, a rear side and first and second laterally opposed sides, the lower wall of the separated liquid storage region having upwardly extending baffles wherein the baffles are disposed laterally between the first and second laterally opposed sidewalls.

4. The surface cleaning apparatus of clause 1 wherein the volume sidewall comprises a front sidewall, a rear sidewall, and first and second laterally opposed sidewalls and the at least a portion of the volume sidewall which is comprised by the porous member is the rear sidewall.

5. The surface cleaning apparatus of clause 4 wherein at least a portion of one of the first and second laterally opposed sidewalls is also porous.

6. The surface cleaning apparatus of clause 1 wherein the porous member comprises a screen.

7. The surface cleaning apparatus of clause 1 wherein the liquid separation chamber has an openable top.

8. The surface cleaning apparatus of clause 1 wherein the liquid separation stage further comprises an air impermeable wall that is spaced from and faces the at least a portion of the volume sidewall which is comprised by the porous member.

9. The surface cleaning apparatus of clause 8 wherein the liquid separation stage has a separated liquid outlet port provided in an upper portion of the liquid separation stage and the separated water outlet port is provided between the air impermeable wall and the porous member that forms at least a portion of the volume sidewall.

10. The surface cleaning apparatus of claim 9 wherein the separated liquid outlet port is provided in a sidewall of the liquid separation stage.

11. The surface cleaning apparatus of clause 9 wherein the separated liquid outlet port comprises an openable top wall of the liquid separation stage.

12. The surface cleaning apparatus of clause 9 wherein the air inlet is provided in a front side of the liquid separation chamber and the air outlet is provided in a rear side of the liquid separation chamber and the air impermeable wall is provided at the rear side of the liquid separation chamber.

13. The surface cleaning apparatus of clause 1 wherein the lower wall of the liquid separation chamber is angled downwardly, and the separated liquid outlet comprises an opening in the lower wall of the liquid separation chamber.

14. The surface cleaning apparatus of clause 5 wherein the lower wall of the liquid separation chamber comprises a front portion that is angled rearwardly and downwardly and a rear portion that is angled forwardly and downwardly and the separated liquid outlet comprises an opening between the front portion and the rear portion.

15. A surface cleaning apparatus comprising:
(a) a liquid separation stage comprises a liquid separation chamber and a separated liquid storage region; and,
(b) the liquid separation chamber comprises an air inlet, a partially treated air outlet, a lower wall having a separated liquid outlet that is in flow communication with the separated liquid storage region and a volume internal the liquid separation stage that is defined by a volume lower wall, a volume sidewall and a volume upper wall, a porous member comprises at least a portion of the volume lower wall and the volume sidewall,
wherein the lower wall of the liquid separation chamber comprises a front portion that is angled rearwardly and downwardly and a rear portion that is angled forwardly and downwardly and the separated liquid outlet comprises an opening between the front portion and the rear portion.

16. The surface cleaning apparatus of clause 15 wherein the porous member comprises at least a portion of the volume lower wall comprising a screen that is spaced from and overlies the lower wall of the liquid separation chamber.

17. The surface cleaning apparatus of clause 16 wherein at least a portion of the separated liquid storage region is positioned under the liquid separation chamber.

18. The surface cleaning apparatus of clause 15 wherein the liquid separation stage has a front side having the air inlet, a rear side and first and second laterally opposed sides, a lower wall of the separated liquid storage region has upwardly extending baffles wherein the baffles are disposed laterally between the first and second laterally opposed sidewalls.

19. The surface cleaning apparatus of clause 15 wherein the liquid separation stage further comprises an air impermeable wall that is spaced from and faces the at least a portion of the volume sidewall which is comprised by the porous member.

20. The surface cleaning apparatus of clause 15 wherein the volume and the liquid collection region are concurrently openable.

Clause Set B:

1. A surface cleaning apparatus comprising:
(a) a liquid separation stage comprising a liquid separation chamber and a separated liquid storage region;
(b) the liquid separation chamber comprises an air inlet, a partially treated air outlet, a separated liquid outlet that is in flow communication with the separated liquid storage region and a volume internal the liquid separation stage that is defined by a volume lower wall, a volume sidewall and a volume upper wall, a porous member comprises at least a portion of the volume sidewall wherein an air impermeable wall is spaced from and faces the at least a portion of the volume sidewall which is comprised by the porous member,
whereby liquid separated as air travels through the volume exits the volume through the porous member and flows downwardly through a downflow region between the porous member and the air impermeable wall to the separated liquid storage region.

2. The surface cleaning apparatus of clause 1 wherein at least a portion of the separated liquid storage region is positioned under the liquid separation chamber.

3. The surface cleaning apparatus of clause 1 wherein the liquid separation stage has a front side having the air inlet, a rear side and first and second laterally opposed sides, a lower wall of the separated liquid storage region having upwardly extending baffles wherein the baffles are disposed laterally between the first and second laterally opposed sidewalls.
4. The surface cleaning apparatus of clause 1 wherein the volume sidewall comprises a front sidewall, a rear sidewall, and first and second laterally opposed sidewalls and the at least a portion of the volume sidewall which is comprised by the porous member is the rear sidewall.
5. The surface cleaning apparatus of clause 4 wherein at least a portion of one of the first and second laterally opposed sidewalls is also porous.
6. The surface cleaning apparatus of clause 1 wherein the porous member comprises a screen.
7. The surface cleaning apparatus of clause 1 wherein a lower wall of the separated liquid storage region is openable.
8. The surface cleaning apparatus of clause 1 wherein the lower wall of the liquid separation chamber comprises a front portion that is angled rearwardly and downwardly and a rear portion that is angled forwardly and downwardly and the separated liquid outlet comprises an opening between the front portion and the rear portion.
9. The surface cleaning apparatus of clause 8 wherein the rear portion underlies the downflow region.
10. The surface cleaning apparatus of clause 1 wherein the liquid separation stage has a separated liquid outlet port provided in an upper portion of the liquid separation stage and the separated water outlet port is provided between the air impermeable wall and the porous member that forms at least a portion of the volume sidewall.
11. The surface cleaning apparatus of clause 10 wherein the separated liquid outlet port is provided in a sidewall of the liquid separation stage.
12. The surface cleaning apparatus of clause 10 wherein the separated liquid outlet port comprises an openable top wall of the liquid separation stage.
13. The surface cleaning apparatus of clause 1 wherein the air inlet is provided in a front side of the liquid separation chamber and the air outlet is provided in a rear side of the liquid separation chamber and the air impermeable wall is provided at the rear side of the liquid separation chamber.
14. The surface cleaning apparatus of clause 1 wherein the liquid separation stage is provided in a surface cleaning head and the surface cleaning apparatus further comprises a cyclone that is downstream from and rearward of the liquid separation stage.
15. The surface cleaning apparatus of clause 14 wherein the liquid separation stage has a front side having the air inlet, a rear side and first and second laterally opposed sides and the cyclone has a cyclone axis of rotation that extends laterally.
16. The surface cleaning apparatus of clause 15 wherein the cyclone has a dirt outlet in communication with a separated solid storage region and at least a portion of the separated solid storage region is positioned under the separated liquid storage region.
17. The surface cleaning apparatus of clause 14 further comprising a suction motor positioned in the surface cleaning head downstream of the cyclone.
18. The surface cleaning apparatus of clause 15 wherein the cyclone has a cyclone air inlet at one lateral end of the cyclone and a cyclone air outlet as a second opposed lateral end of the cyclone.
19. The surface cleaning apparatus of clause 18 further comprising a suction motor positioned in the surface cleaning head downstream of the cyclone and the suction motor has an inlet end that faces the cyclone air outlet.

Clause Set C:
1. A surface cleaning apparatus comprising:
   (a) a first liquid separation stage comprising a cyclone having a cyclone axis of rotation, a cyclone first end, an axially spaced apart second end, a cyclone air inlet, a cyclone air outlet and an axially extending sidewall wherein a portion of the sidewall comprises a screen and, when the surface cleaning apparatus is in use to clean a floor, the cyclone axis of rotation extends generally horizontally; and,
   (b) a first liquid collection region that is positioned at a lower elevation than the screen.
2. The surface cleaning apparatus of clause 1 wherein the cyclone is provided in a surface cleaning head.
3. The surface cleaning apparatus of clause 1 wherein the cyclone air inlet is provided at the first end and the cyclone air outlet is provided at the second end.
4. The surface cleaning apparatus of clause 1 wherein the first liquid separation stage has an openable wall, the cyclone axis of rotation extends through the openable wall when the openable wall is in a closed position and the cyclone and the liquid collection region are opened when the openable wall is in an open position.
5. The surface cleaning apparatus of clause 1 wherein the first liquid separation stage has an openable separated liquid outlet port that is in communication with the liquid collection region.
6. The surface cleaning apparatus of clause 5 wherein the openable separated liquid outlet port is provided in a side of the first liquid separation stage.
7. The surface cleaning apparatus of clause 5 further comprising a second liquid separation stage and the first liquid collection region and additional liquid separated by the second liquid separation stage are emptyable concurrently through the separated liquid outlet port.
8. The surface cleaning apparatus of clause 1 further comprising a second liquid separation stage comprising a second liquid collection region that is external to a second liquid separation chamber, the first liquid collection region is external to the cyclone and the first and second liquid collection regions are emptyable concurrently.
9. The surface cleaning apparatus of clause 8 wherein at least a portion of the second liquid collection region is underneath the first liquid collection region.
10. The surface cleaning apparatus of clause 1 wherein the surface cleaning apparatus has a front having a dirt air inlet, the cyclone axis of rotation is generally transverse to a forward direction of motion of the surface cleaning apparatus, the first liquid separation stage has a front side, a rear side and first and second laterally opposed sides, the first liquid collection region having a lower wall having upwardly extending baffles wherein the baffles are disposed laterally between the first and second laterally opposed sidewalls.
11. A surface cleaning apparatus comprising:
   (a) a first liquid separation stage comprising a cyclone having a cyclone axis of rotation, a cyclone first end, an axially spaced apart second end, a cyclone air inlet, a cyclone air outlet, a separated liquid outlet and an axially extending sidewall, wherein when the surface cleaning apparatus is in use to clean a floor, the cyclone axis of rotation extends generally horizontally; and, (b) a first liquid collection region that is positioned at a lower elevation than the separated liquid outlet wherein the first liquid separation stage has an openable separated liquid outlet port that is in communication with the liquid collection region.

12. The surface cleaning apparatus of clause 11 wherein the cyclone is provided in a surface cleaning head.

13. The surface cleaning apparatus of clause 11 wherein the cyclone air inlet is provided at the first end and the cyclone air outlet is provided at the second end.

14. The surface cleaning apparatus of clause 11 wherein the first liquid separation stage has an openable wall, the cyclone axis of rotation extends through the openable wall when the openable wall is in a closed position and the cyclone and the liquid collection region are opened when the openable wall is in an open position.

15. The surface cleaning apparatus of clause 11 wherein the openable separated liquid outlet port is provided in a side of the first liquid separation stage.

16. The surface cleaning apparatus of clause 11 wherein the surface cleaning apparatus has a front end having a surface cleaning head inlet, the cyclone axis of rotation is generally transverse to a forward direction of motion of the surface cleaning apparatus, the first liquid separation stage has a front side, a rear side and first and second laterally opposed sides, the first liquid collection region having a lower wall having upwardly extending baffles wherein the baffles are disposed laterally between the first and second laterally opposed sidewalls.

17. A surface cleaning apparatus comprising:
   (a) a first liquid separation stage comprising a cyclone having a cyclone axis of rotation, a cyclone first end, an axially spaced apart second end, a cyclone air inlet, a cyclone air outlet, a separated liquid outlet and an axially extending sidewall, wherein when the surface cleaning apparatus is in use to clean a floor, the cyclone axis of rotation extends generally horizontally; and,
   (b) a first liquid collection region that is positioned at a lower elevation than the separated liquid outlet, wherein the first liquid separation stage has an openable wall, the cyclone axis of rotation extends through the openable wall when the openable wall is in a closed position and the cyclone and the liquid collection region are opened when the openable wall is in an open position.

18. The surface cleaning apparatus of clause 17 wherein the cyclone is provided in a surface cleaning head.

19. The surface cleaning apparatus of clause 17 wherein the cyclone air inlet is provided at the first end and the cyclone air outlet is provided at the second end.

20. The surface cleaning apparatus of clause 17 wherein the surface cleaning apparatus has a front end having a surface cleaning head inlet, the cyclone axis of rotation is generally transverse to a forward direction of motion of the surface cleaning apparatus, the first liquid separation stage has a front side, a rear side and first and second laterally opposed sides, the first liquid collection region having a lower wall having upwardly extending baffles wherein the baffles are disposed laterally between the first and second laterally opposed sidewalls.

Clause Set D:

1. A surface cleaning apparatus comprising:
   (a) a first cyclonic liquid separation stage comprising a cyclone having a cyclone axis of rotation, a cyclone first end, an axially spaced apart cyclone second end, a cyclone air inlet, a cyclone air outlet, a separated liquid outlet and an axially extending sidewall, wherein when the surface cleaning apparatus is positioned on a floor in a storage position, the cyclone axis of rotation extends generally vertically; and,
   (b) a first liquid collection region,
   wherein the separated liquid outlet comprises a screen and, when the cyclone axis of rotation extends generally vertically, the screen is provided at a lower end of the cyclone and the first liquid collection region is positioned at an elevation below the screen.

2. The surface cleaning apparatus of clause 1 wherein the first liquid collection region underlies the screen whereby the cyclone axis of rotation extends through the first liquid collection region.

3. The surface cleaning apparatus of clause 1 wherein the cyclone air inlet and the cyclone air outlet are provided at the cyclone first end, the cyclone second end comprises a lower wall which comprises a liquid collection surface of the first liquid collection region and the axially extending sidewall extends from the cyclone first end of the lower wall.

4. The surface cleaning apparatus of clause 1 wherein the first liquid collection region has a lower wall which comprises a liquid collection surface and at least one baffle extends generally axially in the first liquid collection region.

5. The surface cleaning apparatus of clause 4 wherein the surface cleaning apparatus comprises a surface cleaning head having a front end and a rear end, an upright section is moveably mounted to the surface cleaning head between an upright storage position and a reclined in use position, wherein the surface cleaning head is moveable in a forward direction when the upright section is in the reclined position and the at least one baffles extends perpendicular to the forward direction.

6. The surface cleaning apparatus of clause 5 wherein the sidewall of the cyclone has a first lateral side and an opposed lateral side in a lateral direction that is perpendicular to the forward direction, and the at least one baffles extends from the first lateral side to the second lateral side.

7. The surface cleaning apparatus of clause 1 wherein the cyclone first end is openable whereby a cyclone chamber that is positioned between the cyclone first end and the screen is opened, and the cyclone second end is openable whereby the first liquid collection region is openable.

8. The surface cleaning apparatus of clause 1 further comprising a cyclone chamber lower end wall provided in the cyclone at an elevation above the screen, and the separated liquid outlet further comprises a gap between the cyclone chamber lower end wall and the sidewall.

9. The surface cleaning apparatus of clause 8 wherein the cyclone chamber lower end wall is moveable between an in use position in which the cyclone chamber lower end wall overlies the screen and an emptying position in which the cyclone chamber lower end wall is moved towards an axial extending position and wherein the cyclone first end is openable whereby a cyclone chamber that is positioned between the cyclone first end and the screen is opened.

10. The surface cleaning apparatus of clause 1 further comprising a first liquid emptying channel extending between the first liquid collection region and the cyclone first end wherein an upper end of the first liquid emptying channel is openable.

11. The surface cleaning apparatus of clause 10 wherein the cyclone first end is openable concurrently with the upper end of the first liquid emptying channel whereby a cyclone chamber that is positioned between the cyclone first end and the screen is opened concurrently with the liquid emptying channel.

12. The surface cleaning apparatus of clause 10 wherein the first liquid emptying channel is positioned adjacent an exterior surface of the sidewall.

13. The surface cleaning apparatus of clause 11 further comprising a second liquid separation stage downstream from the first cyclonic liquid separation stage, the second liquid separation stage having a second liquid collection region wherein the second liquid collection region is openable concurrently with the cyclone chamber and the liquid emptying channel.

14. The surface cleaning apparatus of clause 13 wherein the second liquid collection region has a second liquid emptying channel extending between the second liquid separation region and the cyclone first end wherein an upper end of the second liquid emptying channel is openable concurrently with the cyclone first end.

15. The surface cleaning apparatus of clause 13 wherein the second liquid separation stage is positioned above the first cyclonic liquid separation stage when the surface cleaning apparatus is in the storage position and the second liquid collection region is positioned below the cyclone first end when the surface cleaning apparatus is in the storage position.

16. The surface cleaning apparatus of clause 15 wherein the second liquid separation stage comprises a filter media.

17. The surface cleaning apparatus of clause 15 wherein the cyclone first end comprises an openable lid and the second liquid separation stage is removably positionable in the openable lid.

18. The surface cleaning apparatus of clause 1 further comprising a second liquid separation stage downstream from the first cyclonic liquid separation stage, the second liquid separation stage having a second liquid collection region wherein a cyclone chamber is positioned between the cyclone first end and the screen, the cyclone chamber is opened when the cyclone first end is opened and the second liquid collection region is openable concurrently with the cyclone chamber.

19. The surface cleaning apparatus of clause 18 wherein the second liquid collection region has a liquid emptying channel extending between the second liquid separation region and the cyclone first end wherein an upper end of the second liquid emptying channel is openable concurrently with the cyclone first end.

20. The surface cleaning apparatus of clause 1 wherein the screen is moveable between an in use position in which the screen overlies a lower wall of the first liquid collection region and an emptying position in which the screen is moved towards an axial extending position and wherein the cyclone first end is openable whereby a cyclone chamber that is positioned between the cyclone first end and the screen is opened.

Clause Set E:
1. A surface cleaning apparatus comprising:
    (a) a first cyclonic liquid separation stage comprising at least two cyclones in parallel, each cyclone having a cyclone axis of rotation, a cyclone first end, an axially spaced apart cyclone second end, a cyclone air inlet, a cyclone air outlet, a separated liquid outlet and an axially extending sidewall, wherein when the surface cleaning apparatus is positioned on a floor in a storage position, the cyclone axis of rotation extends generally vertically; and,
    (b) a first liquid collection region,
    wherein the separated liquid outlet comprises a screen provided in each cyclone and, when the cyclone axis of rotation extends generally vertically, the first liquid collection region underlies the at least two cyclones.

2. The surface cleaning apparatus of clause 1 wherein the first cyclonic cleaning stage is provided in a surface cleaning head, the surface cleaning head having a front end, a rear end and first and second laterally opposed sides and the at least two cyclones are positioned laterally side by side.

3. The surface cleaning apparatus of clause 2 further comprising a pre-motor filter housing in which a pre-motor filter media is positionable, the pre-motor filter housing is positioned in the surface cleaning head rearward of the at least two cyclones.

4. The surface cleaning apparatus of clause 3 further comprising a second liquid collection region in flow communication with the pre-motor filter housing.

5. The surface cleaning apparatus of clause 4 wherein the second liquid collection region is emptyable concurrently with the first liquid collection region.

6. The surface cleaning apparatus of clause 5 wherein the second liquid collection region is positioned rearward of the first liquid collection region.

7. The surface cleaning apparatus of clause 6 wherein the second liquid collection region is contiguous with the first liquid collection region.

8. The surface cleaning apparatus of clause 3 wherein the pre-motor filter housing extends from the first lateral side to the second lateral side.

9. The surface cleaning apparatus of clause 2 further comprising a pre-motor filter housing in which a pre-motor filter media is positionable, the pre-motor filter housing is positioned in the surface cleaning head and the first cyclonic liquid separation stage and the pre-motor filter housing are removably mounted in the surface cleaning head.

10. The surface cleaning apparatus of clause 9 wherein the first cyclonic liquid separation stage and the pre-motor filter housing are concurrently removably.

11. The surface cleaning apparatus of clause 1 wherein the first liquid collection region has a lower liquid collection wall, and the lower liquid collection wall has an openable drain plug.

12. The surface cleaning apparatus of clause 1 wherein each cyclone has a cyclone chamber positioned between the cyclone first end and the screen, an upper end of the first liquid collection region is located at the location of the screen and the upper end of the first liquid collection region is moveably mounted between a closed position, and an open emptying position in which the first liquid collection region is moved with respect to the cyclone chamber.

13. The surface cleaning apparatus of clause 1 wherein the screen remains in position when the first liquid collection region is moved to the open emptying position.
14. The surface cleaning apparatus of clause 1 wherein the screen moves to an open position when the first liquid collection region is moved to the open emptying position.
15. The surface cleaning apparatus of clause 1 wherein the at least two cyclones comprises a first cyclone and a second cyclone, the first liquid collection region comprises a first portion in flow communication with the first cyclone and a second portion in flow communication with the second cyclone and the first and second portions are isolated from each other.
16. The surface cleaning apparatus of clause 1 wherein the at least two cyclones comprises a first cyclone and a second cyclone and the first liquid collection region comprises a single contiguous region in communication with the first and seconds cyclones.
17. A surface cleaning apparatus comprising a surface cleaning head, the surface cleaning head comprising:
    (a) a front end, a rear end and first and second laterally opposed sides;
    (b) a first cyclonic liquid separation stage comprising at least two cyclones in parallel, each cyclone having a cyclone axis of rotation, a cyclone first end, an axially spaced apart cyclone second end, a cyclone air inlet, a cyclone air outlet, a separated liquid outlet and an axially extending sidewall, wherein when the surface cleaning apparatus is positioned on a floor in a storage position, the cyclone axis of rotation extends generally vertically;
    (c) a first liquid collection region; and,
    (d) a pre-motor filter housing in which a pre-motor filter media is positionable, the pre-motor filter housing is positioned in the surface cleaning head rearward of the at least two cyclones.
18. The surface cleaning apparatus of clause 17 wherein the at least two cyclones are positioned laterally side by side.
19. The surface cleaning apparatus of clause 17 further comprising a second liquid collection region in flow communication with the pre-motor filter housing.
20. The surface cleaning apparatus of clause 19 wherein the second liquid collection region is emptyable concurrently with the first liquid collection region.

The invention claimed is:
1. A surface cleaning apparatus comprising:
    (a) a first liquid separation stage comprising a cyclone having a cyclone axis of rotation, a cyclone first end, an axially spaced apart second end, a cyclone air inlet, a cyclone air outlet and an axially extending sidewall wherein a portion of the sidewall comprises a porous section and, when the surface cleaning apparatus is in use to clean a floor, the cyclone axis of rotation extends generally horizontally; and,
    (b) a first liquid collection region that is positioned at a lower elevation than the porous section wherein the porous section connects the cyclone in flow communication with the first liquid collection region,
    wherein, in operation to clean a wet surface, water separated in the cyclone travels through the porous section to the first liquid collection region and air exits the cyclone through the cyclone air outlet.
2. The surface cleaning apparatus of claim 1 wherein the cyclone is provided in a surface cleaning head.
3. The surface cleaning apparatus of claim 1 wherein the cyclone air inlet is provided at the first end and the cyclone air outlet is provided at the second end.
4. The surface cleaning apparatus of claim 1 wherein the first liquid separation stage has an openable wall, the cyclone axis of rotation extends through the openable wall when the openable wall is in a closed position and the cyclone and the liquid collection region are opened when the openable wall is in an open position.
5. The surface cleaning apparatus of claim 1 wherein the first liquid separation stage has an openable separated liquid outlet port that is in communication with the liquid collection region.
6. The surface cleaning apparatus of claim 5 wherein the openable separated liquid outlet port is provided in a side of the first liquid separation stage.
7. The surface cleaning apparatus of claim 5 further comprising a second liquid separation stage and the first liquid collection region and additional liquid separated by the second liquid separation stage are emptyable concurrently through the separated liquid outlet port.
8. The surface cleaning apparatus of claim 1 further comprising a second liquid separation stage comprising a second liquid collection region that is external to a second liquid separation chamber, the first liquid collection region is external to the cyclone and the first and second liquid collection regions are emptyable concurrently.
9. The surface cleaning apparatus of claim 8 wherein at least a portion of the second liquid collection region is underneath the first liquid collection region.
10. The surface cleaning apparatus of claim 1 wherein the surface cleaning apparatus has a front having a dirty air inlet, the cyclone axis of rotation is generally transverse to a forward direction of motion of the surface cleaning apparatus, the first liquid separation stage has a front side, a rear side and first and second laterally opposed sides, the first liquid collection region having a lower wall having upwardly extending baffles wherein the baffles are disposed laterally between the first and second laterally opposed sides.
11. A surface cleaning apparatus comprising:
    (a) a first liquid separation stage comprising a cyclone having a cyclone axis of rotation, a cyclone first end, an axially spaced apart second end, a cyclone air inlet, a cyclone air outlet, a separated liquid outlet and an axially extending sidewall, wherein when the surface cleaning apparatus is in use to clean a floor, the cyclone axis of rotation extends generally horizontally; and,
    (b) a first liquid collection region that is positioned at a lower elevation than the separated liquid outlet, wherein the separated liquid outlet comprises a porous section of the sidewall and the separated liquid outlet connects the cyclone in flow communication with the first liquid collection region,
    wherein, in operation to clean a wet surface, water separated in the cyclone travels through the porous sidewall to the first liquid collection region and air exits the cyclone through the cyclone air outlet and,
    wherein the first liquid separation stage has an openable separated liquid outlet port that is in communication with the liquid collection region.
12. The surface cleaning apparatus of claim 11 wherein the cyclone is provided in a surface cleaning head.
13. The surface cleaning apparatus of claim 11 wherein the cyclone air inlet is provided at the first end and the cyclone air outlet is provided at the second end.

14. The surface cleaning apparatus of claim 11 wherein the first liquid separation stage has an openable wall, the cyclone axis of rotation extends through the openable wall when the openable wall is in a closed position and the cyclone and the liquid collection region are opened when the openable wall is in an open position.

15. The surface cleaning apparatus of claim 11 wherein the openable separated liquid outlet port is provided in a side of the first liquid separation stage.

16. The surface cleaning apparatus of claim 11 wherein the surface cleaning apparatus has a front end having a surface cleaning head inlet, the cyclone axis of rotation is generally transverse to a forward direction of motion of the surface cleaning apparatus, the first liquid separation stage has a front side, a rear side and first and second laterally opposed sides, the first liquid collection region having a lower wall having upwardly extending baffles wherein the baffles are disposed laterally between the first and second laterally opposed sides.

17. A surface cleaning apparatus comprising:
(a) a first liquid separation stage comprising a cyclone having a cyclone axis of rotation, a cyclone first end, an axially spaced apart second end, a cyclone air inlet, a cyclone air outlet, a separated liquid outlet and an axially extending sidewall, wherein when the surface cleaning apparatus is in use to clean a floor, the cyclone axis of rotation extends generally horizontally; and,
(b) a first liquid collection region that is positioned at a lower elevation than the separated liquid outlet, wherein the separated liquid outlet comprises a porous section of the sidewall and the separated liquid outlet connects the cyclone in flow communication with the first liquid collection region, wherein, in operation to clean a wet surface, water separated in the cyclone travels through the porous sidewall to the first liquid collection region and air exits the cyclone through the cyclone air outlet and, wherein the first liquid separation stage has an openable wall, the cyclone axis of rotation extends through the openable wall when the openable wall is in a closed position and the cyclone and the liquid collection region are opened when the openable wall is in an open position.

18. The surface cleaning apparatus of claim 17 wherein the cyclone is provided in a surface cleaning head.

19. The surface cleaning apparatus of claim 17 wherein the cyclone air inlet is provided at the first end and the cyclone air outlet is provided at the second end.

20. The surface cleaning apparatus of claim 17 wherein the surface cleaning apparatus has a front end having a surface cleaning head inlet, the cyclone axis of rotation is generally transverse to a forward direction of motion of the surface cleaning apparatus, the first liquid separation stage has a front side, a rear side and first and second laterally opposed sides, the first liquid collection region having a lower wall having upwardly extending baffles wherein the baffles are disposed laterally between the first and second laterally opposed sides.

* * * * *